US012258542B2

(12) United States Patent
Andersen et al.

(10) Patent No.: US 12,258,542 B2
(45) **Date of Patent: *Mar. 25, 2025**

(54) DETERGENT COMPOSITION COMPRISING PROTEASE AND AMYLASE VARIANTS

(71) Applicant: NOVOZYMES A/S, Bagsvaerd (DK)

(72) Inventors: Carsten Andersen, Vaerloese (DK); Yanfei Wang, Beijing (CN); Wenwen Tao, Beijing (CN); Bitten Plesner, Copenhagen NV (DK); Elena Genesca Pont, København S (DK)

(73) Assignee: NOVOZYMES A/S, Bagsvaerd (DK)

( * ) Notice: Subject to any disclaimer, the term of this patent is extended or adjusted under 35 U.S.C. 154(b) by 237 days.

This patent is subject to a terminal disclaimer.

(21) Appl. No.: 17/313,778

(22) Filed: May 6, 2021

(65) Prior Publication Data

US 2021/0269750 A1 Sep. 2, 2021

Related U.S. Application Data

(62) Division of application No. 15/771,759, filed as application No. PCT/EP2016/076155 on Oct. 28, 2016, now Pat. No. 11,028,346.

(30) Foreign Application Priority Data

Oct. 28, 2015 (EP) .................................... 15191879

(51) Int. Cl.
*C11D 3/386* (2006.01)

(52) U.S. Cl.
CPC ........... *C11D 3/386* (2013.01); *C11D 2111/12* (2024.01); *C11D 2111/14* (2024.01)

(58) Field of Classification Search
CPC .. C11D 3/386; C11D 11/0017; C11D 11/0023
See application file for complete search history.

(56) References Cited

U.S. PATENT DOCUMENTS

| | | | | | |
|---|---|---|---|---|---|
| 5,679,630 | A | * | 10/1997 | Baeck | A61K 8/42 435/221 |
| 6,939,702 | B1 | | 9/2005 | Vind et al. | |
| 2009/0233832 | A1 | | 9/2009 | Souter | |
| 2013/0000055 | A1 | | 1/2013 | Jackson et al. | |
| 2013/0025073 | A1 | | 1/2013 | Souter et al. | |
| 2014/0295522 | A1 | | 10/2014 | Mussmann et al. | |

FOREIGN PATENT DOCUMENTS

| | | | | | |
|---|---|---|---|---|---|
| CN | 100558871 | C | | 11/2009 | |
| CN | 102388132 | A | | 3/2012 | |
| CN | 107075493 | A | | 8/2017 | |
| CN | 107787365 | A | | 3/2018 | |
| DE | 102007038031 | A1 | | 6/2009 | |
| EP | 2832853 | A1 | * | 2/2015 | C11D 3/386 |
| WO | 92/17577 | A1 | | 10/1992 | |
| WO | WO-9219729 | A1 | * | 11/1992 | C11D 3/386 |
| WO | 1999020723 | A2 | | 4/1999 | |
| WO | 00/60058 | A2 | | 10/2000 | |
| WO | 2000/060063 | A1 | | 10/2000 | |
| WO | 2004/067737 | A2 | | 8/2004 | |
| WO | 2007/044993 | A2 | | 4/2007 | |
| WO | 2009/021867 | A2 | | 2/2009 | |
| WO | 2010115028 | A2 | | 10/2010 | |
| WO | 2013/016368 | A1 | | 1/2013 | |
| WO | 2014/106593 | A1 | | 7/2014 | |
| WO | 2015/189372 | A1 | | 12/2015 | |
| WO | 2016087617 | A1 | | 6/2016 | |
| WO | 2016/180749 | A1 | | 11/2016 | |
| WO | 2016180748 | A1 | | 11/2016 | |
| WO | 2016/203064 | A2 | | 12/2016 | |

OTHER PUBLICATIONS

Singh RK et al. Protein Engineering Approaches in the Post-Genomic Era. 2017. Current Protein and Peptide Science. 18, 1-11. (Year: 2017).*
Zhang M et al. Propagated Perturbations from a Peripheral Mutation Show Interactions Supporting WW Domain Thermostability. 2018. Structure. 26, 1474-1485. (Year: 2018).*
Davail et al, 1994, The J Of Biological Chem 269(26), 17448-17453.
Narinx et al, 1997, Protein Engineering 10(11), 1271-1279.
Siezen et al, 1997, Protein Science 6, 501-523.
Anonymous, 2012, Invalidation Decision of CN98813338.5, incl Tr.
Anonymous, 2017, Board Decision of CN201280050093.8.
Anonymous, 2017, Board Decision of CN201280064408.4.
Anonymous, 2018, Board Decision of CN201280043431.5.
Anonymous, 2018, Board Decision of CN201280063467.X.
Anonymous, 2024, Sequence alignment between CN108291178 and CN107787365 and CN107075493.
Anonymous, 2024, Supplementary experimental data, 1-3.
Anonymous, Experimental data obtained before the filing CN201680059702.4, 1-6.
Betzel et al., 1992, J. Mol. Biol. 223, 427-445.
Hiteshi et al., 2014, Extremophiles 18, 937-944.
Lange et al., 1994, Eur. J. Biochem. 224, 507-518.
Machovic et al., 2003, Biologia, Bratislava 58, 1127-1132.

* cited by examiner

*Primary Examiner* — Paul J Holland
(74) *Attorney, Agent, or Firm* — Yoshimi D. Barron

(57) ABSTRACT

The present invention relates to detergent compositions comprising protease variants and alpha-amylases or variants thereof. Furthermore, the present invention relates to methods of using the detergent compositions.

11 Claims, No Drawings

Specification includes a Sequence Listing.

SEQUENCE LISTING

```
<160> NUMBER OF SEQ ID NOS: 23

<210> SEQ ID NO 1
<211> LENGTH: 485
<212> TYPE: PRT
<213> ORGANISM: Bacillus sp.

<400> SEQUENCE: 1

His His Asp Gly Thr Asn Gly Thr Ile Met Gln Tyr Phe Glu Trp Asn
1               5                   10                  15

Val Pro Asn Asp Gly Gln His Trp Asn Arg Leu His Asn Asn Ala Gln
            20                  25                  30

Asn Leu Lys Asn Ala Gly Ile Thr Ala Ile Trp Ile Pro Pro Ala Trp
        35                  40                  45

Lys Gly Thr Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Lys Ala Glu Leu Glu Arg Ala Ile Arg Ser Leu Lys Ala Asn Gly
                85                  90                  95

Ile Gln Val Tyr Gly Asp Val Val Met Asn His Lys Gly Gly Ala Asp
```

```
            100                 105                 110

Phe Thr Glu Arg Val Gln Ala Val Glu Val Asn Pro Gln Asn Arg Asn
        115                 120                 125

Gln Glu Val Ser Gly Thr Tyr Gln Ile Glu Ala Trp Thr Gly Phe Asn
    130                 135                 140

Phe Pro Gly Arg Gly Asn Gln His Ser Ser Phe Lys Trp Arg Trp Tyr
145                 150                 155                 160

His Phe Asp Gly Thr Asp Trp Asp Gln Ser Arg Gln Leu Ala Asn Arg
                165                 170                 175

Ile Tyr Lys Phe Arg Gly Asp Gly Lys Ala Trp Asp Trp Glu Val Asp
            180                 185                 190

Thr Glu Asn Gly Asn Tyr Asp Tyr Leu Met Tyr Ala Asp Val Asp Met
        195                 200                 205

Asp His Pro Glu Val Ile Asn Glu Leu Asn Arg Trp Gly Val Trp Tyr
    210                 215                 220

Ala Asn Thr Leu Asn Leu Asp Gly Phe Arg Leu Asp Ala Val Lys His
225                 230                 235                 240

Ile Lys Phe Ser Phe Met Arg Asp Trp Leu Gly His Val Arg Gly Gln
                245                 250                 255

Thr Gly Lys Asn Leu Phe Ala Val Ala Glu Tyr Trp Lys Asn Asp Leu
            260                 265                 270

Gly Ala Leu Glu Asn Tyr Leu Ser Lys Thr Asn Trp Thr Met Ser Ala
        275                 280                 285

Phe Asp Val Pro Leu His Tyr Asn Leu Tyr Gln Ala Ser Asn Ser Ser
    290                 295                 300

Gly Asn Tyr Asp Met Arg Asn Leu Leu Asn Gly Thr Leu Val Gln Arg
305                 310                 315                 320

His Pro Ser His Ala Val Thr Phe Val Asp Asn His Asp Thr Gln Pro
                325                 330                 335

Gly Glu Ala Leu Glu Ser Phe Val Gln Gly Trp Phe Lys Pro Leu Ala
            340                 345                 350

Tyr Ala Thr Ile Leu Thr Arg Glu Gln Gly Tyr Pro Gln Val Phe Tyr
        355                 360                 365

Gly Asp Tyr Tyr Gly Ile Pro Ser Asp Gly Val Pro Ser Tyr Arg Gln
    370                 375                 380

Gln Ile Asp Pro Leu Leu Lys Ala Arg Gln Gln Tyr Ala Tyr Gly Arg
385                 390                 395                 400

Gln His Asp Tyr Phe Asp His Trp Asp Val Ile Gly Trp Thr Arg Glu
                405                 410                 415

Gly Asn Ala Ser His Pro Asn Ser Gly Leu Ala Thr Ile Met Ser Asp
            420                 425                 430

Gly Pro Gly Gly Ser Lys Trp Met Tyr Val Gly Arg Gln Lys Ala Gly
        435                 440                 445

Glu Val Trp His Asp Met Thr Gly Asn Arg Ser Gly Thr Val Thr Ile
    450                 455                 460

Asn Gln Asp Gly Trp Gly His Phe Phe Val Asn Gly Gly Ser Val Ser
465                 470                 475                 480

Val Trp Val Lys Arg
                485
```

<210> SEQ ID NO 2
<211> LENGTH: 311
<212> TYPE: PRT
<213> ORGANISM: Bacillus sp.

<400> SEQUENCE: 2

```
Ala Val Pro Ser Thr Gln Thr Pro Trp Gly Ile Lys Ser Ile Tyr Asn
1               5                   10                  15

Asp Gln Ser Ile Thr Lys Thr Thr Gly Gly Ser Gly Ile Lys Val Ala
            20                  25                  30

Val Leu Asp Thr Gly Val Tyr Thr Ser His Leu Asp Leu Ala Gly Ser
        35                  40                  45

Ala Glu Gln Cys Lys Asp Phe Thr Gln Ser Asn Pro Leu Val Asp Gly
    50                  55                  60

Ser Cys Thr Asp Arg Gln Gly His Gly Thr His Val Ala Gly Thr Val
65                  70                  75                  80

Leu Ala His Gly Gly Ser Asn Gly Gln Gly Val Tyr Gly Val Ala Pro
                85                  90                  95

Gln Ala Lys Leu Trp Ala Tyr Lys Val Leu Gly Asp Asn Gly Ser Gly
            100                 105                 110

Tyr Ser Asp Asp Ile Ala Ala Ala Ile Arg His Val Ala Asp Glu Ala
        115                 120                 125

Ser Arg Thr Gly Ser Lys Val Val Ile Asn Met Ser Leu Gly Ser Ser
    130                 135                 140

Ala Lys Asp Ser Leu Ile Ala Ser Ala Val Asp Tyr Ala Tyr Gly Lys
145                 150                 155                 160

Gly Val Leu Ile Val Ala Ala Ala Gly Asn Ser Gly Ser Gly Ser Asn
                165                 170                 175

Thr Ile Gly Phe Pro Gly Gly Leu Val Asn Ala Val Ala Val Ala Ala
            180                 185                 190

Leu Glu Asn Val Gln Gln Asn Gly Thr Tyr Arg Val Ala Asp Phe Ser
        195                 200                 205

Ser Arg Gly Asn Pro Ala Thr Ala Gly Asp Tyr Ile Ile Gln Glu Arg
    210                 215                 220

Asp Ile Glu Val Ser Ala Pro Gly Ala Ser Val Glu Ser Thr Trp Tyr
225                 230                 235                 240

Thr Gly Gly Tyr Asn Thr Ile Ser Gly Thr Ser Met Ala Thr Pro His
                245                 250                 255

Val Ala Gly Leu Ala Ala Lys Ile Trp Ser Ala Asn Thr Ser Leu Ser
            260                 265                 270

His Ser Gln Leu Arg Thr Glu Leu Gln Asn Arg Ala Lys Val Tyr Asp
        275                 280                 285

Ile Lys Gly Gly Ile Gly Ala Gly Thr Gly Asp Asp Tyr Ala Ser Gly
    290                 295                 300

Phe Gly Tyr Pro Arg Val Lys
305                 310
```

<210> SEQ ID NO 3
<211> LENGTH: 269
<212> TYPE: PRT
<213> ORGANISM: Bacillus lentus

<400> SEQUENCE: 3

```
Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Asn Ile Arg Gly Gly Ala Ser
        35                  40                  45
```

-continued

```
Phe Val Pro Gly Glu Pro Ser Thr Gln Asp Gly Asn Gly His Gly Thr
    50                  55                  60

His Val Ala Gly Thr Ile Ala Ala Leu Asn Asn Ser Ile Gly Val Leu
65                  70                  75                  80

Gly Val Ala Pro Ser Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265


<210> SEQ ID NO 4
<211> LENGTH: 269
<212> TYPE: PRT
<213> ORGANISM: Thermomyces lanuginosus

<400> SEQUENCE: 4

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Pro Ala Gly Thr
            20                  25                  30

Asn Ile Thr Cys Thr Gly Asn Ala Cys Pro Glu Val Glu Lys Ala Asp
        35                  40                  45

Ala Thr Phe Leu Tyr Ser Phe Glu Asp Ser Gly Val Gly Asp Val Thr
    50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Gly Asn Leu Asn Phe Asp
                85                  90                  95

Leu Lys Glu Ile Asn Asp Ile Cys Ser Gly Cys Arg Gly His Asp Gly
            100                 105                 110

Phe Thr Ser Ser Trp Arg Ser Val Ala Asp Thr Leu Arg Gln Lys Val
        115                 120                 125

Glu Asp Ala Val Arg Glu His Pro Asp Tyr Arg Val Val Phe Thr Gly
    130                 135                 140

His Ser Leu Gly Gly Ala Leu Ala Thr Val Ala Gly Ala Asp Leu Arg
```

```
145                 150                 155                 160

Gly Asn Gly Tyr Asp Ile Asp Val Phe Ser Tyr Gly Ala Pro Arg Val
                165                 170                 175

Gly Asn Arg Ala Phe Ala Glu Phe Leu Thr Val Gln Thr Gly Gly Thr
            180                 185                 190

Leu Tyr Arg Ile Thr His Thr Asn Asp Ile Val Pro Arg Leu Pro Pro
        195                 200                 205

Arg Glu Phe Gly Tyr Ser His Ser Ser Pro Glu Tyr Trp Ile Lys Ser
    210                 215                 220

Gly Thr Leu Val Pro Val Thr Arg Asn Asp Ile Val Lys Ile Glu Gly
225                 230                 235                 240

Ile Asp Ala Thr Gly Gly Asn Asn Gln Pro Asn Ile Pro Asp Ile Pro
                245                 250                 255

Ala His Leu Trp Tyr Phe Gly Leu Ile Gly Thr Cys Leu
            260                 265


<210> SEQ ID NO 5
<211> LENGTH: 485
<212> TYPE: PRT
<213> ORGANISM: Bacillus sp.

<400> SEQUENCE: 5

His His Asn Gly Thr Asn Gly Thr Met Met Gln Tyr Phe Glu Trp Tyr
1               5                   10                  15

Leu Pro Asn Asp Gly Asn His Trp Asn Arg Leu Arg Ser Asp Ala Ser
            20                  25                  30

Asn Leu Lys Asp Lys Gly Ile Ser Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60

Asp Leu Gly Glu Phe Asn Gln Lys Gly Thr Ile Arg Thr Lys Tyr Gly
65                  70                  75                  80

Thr Arg Asn Gln Leu Gln Ala Ala Val Asn Ala Leu Lys Ser Asn Gly
                85                  90                  95

Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Ser Gly Glu Tyr Thr Ile Glu Ala Trp Thr Lys Phe Asp
    130                 135                 140

Phe Pro Gly Arg Gly Asn Thr His Ser Asn Phe Lys Trp Arg Trp Tyr
145                 150                 155                 160

His Phe Asp Gly Val Asp Trp Asp Gln Ser Arg Lys Leu Asn Asn Arg
                165                 170                 175

Ile Tyr Lys Phe Arg Gly Asp Gly Lys Gly Trp Asp Trp Glu Val Asp
            180                 185                 190

Thr Glu Asn Gly Asn Tyr Asp Tyr Leu Met Tyr Ala Asp Ile Asp Met
        195                 200                 205

Asp His Pro Glu Val Val Asn Glu Leu Arg Asn Trp Gly Val Trp Tyr
    210                 215                 220

Thr Asn Thr Leu Gly Leu Asp Gly Phe Arg Ile Asp Ala Val Lys His
225                 230                 235                 240

Ile Lys Tyr Ser Phe Thr Arg Asp Trp Ile Asn His Val Arg Ser Ala
                245                 250                 255
```

Thr Gly Lys Asn Met Phe Ala Val Ala Glu Phe Trp Lys Asn Asp Leu
260 265 270

Gly Ala Ile Glu Asn Tyr Leu Asn Lys Thr Asn Trp Asn His Ser Val
275 280 285

Phe Asp Val Pro Leu His Tyr Asn Leu Tyr Asn Ala Ser Lys Ser Gly
290 295 300

Gly Asn Tyr Asp Met Arg Gln Ile Phe Asn Gly Thr Val Val Gln Arg
305 310 315 320

His Pro Met His Ala Val Thr Phe Val Asp Asn His Asp Ser Gln Pro
325 330 335

Glu Glu Ala Leu Glu Ser Phe Val Glu Glu Trp Phe Lys Pro Leu Ala
340 345 350

Tyr Ala Leu Thr Leu Thr Arg Glu Gln Gly Tyr Pro Ser Val Phe Tyr
355 360 365

Gly Asp Tyr Tyr Gly Ile Pro Thr His Gly Val Pro Ala Met Lys Ser
370 375 380

Lys Ile Asp Pro Ile Leu Glu Ala Arg Gln Lys Tyr Ala Tyr Gly Arg
385 390 395 400

Gln Asn Asp Tyr Leu Asp His His Asn Ile Ile Gly Trp Thr Arg Glu
405 410 415

Gly Asn Thr Ala His Pro Asn Ser Gly Leu Ala Thr Ile Met Ser Asp
420 425 430

Gly Ala Gly Gly Asn Lys Trp Met Phe Val Gly Arg Asn Lys Ala Gly
435 440 445

Gln Val Trp Thr Asp Ile Thr Gly Asn Arg Ala Gly Thr Val Thr Ile
450 455 460

Asn Ala Asp Gly Trp Gly Asn Phe Ser Val Asn Gly Gly Ser Val Ser
465 470 475 480

Ile Trp Val Asn Lys
485

<210> SEQ ID NO 6
<211> LENGTH: 485
<212> TYPE: PRT
<213> ORGANISM: Bacillus halmapalus

<400> SEQUENCE: 6

His His Asn Gly Thr Asn Gly Thr Met Met Gln Tyr Phe Glu Trp His
1 5 10 15

Leu Pro Asn Asp Gly Asn His Trp Asn Arg Leu Arg Asp Asp Ala Ser
20 25 30

Asn Leu Arg Asn Arg Gly Ile Thr Ala Ile Trp Ile Pro Pro Ala Trp
35 40 45

Lys Gly Thr Ser Gln Asn Asp Val Gly Tyr Gly Ala Tyr Asp Leu Tyr
50 55 60

Asp Leu Gly Glu Phe Asn Gln Lys Gly Thr Val Arg Thr Lys Tyr Gly
65 70 75 80

Thr Arg Ser Gln Leu Glu Ser Ala Ile His Ala Leu Lys Asn Asn Gly
85 90 95

Val Gln Val Tyr Gly Asp Val Val Met Asn His Lys Gly Gly Ala Asp
100 105 110

Ala Thr Glu Asn Val Leu Ala Val Glu Val Asn Pro Asn Asn Arg Asn
115 120 125

Gln Glu Ile Ser Gly Asp Tyr Thr Ile Glu Ala Trp Thr Lys Phe Asp
130 135 140

-continued

```
Phe Pro Gly Arg Gly Asn Thr Tyr Ser Asp Phe Lys Trp Arg Trp Tyr
145                 150                 155                 160

His Phe Asp Gly Val Asp Trp Asp Gln Ser Arg Gln Phe Gln Asn Arg
                165                 170                 175

Ile Tyr Lys Phe Arg Gly Asp Gly Lys Ala Trp Asp Trp Glu Val Asp
            180                 185                 190

Ser Glu Asn Gly Asn Tyr Asp Tyr Leu Met Tyr Ala Asp Val Asp Met
        195                 200                 205

Asp His Pro Glu Val Val Asn Glu Leu Arg Arg Trp Gly Glu Trp Tyr
    210                 215                 220

Thr Asn Thr Leu Asn Leu Asp Gly Phe Arg Ile Asp Ala Val Lys His
225                 230                 235                 240

Ile Lys Tyr Ser Phe Thr Arg Asp Trp Leu Thr His Val Arg Asn Ala
                245                 250                 255

Thr Gly Lys Glu Met Phe Ala Val Ala Glu Phe Trp Lys Asn Asp Leu
            260                 265                 270

Gly Ala Leu Glu Asn Tyr Leu Asn Lys Thr Asn Trp Asn His Ser Val
        275                 280                 285

Phe Asp Val Pro Leu His Tyr Asn Leu Tyr Asn Ala Ser Asn Ser Gly
    290                 295                 300

Gly Asn Tyr Asp Met Ala Lys Leu Leu Asn Gly Thr Val Val Gln Lys
305                 310                 315                 320

His Pro Met His Ala Val Thr Phe Val Asp Asn His Asp Ser Gln Pro
                325                 330                 335

Gly Glu Ser Leu Glu Ser Phe Val Gln Glu Trp Phe Lys Pro Leu Ala
            340                 345                 350

Tyr Ala Leu Ile Leu Thr Arg Glu Gln Gly Tyr Pro Ser Val Phe Tyr
        355                 360                 365

Gly Asp Tyr Tyr Gly Ile Pro Thr His Ser Val Pro Ala Met Lys Ala
    370                 375                 380

Lys Ile Asp Pro Ile Leu Glu Ala Arg Gln Asn Phe Ala Tyr Gly Thr
385                 390                 395                 400

Gln His Asp Tyr Phe Asp His His Asn Ile Ile Gly Trp Thr Arg Glu
                405                 410                 415

Gly Asn Thr Thr His Pro Asn Ser Gly Leu Ala Thr Ile Met Ser Asp
            420                 425                 430

Gly Pro Gly Gly Glu Lys Trp Met Tyr Val Gly Gln Asn Lys Ala Gly
        435                 440                 445

Gln Val Trp His Asp Ile Thr Gly Asn Lys Pro Gly Thr Val Thr Ile
    450                 455                 460

Asn Ala Asp Gly Trp Ala Asn Phe Ser Val Asn Gly Gly Ser Val Ser
465                 470                 475                 480

Ile Trp Val Lys Arg
                485


<210> SEQ ID NO 7
<211> LENGTH: 484
<212> TYPE: PRT
<213> ORGANISM: Bacillus sp.

<400> SEQUENCE: 7

Asn Thr Ala Pro Ile Asn Glu Thr Met Met Gln Tyr Phe Glu Trp Asp
1               5                   10                  15

Leu Pro Asn Asp Gly Thr Leu Trp Thr Lys Val Lys Asn Glu Ala Ala
```

```
                20                  25                  30

Asn Leu Ser Ser Leu Gly Ile Thr Ala Leu Trp Leu Pro Pro Ala Tyr
        35                  40                  45

Lys Gly Thr Ser Gln Ser Asp Val Gly Tyr Gly Val Tyr Asp Leu Tyr
    50                  55                  60

Asp Leu Gly Glu Phe Asn Gln Lys Gly Thr Ile Arg Thr Lys Tyr Gly
65                  70                  75                  80

Thr Lys Thr Gln Tyr Ile Gln Ala Ile Gln Ala Ala Lys Ala Ala Gly
                85                  90                  95

Met Gln Val Tyr Ala Asp Val Val Phe Asn His Lys Ala Gly Ala Asp
            100                 105                 110

Gly Thr Glu Phe Val Asp Ala Val Glu Val Asp Pro Ser Asn Arg Asn
        115                 120                 125

Gln Glu Thr Ser Gly Thr Tyr Gln Ile Gln Ala Trp Thr Lys Phe Asp
    130                 135                 140

Phe Pro Gly Arg Gly Asn Thr Tyr Ser Ser Phe Lys Trp Arg Trp Tyr
145                 150                 155                 160

His Phe Asp Gly Thr Asp Trp Asp Glu Ser Arg Lys Leu Asn Arg Ile
                165                 170                 175

Tyr Lys Phe Arg Ser Thr Gly Lys Ala Trp Asp Trp Glu Val Asp Thr
            180                 185                 190

Glu Asn Gly Asn Tyr Asp Tyr Leu Met Phe Ala Asp Leu Asp Met Asp
        195                 200                 205

His Pro Glu Val Val Thr Glu Leu Lys Asn Trp Gly Thr Trp Tyr Val
    210                 215                 220

Asn Thr Thr Asn Ile Asp Gly Phe Arg Leu Asp Ala Val Lys His Ile
225                 230                 235                 240

Lys Tyr Thr Phe Phe Pro Asp Trp Leu Thr Tyr Val Arg Asn Gln Thr
                245                 250                 255

Gly Lys Asn Leu Phe Ala Val Gly Glu Phe Trp Ser Tyr Asp Val Asn
            260                 265                 270

Lys Leu His Asn Tyr Ile Thr Lys Thr Asn Gly Ser Met Ser Leu Phe
        275                 280                 285

Asp Ala Pro Leu His Asn Asn Phe Tyr Thr Ala Ser Lys Ser Ser Gly
    290                 295                 300

Tyr Phe Asp Met Arg Tyr Leu Leu Asn Asn Thr Leu Met Lys Asp Gln
305                 310                 315                 320

Pro Ser Leu Ala Val Thr Leu Val Asp Asn His Asp Thr Gln Pro Gly
                325                 330                 335

Gln Ser Leu Gln Ser Trp Val Glu Pro Trp Phe Lys Pro Leu Ala Tyr
            340                 345                 350

Ala Phe Ile Leu Thr Arg Gln Glu Gly Tyr Pro Cys Val Phe Tyr Gly
        355                 360                 365

Asp Tyr Tyr Gly Ile Pro Lys Tyr Asn Ile Pro Gly Leu Lys Ser Lys
    370                 375                 380

Ile Asp Pro Leu Leu Ile Ala Arg Arg Asp Tyr Ala Tyr Gly Thr Gln
385                 390                 395                 400

Arg Asp Tyr Ile Asp His Gln Asp Ile Ile Gly Trp Thr Arg Glu Gly
                405                 410                 415

Ile Asp Thr Lys Pro Asn Ser Gly Leu Ala Ala Leu Ile Thr Asp Gly
            420                 425                 430

Pro Gly Gly Ser Lys Trp Met Tyr Val Gly Lys Lys His Ala Gly Lys
        435                 440                 445
```

```
Val Phe Tyr Asp Leu Thr Gly Asn Arg Ser Asp Thr Val Thr Ile Asn
    450                 455                 460

Ala Asp Gly Trp Gly Glu Phe Lys Val Asn Gly Gly Ser Val Ser Ile
465                 470                 475                 480

Trp Val Ala Lys


<210> SEQ ID NO 8
<211> LENGTH: 485
<212> TYPE: PRT
<213> ORGANISM: Cytophaga sp.

<400> SEQUENCE: 8

Ala Ala Thr Asn Gly Thr Met Met Gln Tyr Phe Glu Trp Tyr Val Pro
1               5                   10                  15

Asn Asp Gly Gln Gln Trp Asn Arg Leu Arg Thr Asp Ala Pro Tyr Leu
            20                  25                  30

Ser Ser Val Gly Ile Thr Ala Val Trp Thr Pro Pro Ala Tyr Lys Gly
        35                  40                  45

Thr Ser Gln Ala Asp Val Gly Tyr Gly Pro Tyr Asp Leu Tyr Asp Leu
    50                  55                  60

Gly Glu Phe Asn Gln Lys Gly Thr Val Arg Thr Lys Tyr Gly Thr Lys
65                  70                  75                  80

Gly Glu Leu Lys Ser Ala Val Asn Thr Leu His Ser Asn Gly Ile Gln
                85                  90                  95

Val Tyr Gly Asp Val Val Met Asn His Lys Ala Gly Ala Asp Tyr Thr
            100                 105                 110

Glu Asn Val Thr Ala Val Glu Val Asn Pro Ser Asn Arg Asn Gln Glu
        115                 120                 125

Thr Ser Gly Glu Tyr Asn Ile Gln Ala Trp Thr Gly Phe Asn Phe Pro
    130                 135                 140

Gly Arg Gly Thr Thr Tyr Ser Asn Phe Lys Trp Gln Trp Phe His Phe
145                 150                 155                 160

Asp Gly Thr Asp Trp Asp Gln Ser Arg Ser Leu Ser Arg Ile Phe Lys
                165                 170                 175

Phe Arg Gly Thr Gly Lys Ala Trp Asp Trp Glu Val Ser Ser Glu Asn
            180                 185                 190

Gly Asn Tyr Asp Tyr Leu Met Tyr Ala Asp Ile Asp Tyr Asp His Pro
        195                 200                 205

Asp Val Val Asn Glu Met Lys Lys Trp Gly Val Trp Tyr Ala Asn Glu
    210                 215                 220

Val Gly Leu Asp Gly Tyr Arg Leu Asp Ala Val Lys His Ile Lys Phe
225                 230                 235                 240

Ser Phe Leu Lys Asp Trp Val Asp Asn Ala Arg Ala Ala Thr Gly Lys
                245                 250                 255

Glu Met Phe Thr Val Gly Glu Tyr Trp Gln Asn Asp Leu Gly Ala Leu
            260                 265                 270

Asn Asn Tyr Leu Ala Lys Val Asn Tyr Asn Gln Ser Leu Phe Asp Ala
        275                 280                 285

Pro Leu His Tyr Asn Phe Tyr Ala Ala Ser Thr Gly Gly Gly Tyr Tyr
    290                 295                 300

Asp Met Arg Asn Ile Leu Asn Asn Thr Leu Val Ala Ser Asn Pro Thr
305                 310                 315                 320

Lys Ala Val Thr Leu Val Glu Asn His Asp Thr Gln Pro Gly Gln Ser
                325                 330                 335
```

```
Leu Glu Ser Thr Val Gln Pro Trp Phe Lys Pro Leu Ala Tyr Ala Phe
            340                 345                 350

Ile Leu Thr Arg Ser Gly Gly Tyr Pro Ser Val Phe Tyr Gly Asp Met
        355                 360                 365

Tyr Gly Thr Lys Gly Thr Thr Thr Arg Glu Ile Pro Ala Leu Lys Ser
    370                 375                 380

Lys Ile Glu Pro Leu Leu Lys Ala Arg Lys Asp Tyr Ala Tyr Gly Thr
385                 390                 395                 400

Gln Arg Asp Tyr Ile Asp Asn Pro Asp Val Ile Gly Trp Thr Arg Glu
                405                 410                 415

Gly Asp Ser Thr Lys Ala Lys Ser Gly Leu Ala Thr Val Ile Thr Asp
            420                 425                 430

Gly Pro Gly Gly Ser Lys Arg Met Tyr Val Gly Thr Ser Asn Ala Gly
        435                 440                 445

Glu Ile Trp Tyr Asp Leu Thr Gly Asn Arg Thr Asp Lys Ile Thr Ile
    450                 455                 460

Gly Ser Asp Gly Tyr Ala Thr Phe Pro Val Asn Gly Gly Ser Val Ser
465                 470                 475                 480

Val Trp Val Gln Gln
                485


<210> SEQ ID NO 9
<211> LENGTH: 485
<212> TYPE: PRT
<213> ORGANISM: Bacillus sp.

<400> SEQUENCE: 9

His His Asn Gly Thr Asn Gly Thr Met Met Gln Tyr Phe Glu Trp Tyr
1               5                   10                  15

Leu Pro Asn Asp Gly Asn His Trp Asn Arg Leu Asn Ser Asp Ala Ser
            20                  25                  30

Asn Leu Lys Ser Lys Gly Ile Thr Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Arg Ser Gln Leu Gln Ala Ala Val Thr Ser Leu Lys Asn Asn Gly
                85                  90                  95

Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Thr Gly Glu Tyr Thr Ile Glu Ala Trp Thr Arg Phe Asp
    130                 135                 140

Phe Pro Gly Arg Gly Asn Thr His Ser Ser Phe Lys Trp Arg Trp Tyr
145                 150                 155                 160

His Phe Asp Gly Val Asp Trp Asp Gln Ser Arg Arg Leu Asn Asn Arg
                165                 170                 175

Ile Tyr Lys Phe Arg Gly His Gly Lys Ala Trp Asp Trp Glu Val Asp
            180                 185                 190

Thr Glu Asn Gly Asn Tyr Asp Tyr Leu Met Tyr Ala Asp Ile Asp Met
        195                 200                 205

Asp His Pro Glu Val Val Asn Glu Leu Arg Asn Trp Gly Val Trp Tyr
```

```
    210                 215                 220

Thr Asn Thr Leu Gly Leu Asp Gly Phe Arg Ile Asp Ala Val Lys His
225                 230                 235                 240

Ile Lys Tyr Ser Phe Thr Arg Asp Trp Ile Asn His Val Arg Ser Ala
                245                 250                 255

Thr Gly Lys Asn Met Phe Ala Val Ala Glu Phe Trp Lys Asn Asp Leu
            260                 265                 270

Gly Ala Ile Glu Asn Tyr Leu Gln Lys Thr Asn Trp Asn His Ser Val
        275                 280                 285

Phe Asp Val Pro Leu His Tyr Asn Leu Tyr Asn Ala Ser Lys Ser Gly
    290                 295                 300

Gly Asn Tyr Asp Met Arg Asn Ile Phe Asn Gly Thr Val Val Gln Arg
305                 310                 315                 320

His Pro Ser His Ala Val Thr Phe Val Asp Asn His Asp Ser Gln Pro
                325                 330                 335

Glu Glu Ala Leu Glu Ser Phe Val Glu Glu Trp Phe Lys Pro Leu Ala
            340                 345                 350

Tyr Ala Leu Thr Leu Thr Arg Glu Gln Gly Tyr Pro Ser Val Phe Tyr
        355                 360                 365

Gly Asp Tyr Tyr Gly Ile Pro Thr His Gly Val Pro Ala Met Arg Ser
    370                 375                 380

Lys Ile Asp Pro Ile Leu Glu Ala Arg Gln Lys Tyr Ala Tyr Gly Lys
385                 390                 395                 400

Gln Asn Asp Tyr Leu Asp His His Asn Ile Ile Gly Trp Thr Arg Glu
                405                 410                 415

Gly Asn Thr Ala His Pro Asn Ser Gly Leu Ala Thr Ile Met Ser Asp
            420                 425                 430

Gly Ala Gly Gly Ser Lys Trp Met Phe Val Gly Arg Asn Lys Ala Gly
        435                 440                 445

Gln Val Trp Ser Asp Ile Thr Gly Asn Arg Thr Gly Thr Val Thr Ile
    450                 455                 460

Asn Ala Asp Gly Trp Gly Asn Phe Ser Val Asn Gly Gly Ser Val Ser
465                 470                 475                 480

Ile Trp Val Asn Lys
                485


<210> SEQ ID NO 10
<211> LENGTH: 483
<212> TYPE: PRT
<213> ORGANISM: Bacillus sp.

<400> SEQUENCE: 10

His His Asn Gly Thr Asn Gly Thr Met Met Gln Tyr Phe Glu Trp Tyr
1               5                   10                  15

Leu Pro Asn Asp Gly Asn His Trp Asn Arg Leu Asn Ser Asp Ala Ser
            20                  25                  30

Asn Leu Lys Ser Lys Gly Ile Thr Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Arg Ser Gln Leu Gln Ala Ala Val Thr Ser Leu Lys Asn Asn Gly
                85                  90                  95
```

```
Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Thr Gly Glu Tyr Thr Ile Glu Ala Trp Thr Arg Phe Asp
    130                 135                 140

Phe Pro Gly Arg Gly Asn Thr His Ser Ser Phe Lys Trp Arg Trp Tyr
145                 150                 155                 160

His Phe Asp Gly Val Asp Trp Asp Gln Ser Arg Arg Leu Asn Asn Arg
                165                 170                 175

Ile Tyr Lys Phe Arg Gly Lys Ala Trp Asp Trp Glu Val Asp Thr Glu
            180                 185                 190

Asn Gly Asn Tyr Asp Tyr Leu Met Tyr Ala Asp Ile Asp Met Asp His
        195                 200                 205

Pro Glu Val Val Asn Glu Leu Arg Asn Trp Gly Val Trp Tyr Thr Asn
    210                 215                 220

Thr Leu Gly Leu Asp Gly Phe Arg Ile Asp Ala Val Lys His Ile Lys
225                 230                 235                 240

Tyr Ser Phe Thr Arg Asp Trp Ile Asn His Val Arg Ser Ala Thr Gly
                245                 250                 255

Lys Asn Met Phe Ala Val Ala Glu Phe Trp Lys Asn Asp Leu Gly Ala
            260                 265                 270

Ile Glu Asn Tyr Leu Gln Lys Thr Asn Trp Asn His Ser Val Phe Asp
        275                 280                 285

Val Pro Leu His Tyr Asn Leu Tyr Asn Ala Ser Lys Ser Gly Gly Asn
    290                 295                 300

Tyr Asp Met Arg Asn Ile Phe Asn Gly Thr Val Val Gln Arg His Pro
305                 310                 315                 320

Ser His Ala Val Thr Phe Val Asp Asn His Asp Ser Gln Pro Glu Glu
                325                 330                 335

Ala Leu Glu Ser Phe Val Glu Glu Trp Phe Lys Pro Leu Ala Tyr Ala
            340                 345                 350

Leu Thr Leu Thr Arg Glu Gln Gly Tyr Pro Ser Val Phe Tyr Gly Asp
        355                 360                 365

Tyr Tyr Gly Ile Pro Thr His Gly Val Pro Ala Met Arg Ser Lys Ile
    370                 375                 380

Asp Pro Ile Leu Glu Ala Arg Gln Lys Tyr Ala Tyr Gly Pro Gln His
385                 390                 395                 400

Asp Tyr Leu Asp His Pro Asp Val Ile Gly Trp Thr Arg Glu Gly Asp
                405                 410                 415

Ser Ser His Pro Lys Ser Gly Leu Ala Thr Leu Ile Thr Asp Gly Pro
            420                 425                 430

Gly Gly Ser Lys Arg Met Tyr Ala Gly Leu Lys Asn Ala Gly Glu Thr
        435                 440                 445

Trp Tyr Asp Ile Thr Gly Asn Arg Ser Asp Thr Val Lys Ile Gly Ser
    450                 455                 460

Asp Gly Trp Gly Glu Phe His Val Asn Asp Gly Ser Val Ser Ile Tyr
465                 470                 475                 480

Val Gln Lys
```

<210> SEQ ID NO 11
<211> LENGTH: 485
<212> TYPE: PRT
<213> ORGANISM: Bacillus sp.

<400> SEQUENCE: 11

His His Asn Gly Thr Asn Gly Thr Met Met Gln Tyr Phe Glu Trp Tyr
1 5 10 15

Leu Pro Asn Asp Gly Asn His Trp Asn Arg Leu Arg Ser Asp Ala Ser
20 25 30

Asn Leu Lys Asp Lys Gly Ile Thr Ala Val Trp Ile Pro Pro Ala Trp
35 40 45

Lys Gly Ala Ser Gln Asn Asp Val Gly Tyr Gly Ala Tyr Asp Leu Tyr
50 55 60

Asp Leu Gly Glu Phe Asn Gln Lys Gly Thr Val Arg Thr Lys Tyr Gly
65 70 75 80

Thr Arg Asn Gln Leu Gln Ala Ala Val Thr Ala Leu Lys Ser Asn Gly
85 90 95

Ile Gln Val Tyr Gly Asp Val Val Met Asn His Lys Gly Gly Ala Asp
100 105 110

Ala Thr Glu Trp Val Arg Ala Val Glu Val Asn Pro Ser Asn Arg Asn
115 120 125

Gln Glu Val Ser Gly Asp Tyr Thr Ile Glu Ala Trp Thr Lys Phe Asp
130 135 140

Phe Pro Gly Arg Gly Asn Thr His Ser Asn Phe Lys Trp Arg Trp Tyr
145 150 155 160

His Phe Asp Gly Val Asp Trp Asp Gln Ser Arg Gln Leu Gln Asn Arg
165 170 175

Ile Tyr Lys Phe Arg Gly Asp Gly Lys Gly Trp Asp Trp Glu Val Asp
180 185 190

Thr Glu Asn Gly Asn Tyr Asp Tyr Leu Met Tyr Ala Asp Ile Asp Met
195 200 205

Asp His Pro Glu Val Val Asn Glu Leu Arg Asn Trp Gly Val Trp Tyr
210 215 220

Thr Asn Thr Leu Gly Leu Asp Gly Phe Arg Ile Asp Ala Val Lys His
225 230 235 240

Ile Lys Tyr Ser Phe Thr Arg Asp Trp Leu Thr His Val Arg Asn Thr
245 250 255

Thr Gly Lys Asn Met Phe Ala Val Ala Glu Phe Trp Lys Asn Asp Ile
260 265 270

Gly Ala Ile Glu Asn Tyr Leu Ser Lys Thr Asn Trp Asn His Ser Val
275 280 285

Phe Asp Val Pro Leu His Tyr Asn Leu Tyr Asn Ala Ser Arg Ser Gly
290 295 300

Gly Asn Tyr Asp Met Arg Gln Ile Phe Asn Gly Thr Val Val Gln Arg
305 310 315 320

His Pro Thr His Ala Val Thr Phe Val Asp Asn His Asp Ser Gln Pro
325 330 335

Glu Glu Ala Leu Glu Ser Phe Val Glu Glu Trp Phe Lys Pro Leu Ala
340 345 350

Cys Ala Leu Thr Leu Thr Arg Asp Gln Gly Tyr Pro Ser Val Phe Tyr
355 360 365

Gly Asp Tyr Tyr Gly Ile Pro Thr His Gly Val Pro Ala Met Lys Ser
370 375 380

Lys Ile Asp Pro Ile Leu Glu Ala Arg Gln Lys Tyr Ala Tyr Gly Lys
385 390 395 400

Gln Asn Asp Tyr Leu Asp His His Asn Met Ile Gly Trp Thr Arg Glu

```
                405                 410                 415

Gly Asn Thr Ala His Pro Asn Ser Gly Leu Ala Thr Ile Met Ser Asp
            420                 425                 430

Gly Pro Gly Gly Asn Lys Trp Met Tyr Val Gly Arg Asn Lys Ala Gly
        435                 440                 445

Gln Val Trp Arg Asp Ile Thr Gly Asn Arg Ser Gly Thr Val Thr Ile
    450                 455                 460

Asn Ala Asp Gly Trp Gly Asn Phe Ser Val Asn Gly Gly Ser Val Ser
465                 470                 475                 480

Ile Trp Val Asn Asn
                485


<210> SEQ ID NO 12
<211> LENGTH: 483
<212> TYPE: PRT
<213> ORGANISM: Bacillus licheniformis

<400> SEQUENCE: 12

Ala Asn Leu Asn Gly Thr Leu Met Gln Tyr Phe Glu Trp Tyr Met Pro
1               5                   10                  15

Asn Asp Gly Gln His Trp Arg Arg Leu Gln Asn Asp Ser Ala Tyr Leu
            20                  25                  30

Ala Glu His Gly Ile Thr Ala Val Trp Ile Pro Pro Ala Tyr Lys Gly
        35                  40                  45

Thr Ser Gln Ala Asp Val Gly Tyr Gly Ala Tyr Asp Leu Tyr Asp Leu
    50                  55                  60

Gly Glu Phe His Gln Lys Gly Thr Val Arg Thr Lys Tyr Gly Thr Lys
65                  70                  75                  80

Gly Glu Leu Gln Ser Ala Ile Lys Ser Leu His Ser Arg Asp Ile Asn
                85                  90                  95

Val Tyr Gly Asp Val Val Ile Asn His Lys Gly Gly Ala Asp Ala Thr
            100                 105                 110

Glu Asp Val Thr Ala Val Glu Val Asp Pro Ala Asp Arg Asn Arg Val
        115                 120                 125

Ile Ser Gly Glu His Leu Ile Lys Ala Trp Thr His Phe His Phe Pro
    130                 135                 140

Gly Arg Gly Ser Thr Tyr Ser Asp Phe Lys Trp His Trp Tyr His Phe
145                 150                 155                 160

Asp Gly Thr Asp Trp Asp Glu Ser Arg Lys Leu Asn Arg Ile Tyr Lys
                165                 170                 175

Phe Gln Gly Lys Ala Trp Asp Trp Glu Val Ser Asn Glu Asn Gly Asn
            180                 185                 190

Tyr Asp Tyr Leu Met Tyr Ala Asp Ile Asp Tyr Asp His Pro Asp Val
        195                 200                 205

Ala Ala Glu Ile Lys Arg Trp Gly Thr Trp Tyr Ala Asn Glu Leu Gln
    210                 215                 220

Leu Asp Gly Phe Arg Leu Asp Ala Val Lys His Ile Lys Phe Ser Phe
225                 230                 235                 240

Leu Arg Asp Trp Val Asn His Val Arg Glu Lys Thr Gly Lys Glu Met
                245                 250                 255

Phe Thr Val Ala Glu Tyr Trp Gln Asn Asp Leu Gly Ala Leu Glu Asn
            260                 265                 270

Tyr Leu Asn Lys Thr Asn Phe Asn His Ser Val Phe Asp Val Pro Leu
        275                 280                 285
```

His Tyr Gln Phe His Ala Ala Ser Thr Gln Gly Gly Gly Tyr Asp Met
    290                 295                 300

Arg Lys Leu Leu Asn Gly Thr Val Val Ser Lys His Pro Leu Lys Ser
305                 310                 315                 320

Val Thr Phe Val Asp Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Asp Ser Gln Arg Glu Ile Pro Ala Leu Lys His Lys Ile
    370                 375                 380

Glu Pro Ile Leu Lys Ala Arg Lys Gln Tyr Ala Tyr Gly Ala Gln His
385                 390                 395                 400

Asp Tyr Phe Asp His His Asp Ile Val Gly Trp Thr Arg Glu Gly Asp
                405                 410                 415

Ser Ser Val Ala Asn Ser Gly Leu Ala Ala Leu Ile Thr Asp Gly Pro
            420                 425                 430

Gly Gly Ala Lys Arg Met Tyr Val Gly Arg Gln Asn Ala Gly Glu Thr
        435                 440                 445

Trp His Asp Ile Thr Gly Asn Arg Ser Glu Pro Val Val Ile Asn Ser
    450                 455                 460

Glu Gly Trp Gly Glu Phe His Val Asn Gly Gly Ser Val Ser Ile Tyr
465                 470                 475                 480

Val Gln Arg

<210> SEQ ID NO 13
<211> LENGTH: 481
<212> TYPE: PRT
<213> ORGANISM: Artificial
<220> FEATURE:
<223> OTHER INFORMATION: Synthetic construct

<400> SEQUENCE: 13

Val Asn Gly Thr Leu Met Gln Tyr Phe Glu Trp Tyr Thr Pro Asn Asp
1               5                   10                  15

Gly Gln His Trp Lys Arg Leu Gln Asn Asp Ala Glu His Leu Ser Asp
            20                  25                  30

Ile Gly Ile Thr Ala Val Trp Ile Pro Pro Ala Tyr Lys Gly Thr Ser
        35                  40                  45

Gln Ala Asp Val Gly Tyr Gly Ala Tyr Asp Leu Tyr Asp Leu Gly Glu
    50                  55                  60

Phe His Gln Lys Gly Thr Val Arg Thr Lys Tyr Gly Thr Lys Gly Glu
65                  70                  75                  80

Leu Gln Ser Ala Ile Lys Ser Leu His Ser Arg Asp Ile Asn Val Tyr
                85                  90                  95

Gly Asp Val Val Ile Asn His Lys Gly Gly Ala Asp Ala Thr Glu Asp
            100                 105                 110

Val Thr Ala Val Glu Val Asp Pro Ala Asp Arg Asn Arg Val Ile Ser
        115                 120                 125

Gly Glu His Leu Ile Lys Ala Trp Thr His Phe His Phe Pro Gly Arg
    130                 135                 140

Gly Ser Thr Tyr Ser Asp Phe Lys Trp His Trp Tyr His Phe Asp Gly
145                 150                 155                 160

Thr Asp Trp Asp Glu Ser Arg Lys Leu Asn Arg Ile Tyr Lys Phe Gln

```
                165                 170                 175

Gly Lys Ala Trp Asp Trp Glu Val Ser Asn Glu Asn Gly Asn Tyr Asp
            180                 185                 190

Tyr Leu Met Tyr Ala Asp Ile Asp Tyr Asp His Pro Asp Val Ala Ala
        195                 200                 205

Glu Ile Lys Arg Trp Gly Thr Trp Tyr Ala Asn Glu Leu Gln Leu Asp
    210                 215                 220

Gly Phe Arg Leu Asp Ala Val Lys His Ile Lys Phe Ser Phe Leu Arg
225                 230                 235                 240

Asp Trp Val Asn His Val Arg Glu Lys Thr Gly Lys Glu Met Phe Thr
                245                 250                 255

Val Ala Glu Tyr Trp Gln Asn Asp Leu Gly Ala Leu Glu Asn Tyr Leu
            260                 265                 270

Asn Lys Thr Asn Phe Asn His Ser Val Phe Asp Val Pro Leu His Tyr
        275                 280                 285

Gln Phe His Ala Ala Ser Thr Gln Gly Gly Gly Tyr Asp Met Arg Lys
    290                 295                 300

Leu Leu Asn Gly Thr Val Val Ser Lys His Pro Leu Lys Ser Val Thr
305                 310                 315                 320

Phe Val Asp Asn His Asp Thr Gln Pro Gly Gln Ser Leu Glu Ser Thr
                325                 330                 335

Val Gln Thr Trp Phe Lys Pro Leu Ala Tyr Ala Phe Ile Leu Thr Arg
            340                 345                 350

Glu Ser Gly Tyr Pro Gln Val Phe Tyr Gly Asp Met Tyr Gly Thr Lys
        355                 360                 365

Gly Asp Ser Gln Arg Glu Ile Pro Ala Leu Lys His Lys Ile Glu Pro
    370                 375                 380

Ile Leu Lys Ala Arg Lys Gln Tyr Ala Tyr Gly Ala Gln His Asp Tyr
385                 390                 395                 400

Phe Asp His His Asp Ile Val Gly Trp Thr Arg Glu Gly Asp Ser Ser
                405                 410                 415

Val Ala Asn Ser Gly Leu Ala Ala Leu Ile Thr Asp Gly Pro Gly Gly
            420                 425                 430

Ala Lys Arg Met Tyr Val Gly Arg Gln Asn Ala Gly Glu Thr Trp His
        435                 440                 445

Asp Ile Thr Gly Asn Arg Ser Glu Pro Val Val Ile Asn Ser Glu Gly
    450                 455                 460

Trp Gly Glu Phe His Val Asn Gly Gly Ser Val Ser Ile Tyr Val Gln
465                 470                 475                 480

Arg


<210> SEQ ID NO 14
<211> LENGTH: 485
<212> TYPE: PRT
<213> ORGANISM: Artificial
<220> FEATURE:
<223> OTHER INFORMATION: Synthetic construct

<400> SEQUENCE: 14

His His Asp Gly Thr Asn Gly Thr Ile Met Gln Tyr Phe Glu Trp Asn
1               5                   10                  15

Val Pro Asn Asp Gly Gln His Trp Asn Arg Leu His Asn Asn Ala Gln
            20                  25                  30

Asn Leu Lys Asn Ala Gly Ile Thr Ala Ile Trp Ile Pro Pro Ala Trp
        35                  40                  45
```

-continued

```
Lys Gly Thr Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Lys Ala Glu Leu Glu Arg Ala Ile Arg Ser Leu Lys Ala Asn Gly
                85                  90                  95

Ile Gln Val Tyr Gly Asp Val Val Met Asn His Lys Gly Gly Ala Asp
            100                 105                 110

Phe Thr Glu Arg Val Gln Ala Val Glu Val Asn Pro Gln Asn Arg Asn
        115                 120                 125

Gln Glu Val Ser Gly Thr Tyr Gln Ile Glu Ala Trp Thr Gly Phe Asn
    130                 135                 140

Phe Pro Gly Arg Gly Asn Gln His Ser Ser Phe Lys Trp Arg Trp Tyr
145                 150                 155                 160

His Phe Asp Gly Thr Asp Trp Asp Gln Ser Arg Gln Leu Ala Asn Arg
                165                 170                 175

Ile Tyr Lys Phe Arg Gly Asp Gly Lys Ala Trp Asp Trp Glu Val Asp
            180                 185                 190

Thr Glu Asn Gly Asn Tyr Asp Tyr Leu Met Tyr Ala Asp Val Asp Met
        195                 200                 205

Asp His Pro Glu Val Ile Asn Glu Leu Asn Arg Trp Gly Val Trp Tyr
    210                 215                 220

Ala Asn Thr Leu Asn Leu Asp Gly Phe Arg Leu Asp Ala Val Lys His
225                 230                 235                 240

Ile Lys Phe Ser Phe Met Arg Asp Trp Leu Gly His Val Arg Gly Gln
                245                 250                 255

Thr Gly Lys Asn Leu Phe Ala Val Ala Glu Tyr Trp Lys Asn Asp Leu
            260                 265                 270

Gly Ala Leu Glu Asn Tyr Leu Ser Lys Thr Asn Trp Thr Met Ser Ala
        275                 280                 285

Phe Asp Val Pro Leu His Tyr Asn Leu Tyr Gln Ala Ser Asn Ser Ser
    290                 295                 300

Gly Asn Tyr Asp Met Arg Asn Leu Leu Asn Gly Thr Leu Val Gln Arg
305                 310                 315                 320

His Pro Ser His Ala Val Thr Phe Val Asp Asn His Asp Thr Gln Pro
                325                 330                 335

Gly Glu Ala Leu Glu Ser Phe Val Gln Gly Trp Phe Lys Pro Leu Ala
            340                 345                 350

Tyr Ala Thr Ile Leu Thr Arg Glu Gln Gly Tyr Pro Gln Val Phe Tyr
        355                 360                 365

Gly Asp Tyr Tyr Gly Ile Pro Ser Asp Gly Val Pro Ser Tyr Arg Gln
    370                 375                 380

Gln Ile Asp Pro Leu Leu Lys Ala Arg Gln Gln Tyr Ala Tyr Gly Thr
385                 390                 395                 400

Gln His Asp Tyr Leu Asp Asn Gln Asp Val Ile Gly Trp Thr Arg Glu
                405                 410                 415

Gly Asp Ser Ala His Ala Gly Ser Gly Leu Ala Thr Val Met Ser Asp
            420                 425                 430

Gly Pro Gly Gly Ser Lys Thr Met Tyr Val Gly Thr Ala His Ala Gly
        435                 440                 445

Gln Val Phe Lys Asp Ile Thr Gly Asn Arg Thr Asp Thr Val Thr Ile
    450                 455                 460
```

Asn Ser Ala Gly Asn Gly Thr Phe Pro Cys Asn Gly Gly Ser Val Ser
465 470 475 480

Ile Trp Val Lys Gln
485

<210> SEQ ID NO 15
<211> LENGTH: 485
<212> TYPE: PRT
<213> ORGANISM: Bacillus sp.

<400> SEQUENCE: 15

His His Asn Gly Thr Asn Gly Thr Met Met Gln Tyr Phe Glu Trp His
1 5 10 15

Leu Pro Asn Asp Gly Asn His Trp Asn Arg Leu Arg Asp Asp Ala Ala
20 25 30

Asn Leu Lys Ser Lys Gly Ile Thr Ala Val Trp Ile Pro Pro Ala Trp
35 40 45

Lys Gly Thr Ser Gln Asn Asp Val Gly Tyr Gly Ala Tyr Asp Leu Tyr
50 55 60

Asp Leu Gly Glu Phe Asn Gln Lys Gly Thr Val Arg Thr Lys Tyr Gly
65 70 75 80

Thr Arg Ser Gln Leu Gln Gly Ala Val Thr Ser Leu Lys Asn Asn Gly
85 90 95

Ile Gln Val Tyr Gly Asp Val Val Met Asn His Lys Gly Gly Ala Asp
100 105 110

Gly Thr Glu Met Val Asn Ala Val Glu Val Asn Arg Ser Asn Arg Asn
115 120 125

Gln Glu Ile Ser Gly Glu Tyr Thr Ile Glu Ala Trp Thr Lys Phe Asp
130 135 140

Phe Pro Gly Arg Gly Asn Thr His Ser Asn Phe Lys Trp Arg Trp Tyr
145 150 155 160

His Phe Asp Gly Thr Asp Trp Asp Gln Ser Arg Gln Leu Gln Asn Lys
165 170 175

Ile Tyr Lys Phe Arg Gly Thr Gly Lys Ala Trp Asp Trp Glu Val Asp
180 185 190

Ile Glu Asn Gly Asn Tyr Asp Tyr Leu Met Tyr Ala Asp Ile Asp Met
195 200 205

Asp His Pro Glu Val Ile Asn Glu Leu Arg Asn Trp Gly Val Trp Tyr
210 215 220

Thr Asn Thr Leu Asn Leu Asp Gly Phe Arg Ile Asp Ala Val Lys His
225 230 235 240

Ile Lys Tyr Ser Tyr Thr Arg Asp Trp Leu Thr His Val Arg Asn Thr
245 250 255

Thr Gly Lys Pro Met Phe Ala Val Ala Glu Phe Trp Lys Asn Asp Leu
260 265 270

Ala Ala Ile Glu Asn Tyr Leu Asn Lys Thr Ser Trp Asn His Ser Val
275 280 285

Phe Asp Val Pro Leu His Tyr Asn Leu Tyr Asn Ala Ser Asn Ser Gly
290 295 300

Gly Tyr Phe Asp Met Arg Asn Ile Leu Asn Gly Ser Val Val Gln Lys
305 310 315 320

His Pro Ile His Ala Val Thr Phe Val Asp Asn His Asp Ser Gln Pro
325 330 335

Gly Glu Ala Leu Glu Ser Phe Val Gln Ser Trp Phe Lys Pro Leu Ala
340 345 350

```
Tyr Ala Leu Ile Leu Thr Arg Glu Gln Gly Tyr Pro Ser Val Phe Tyr
        355                 360                 365

Gly Asp Tyr Tyr Gly Ile Pro Thr His Gly Val Pro Ser Met Lys Ser
    370                 375                 380

Lys Ile Asp Pro Leu Leu Gln Ala Arg Gln Thr Tyr Ala Tyr Gly Thr
385                 390                 395                 400

Gln His Asp Tyr Phe Asp His His Asp Ile Ile Gly Trp Thr Arg Glu
                405                 410                 415

Gly Asp Ser Ser His Pro Asn Ser Gly Leu Ala Thr Ile Met Ser Asp
            420                 425                 430

Gly Pro Gly Gly Asn Lys Trp Met Tyr Val Gly Lys His Lys Ala Gly
        435                 440                 445

Gln Val Trp Arg Asp Ile Thr Gly Asn Arg Ser Gly Thr Val Thr Ile
    450                 455                 460

Asn Ala Asp Gly Trp Gly Asn Phe Thr Val Asn Gly Gly Ala Val Ser
465                 470                 475                 480

Val Trp Val Lys Gln
                485


<210> SEQ ID NO 16
<211> LENGTH: 480
<212> TYPE: PRT
<213> ORGANISM: Bacillus sp.

<400> SEQUENCE: 16

Asp Gly Leu Asn Gly Thr Met Met Gln Tyr Tyr Glu Trp His Leu Glu
1               5                   10                  15

Asn Asp Gly Gln His Trp Asn Arg Leu His Asp Asp Ala Ala Ala Leu
            20                  25                  30

Ser Asp Ala Gly Ile Thr Ala Ile Trp Ile Pro Pro Ala Tyr Lys Gly
        35                  40                  45

Asn Ser Gln Ala Asp Val Gly Tyr Gly Ala Tyr Asp Leu Tyr Asp Leu
    50                  55                  60

Gly Glu Phe Asn Gln Lys Gly Thr Val Arg Thr Lys Tyr Gly Thr Lys
65                  70                  75                  80

Ala Gln Leu Glu Arg Ala Ile Gly Ser Leu Lys Ser Asn Asp Ile Asn
                85                  90                  95

Val Tyr Gly Asp Val Val Met Asn His Lys Met Gly Ala Asp Phe Thr
            100                 105                 110

Glu Ala Val Gln Ala Val Gln Val Asn Pro Thr Asn Arg Trp Gln Asp
        115                 120                 125

Ile Ser Gly Ala Tyr Thr Ile Asp Ala Trp Thr Gly Phe Asp Phe Ser
    130                 135                 140

Gly Arg Asn Asn Ala Tyr Ser Asp Phe Lys Trp Arg Trp Phe His Phe
145                 150                 155                 160

Asn Gly Val Asp Trp Asp Gln Arg Tyr Gln Glu Asn His Ile Phe Arg
                165                 170                 175

Phe Ala Asn Thr Asn Trp Asn Trp Arg Val Asp Glu Glu Asn Gly Asn
            180                 185                 190

Tyr Asp Tyr Leu Leu Gly Ser Asn Ile Asp Phe Ser His Pro Glu Val
        195                 200                 205

Gln Asp Glu Leu Lys Asp Trp Gly Ser Trp Phe Thr Asp Glu Leu Asp
    210                 215                 220

Leu Asp Gly Tyr Arg Leu Asp Ala Ile Lys His Ile Pro Phe Trp Tyr
```

```
225                 230                 235                 240

Thr Ser Asp Trp Val Arg His Gln Arg Asn Glu Ala Asp Gln Asp Leu
                245                 250                 255

Phe Val Val Gly Glu Tyr Trp Lys Asp Asp Val Gly Ala Leu Glu Phe
            260                 265                 270

Tyr Leu Asp Glu Met Asn Trp Glu Met Ser Leu Phe Asp Val Pro Leu
        275                 280                 285

Asn Tyr Asn Phe Tyr Arg Ala Ser Gln Gln Gly Gly Ser Tyr Asp Met
    290                 295                 300

Arg Asn Ile Leu Arg Gly Ser Leu Val Glu Ala His Pro Met His Ala
305                 310                 315                 320

Val Thr Phe Val Asp Asn His Asp Thr Gln Pro Gly Glu Ser Leu Glu
                325                 330                 335

Ser Trp Val Ala Asp Trp Phe Lys Pro Leu Ala Tyr Ala Thr Ile Leu
            340                 345                 350

Thr Arg Glu Gly Gly Tyr Pro Asn Val Phe Tyr Gly Asp Tyr Tyr Gly
        355                 360                 365

Ile Pro Asn Asp Asn Ile Ser Ala Lys Lys Asp Met Ile Asp Glu Leu
    370                 375                 380

Leu Asp Ala Arg Gln Asn Tyr Ala Tyr Gly Thr Gln His Asp Tyr Phe
385                 390                 395                 400

Asp His Trp Asp Val Val Gly Trp Thr Arg Glu Gly Ser Ser Ser Arg
                405                 410                 415

Pro Asn Ser Gly Leu Ala Thr Ile Met Ser Asn Gly Pro Gly Gly Ser
            420                 425                 430

Lys Trp Met Tyr Val Gly Arg Gln Asn Ala Gly Gln Thr Trp Thr Asp
        435                 440                 445

Leu Thr Gly Asn Asn Gly Ala Ser Val Thr Ile Asn Gly Asp Gly Trp
    450                 455                 460

Gly Glu Phe Phe Thr Asn Gly Gly Ser Val Ser Val Tyr Val Asn Gln
465                 470                 475                 480


<210> SEQ ID NO 17
<211> LENGTH: 483
<212> TYPE: PRT
<213> ORGANISM: B.stearothermophilus

<400> SEQUENCE: 17

Ala Pro Phe Asn Gly Thr Met Met Gln Tyr Phe Glu Trp Tyr Leu Pro
1               5                   10                  15

Asp Asp Gly Thr Leu Trp Thr Lys Val Ala Asn Glu Ala Asn Asn Leu
            20                  25                  30

Ser Ser Leu Gly Ile Thr Ala Leu Trp Leu Pro Pro Ala Tyr Lys Gly
        35                  40                  45

Thr Ser Arg Ser Asp Val Gly Tyr Gly Val Tyr Asp Leu Tyr Asp Leu
    50                  55                  60

Gly Glu Phe Asn Gln Lys Gly Thr Val Arg Thr Lys Tyr Gly Thr Lys
65                  70                  75                  80

Ala Gln Tyr Leu Gln Ala Ile Gln Ala Ala His Ala Ala Gly Met Gln
                85                  90                  95

Val Tyr Ala Asp Val Val Phe Asp His Lys Gly Gly Ala Asp Gly Thr
            100                 105                 110

Glu Trp Val Asp Ala Val Glu Val Asn Pro Ser Asp Arg Asn Gln Glu
        115                 120                 125
```

```
Ile Ser Gly Thr Tyr Gln Ile Gln Ala Trp Thr Lys Phe Asp Phe Pro
    130                 135                 140

Gly Arg Gly Asn Thr Tyr Ser Ser Phe Lys Trp Arg Trp Tyr His Phe
145                 150                 155                 160

Asp Gly Val Asp Trp Asp Glu Ser Arg Lys Leu Ser Arg Ile Tyr Lys
                165                 170                 175

Phe Arg Gly Ile Gly Lys Ala Trp Asp Trp Glu Val Asp Thr Glu Asn
            180                 185                 190

Gly Asn Tyr Asp Tyr Leu Met Tyr Ala Asp Leu Asp Met Asp His Pro
        195                 200                 205

Glu Val Val Thr Glu Leu Lys Asn Trp Gly Lys Trp Tyr Val Asn Thr
    210                 215                 220

Thr Asn Ile Asp Gly Phe Arg Leu Asp Ala Val Lys His Ile Lys Phe
225                 230                 235                 240

Ser Phe Phe Pro Asp Trp Leu Ser Tyr Val Arg Ser Gln Thr Gly Lys
                245                 250                 255

Pro Leu Phe Thr Val Gly Glu Tyr Trp Ser Tyr Asp Ile Asn Lys Leu
            260                 265                 270

His Asn Tyr Ile Thr Lys Thr Asn Gly Thr Met Ser Leu Phe Asp Ala
        275                 280                 285

Pro Leu His Asn Lys Phe Tyr Thr Ala Ser Lys Ser Gly Gly Ala Phe
    290                 295                 300

Asp Met Arg Thr Leu Met Thr Asn Thr Leu Met Lys Asp Gln Pro Thr
305                 310                 315                 320

Leu Ala Val Thr Phe Val Asp Asn His Asp Thr Glu Pro Gly Gln Ala
                325                 330                 335

Leu Gln Ser Trp Val Asp Pro Trp Phe Lys Pro Leu Ala Tyr Ala Phe
            340                 345                 350

Ile Leu Thr Arg Gln Glu Gly Tyr Pro Cys Val Phe Tyr Gly Asp Tyr
        355                 360                 365

Tyr Gly Ile Pro Gln Tyr Asn Ile Pro Ser Leu Lys Ser Lys Ile Asp
    370                 375                 380

Pro Leu Leu Ile Ala Arg Arg Asp Tyr Ala Tyr Gly Thr Gln His Asp
385                 390                 395                 400

Tyr Leu Asp His Ser Asp Ile Ile Gly Trp Thr Arg Glu Gly Val Thr
                405                 410                 415

Glu Lys Pro Gly Ser Gly Leu Ala Ala Leu Ile Thr Asp Gly Pro Gly
            420                 425                 430

Gly Ser Lys Trp Met Tyr Val Gly Lys Gln His Ala Gly Lys Val Phe
        435                 440                 445

Tyr Asp Leu Thr Gly Asn Arg Ser Asp Thr Val Thr Ile Asn Ser Asp
    450                 455                 460

Gly Trp Gly Glu Phe Lys Val Asn Gly Gly Ser Val Ser Val Trp Val
465                 470                 475                 480

Pro Arg Lys


<210> SEQ ID NO 18
<211> LENGTH: 483
<212> TYPE: PRT
<213> ORGANISM: B.amyloliquefacience

<400> SEQUENCE: 18

Val Asn Gly Thr Leu Met Gln Tyr Phe Glu Trp Tyr Thr Pro Asn Asp
1               5                   10                  15
```

```
Gly Gln His Trp Lys Arg Leu Gln Asn Asp Ala Glu His Leu Ser Asp
            20                  25                  30

Ile Gly Ile Thr Ala Val Trp Ile Pro Pro Ala Tyr Lys Gly Leu Ser
        35                  40                  45

Gln Ser Asp Asn Gly Tyr Gly Pro Tyr Asp Leu Tyr Asp Leu Gly Glu
    50                  55                  60

Phe Gln Gln Lys Gly Thr Val Arg Thr Lys Tyr Gly Thr Lys Ser Glu
65                  70                  75                  80

Leu Gln Asp Ala Ile Gly Ser Leu His Ser Arg Asn Val Gln Val Tyr
                85                  90                  95

Gly Asp Val Val Leu Asn His Lys Ala Gly Ala Asp Ala Thr Glu Asp
            100                 105                 110

Val Thr Ala Val Glu Val Asn Pro Ala Asn Arg Asn Gln Glu Thr Ser
        115                 120                 125

Glu Glu Tyr Gln Ile Lys Ala Trp Thr Asp Phe Arg Phe Pro Gly Arg
    130                 135                 140

Gly Asn Thr Tyr Ser Asp Phe Lys Trp His Trp Tyr His Phe Asp Gly
145                 150                 155                 160

Ala Asp Trp Asp Glu Ser Arg Lys Ile Ser Arg Ile Phe Lys Phe Arg
                165                 170                 175

Gly Glu Gly Lys Ala Trp Asp Trp Glu Val Ser Ser Glu Asn Gly Asn
            180                 185                 190

Tyr Asp Tyr Leu Met Tyr Ala Asp Val Asp Tyr Asp His Pro Asp Val
        195                 200                 205

Val Ala Glu Thr Lys Lys Trp Gly Ile Trp Tyr Ala Asn Glu Leu Ser
    210                 215                 220

Leu Asp Gly Phe Arg Ile Asp Ala Ala Lys His Ile Lys Phe Ser Phe
225                 230                 235                 240

Leu Arg Asp Trp Val Gln Ala Val Arg Gln Ala Thr Gly Lys Glu Met
                245                 250                 255

Phe Thr Val Ala Glu Tyr Trp Gln Asn Asn Ala Gly Lys Leu Glu Asn
            260                 265                 270

Tyr Leu Asn Lys Thr Ser Phe Asn Gln Ser Val Phe Asp Val Pro Leu
        275                 280                 285

His Phe Asn Leu Gln Ala Ala Ser Ser Gln Gly Gly Gly Tyr Asp Met
    290                 295                 300

Arg Arg Leu Leu Asp Gly Thr Val Val Ser Arg His Pro Glu Lys Ala
305                 310                 315                 320

Val Thr Phe Val Glu Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Thr Ser Pro Lys Glu Ile Pro Ser Leu Lys Asp Asn Ile
    370                 375                 380

Glu Pro Ile Leu Lys Ala Arg Lys Glu Tyr Ala Tyr Gly Pro Gln His
385                 390                 395                 400

Asp Tyr Ile Asp His Pro Asp Val Ile Gly Trp Thr Arg Glu Gly Asp
                405                 410                 415

Ser Ser Ala Ala Lys Ser Gly Leu Ala Ala Leu Ile Thr Asp Gly Pro
            420                 425                 430

Gly Gly Ser Lys Arg Met Tyr Ala Gly Leu Lys Asn Ala Gly Glu Thr
```

```
        435                 440                 445

Trp Tyr Asp Ile Thr Gly Asn Arg Ser Asp Thr Val Lys Ile Gly Ser
    450                 455                 460

Asp Gly Trp Gly Glu Phe His Val Asn Asp Gly Ser Val Ser Ile Tyr
465                 470                 475                 480

Val Gln Lys


<210> SEQ ID NO 19
<211> LENGTH: 300
<212> TYPE: PRT
<213> ORGANISM: B. amyloliquefacience

<400> SEQUENCE: 19

Ala Ala Thr Thr Gly Thr Gly Thr Thr Leu Lys Gly Lys Thr Val Ser
1               5                   10                  15

Leu Asn Ile Ser Ser Glu Ser Gly Lys Tyr Val Leu Arg Asp Leu Ser
            20                  25                  30

Lys Pro Thr Gly Thr Gln Ile Ile Thr Tyr Asp Leu Gln Asn Arg Glu
        35                  40                  45

Tyr Asn Leu Pro Gly Thr Leu Val Ser Ser Thr Thr Asn Gln Phe Thr
    50                  55                  60

Thr Ser Ser Gln Arg Ala Ala Val Asp Ala His Tyr Asn Leu Gly Lys
65                  70                  75                  80

Val Tyr Asp Tyr Phe Tyr Gln Lys Phe Asn Arg Asn Ser Tyr Asp Asn
                85                  90                  95

Lys Gly Gly Lys Ile Val Ser Ser Val His Tyr Gly Ser Arg Tyr Asn
            100                 105                 110

Asn Ala Ala Trp Ile Gly Asp Gln Met Ile Tyr Gly Asp Gly Asp Gly
        115                 120                 125

Ser Phe Phe Ser Pro Leu Ser Gly Ser Met Asp Val Thr Ala His Glu
    130                 135                 140

Met Thr His Gly Val Thr Gln Glu Thr Ala Asn Leu Asn Tyr Glu Asn
145                 150                 155                 160

Gln Pro Gly Ala Leu Asn Glu Ser Phe Ser Asp Val Phe Gly Tyr Phe
                165                 170                 175

Asn Asp Thr Glu Asp Trp Asp Ile Gly Glu Asp Ile Thr Val Ser Gln
            180                 185                 190

Pro Ala Leu Arg Ser Leu Ser Asn Pro Thr Lys Tyr Gly Gln Pro Asp
        195                 200                 205

Asn Phe Lys Asn Tyr Lys Asn Leu Pro Asn Thr Asp Ala Gly Asp Tyr
    210                 215                 220

Gly Gly Val His Thr Asn Ser Gly Ile Pro Asn Lys Ala Ala Tyr Asn
225                 230                 235                 240

Thr Ile Thr Lys Ile Gly Val Asn Lys Ala Glu Gln Ile Tyr Tyr Arg
                245                 250                 255

Ala Leu Thr Val Tyr Leu Thr Pro Ser Ser Thr Phe Lys Asp Ala Lys
            260                 265                 270

Ala Ala Leu Ile Gln Ser Ala Arg Asp Leu Tyr Gly Ser Gln Asp Ala
        275                 280                 285

Ala Ser Val Glu Ala Ala Trp Asn Ala Val Gly Leu
    290                 295                 300


<210> SEQ ID NO 20
<211> LENGTH: 300
<212> TYPE: PRT
```

<213> ORGANISM: B. subtilis

<400> SEQUENCE: 20

Ala Ala Ala Thr Gly Ser Gly Thr Thr Leu Lys Gly Ala Thr Val Pro
1 5 10 15

Leu Asn Ile Ser Tyr Glu Gly Gly Lys Tyr Val Leu Arg Asp Leu Ser
20 25 30

Lys Pro Thr Gly Thr Gln Ile Ile Thr Tyr Asp Leu Gln Asn Arg Gln
35 40 45

Ser Arg Leu Pro Gly Thr Leu Val Ser Ser Thr Thr Lys Thr Phe Thr
50 55 60

Ser Ser Ser Gln Arg Ala Ala Val Asp Ala His Tyr Asn Leu Gly Lys
65 70 75 80

Val Tyr Asp Tyr Phe Tyr Ser Asn Phe Lys Arg Asn Ser Tyr Asp Asn
85 90 95

Lys Gly Ser Lys Ile Val Ser Ser Val His Tyr Gly Thr Gln Tyr Asn
100 105 110

Asn Ala Ala Trp Thr Gly Asp Gln Met Ile Tyr Gly Asp Gly Asp Gly
115 120 125

Ser Phe Phe Ser Pro Leu Ser Gly Ser Leu Asp Val Thr Ala His Glu
130 135 140

Met Thr His Gly Val Thr Gln Glu Thr Ala Asn Leu Ile Tyr Glu Asn
145 150 155 160

Gln Pro Gly Ala Leu Asn Glu Ser Phe Ser Asp Val Phe Gly Tyr Phe
165 170 175

Asn Asp Thr Glu Asp Trp Asp Ile Gly Glu Asp Ile Thr Val Ser Gln
180 185 190

Pro Ala Leu Arg Ser Leu Ser Asn Pro Thr Lys Tyr Asn Gln Pro Asp
195 200 205

Asn Tyr Ala Asn Tyr Arg Asn Leu Pro Asn Thr Asp Glu Gly Asp Tyr
210 215 220

Gly Gly Val His Thr Asn Ser Gly Ile Pro Asn Lys Ala Ala Tyr Asn
225 230 235 240

Thr Ile Thr Lys Leu Gly Val Ser Lys Ser Gln Gln Ile Tyr Tyr Arg
245 250 255

Ala Leu Thr Thr Tyr Leu Thr Pro Ser Ser Thr Phe Lys Asp Ala Lys
260 265 270

Ala Ala Leu Ile Gln Ser Ala Arg Asp Leu Tyr Gly Ser Thr Asp Ala
275 280 285

Ala Lys Val Glu Ala Ala Trp Asn Ala Val Gly Leu
290 295 300

<210> SEQ ID NO 21
<211> LENGTH: 269
<212> TYPE: PRT
<213> ORGANISM: Bacillus lentus

<400> SEQUENCE: 21

Ala Gln Ser Val Pro Trp Gly Ile Glu Arg Val Gln Ala Pro Ala Ala
1 5 10 15

His Asn Arg Gly Leu Thr Gly Ser Gly Val Lys Val Ala Val Leu Asp
20 25 30

Thr Gly Ile Ser Thr His Pro Asp Leu Arg Ile Arg Gly Gly Ala Ser
35 40 45

Phe Val Pro Gly Glu Pro Ser Thr Gln Asp Gly Asn Gly His Gly Thr

```
    50                  55                  60

His Val Ala Gly Thr Ile Ala Ala Leu Asp Asn Ser Ile Gly Val Leu
65                  70                  75                  80

Gly Val Ala Pro Ser Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Ile Leu Ser Thr Trp Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Asp Thr Trp Glu
                245                 250                 255

Tyr Gly Ser Gly Leu Val Asn Ala Glu Ala Ala Thr Arg
            260                 265


<210> SEQ ID NO 22
<211> LENGTH: 269
<212> TYPE: PRT
<213> ORGANISM: Bacillus lentus

<400> SEQUENCE: 22

Ala Gln Ser Val Pro Trp Gly Ile Glu Arg Val Gln Ala Pro Ala Ala
1               5                   10                  15

His Asn Arg Gly Leu Thr Gly Ser Gly Val Lys Val Ala Val Leu Asp
            20                  25                  30

Thr Gly Ile Ser Thr His Pro Asp Leu Arg Ile Arg Gly Gly Ala Ser
        35                  40                  45

Phe Val Pro Gly Glu Pro Ser Thr Gln Asp Gly Asn Gly His Gly Thr
    50                  55                  60

His Val Ala Gly Thr Ile Ala Ala Leu Asp Asn Ser Ile Gly Val Leu
65                  70                  75                  80

Gly Val Ala Pro Ser Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
            100                 105                 110

Gly Asn Asn Gly Met His Val Ala Asn Leu Ser Leu Gly Ser Pro Ser
        115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160
```

-continued

```
Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Glu
                245                 250                 255

Tyr Gly Ser Gly Leu Val Asn Ala Glu Ala Ala Thr Arg
            260                 265


<210> SEQ ID NO 23
<211> LENGTH: 275
<212> TYPE: PRT
<213> ORGANISM: B. amyloliquefacience

<400> SEQUENCE: 23

Ala Gln Ser Val Pro Tyr Gly Val Ser Gln Ile Lys Ala Pro Ala Leu
1               5                   10                  15

His Ser Gln Gly Tyr Thr Gly Ser Asn Val Lys Val Ala Val Ile Asp
            20                  25                  30

Ser Gly Ile Asp Ser Ser His Pro Asp Leu Lys Val Ala Gly Gly Ala
        35                  40                  45

Ser Met Val Pro Ser Glu Thr Asn Pro Phe Gln Asp Asn Asn Ser His
    50                  55                  60

Gly Thr His Val Ala Gly Thr Val Ala Ala Leu Asn Asn Ser Ile Gly
65                  70                  75                  80

Val Leu Gly Val Ala Pro Ser Ala Ser Leu Tyr Ala Val Lys Val Leu
                85                  90                  95

Gly Ala Asp Gly Ser Gly Gln Tyr Ser Trp Ile Ile Asn Gly Ile Glu
            100                 105                 110

Trp Ala Ile Ala Asn Asn Met Asp Val Ile Asn Met Ser Leu Gly Gly
        115                 120                 125

Pro Ser Gly Ser Ala Ala Leu Lys Ala Ala Val Asp Lys Ala Val Ala
    130                 135                 140

Ser Gly Val Val Val Val Ala Ala Ala Gly Asn Glu Gly Thr Ser Gly
145                 150                 155                 160

Ser Ser Ser Thr Val Gly Tyr Pro Gly Lys Tyr Pro Ser Val Ile Ala
                165                 170                 175

Val Gly Ala Val Asp Ser Ser Asn Gln Arg Ala Ser Phe Ser Ser Val
            180                 185                 190

Gly Pro Glu Leu Asp Val Met Ala Pro Gly Val Ser Ile Gln Ser Thr
        195                 200                 205

Leu Pro Gly Asn Lys Tyr Gly Ala Tyr Asn Gly Thr Ser Met Ala Ser
    210                 215                 220

Pro His Val Ala Gly Ala Ala Ala Leu Ile Leu Ser Lys His Pro Asn
225                 230                 235                 240

Trp Thr Asn Thr Gln Val Arg Ser Ser Leu Glu Asn Thr Thr Thr Lys
                245                 250                 255
```

-continued

```
Leu Gly Asp Ser Phe Tyr Tyr Gly Lys Gly Leu Ile Asn Val Gln Ala
            260                 265                 270

Ala Ala Gln
        275
```

DETERGENT COMPOSITION COMPRISING PROTEASE AND AMYLASE VARIANTS

CROSS-REFERENCE TO RELATED APPLICATIONS

This application is a divisional of U.S. Ser. No. 15/771,759, filed Apr. 27, 2018 which is a 35 U.S.C. 371 national application of international application no. PCT/EP2016/076155 filed Oct. 28, 2016, which claims priority or the benefit under 35 U.S.C. 119 of European application no. 15191879.4 filed Oct. 28, 2015, the contents of which are fully incorporated herein by reference.

REFERENCE TO A SEQUENCE LISTING

This application comprises a Sequence Listing in computer readable form, which is incorporated herein by reference.

BACKGROUND OF THE INVENTION

Field of the Invention

The present invention relates to novel compositions comprising amylase variants and a protease or protease variants, wherein the respective variants exhibit modifications relative to the parent amylase and parent protease, respectively, in one or more properties including: wash performance, detergent stability and/or storage stability. The compositions of the invention are suitable as e.g. cleaning or detergent compositions, such as laundry detergent compositions and dish wash compositions, including automatic dish wash and manual dish washing compositions.

Description of the Related Art

Enzymes have been used within the detergent industry as part of washing formulations for many decades. Alpha-amylases are from a commercial perspective one of the most relevant enzymes in such formulations, but other enzymes including protease, lipases, additional amylases, cellulases, hemicellulases or mixtures of enzymes are also often used. To improve the cost and/or the performance of enzymes there is an ongoing search for enzymes with altered properties, such as increased activity at low temperatures, increased stability in e.g. the presence of chelators, increased specific activity at a given pH, altered $Ca^{2+}$ dependency, increased stability in the presence of other detergent ingredients (e.g. bleach, surfactants etc.) etc. For instance alpha-amylases have typically been alpha-amylases from *Bacillus licheniformis*, also known as Termamyl. Other alpha-amylases may also be used.

Proteases, which are often used in detergents, are from the family of subtilases. This family has previously been further grouped into 6 different sub-groups by Siezen R J and Leunissen J A M, 1997, Protein Science, 6, 501-523. One of these sub-groups is the Subtilisin family which includes subtilases such as BPN', and subtilisin 309 (SAVINASE®, Novozymes A/S), subtilisin Carlsberg (ALCALASE®, Novozymes A/S). Another protease, TY145, which is also a subtilase from *Bacillus* sp. TY145, NCIMB 40339, was first described in WO 92/17577 (Novozymes A/S) and in the later application WO2004/067737 (Novozymes A/S) disclosing the three-dimensional structure and the use of protein engineering to alter functionality of a TY-145 subtilase.

Detergent compositions have been described, but there is a continued need for improved detergent compositions, wherein the enzymes remain the activity and stability within the detergent compositions in the presence of the detergent component, such as the bleaching system or chelators. Thus, it is an objective of the present invention to provide such detergent compositions.

SUMMARY OF THE INVENTION

The present invention relates to a detergent composition comprising (i) at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and (ii) at least one protease having protease activity, wherein said protease is selected from the group of:

(a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 2, 3, 19, 20, or 23;

(b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2;

(c) a protease variant comprising an substitution in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, or 216 as compared to the protease in SEQ ID NO:3, wherein said protease variant has at least 75% sequence identity to SEQ ID NO: 3, (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO: 23.

The present invention also relates also to use of the detergent composition according to any one of the embodiments herein described in laundry, manual dishwash or automatic dishwash.

The present invention relates also to a method of laundering, comprising laundering a fabric with a detergent composition according to any one of the embodiments herein described, preferably at a temperature of 40° C. or less, or more preferably at a temperature of 30° C. or less, or even more preferably at a temperature of 20° C. or less.

The present invention relates also to a method of dishwashing in an automatic dishwashing machine using a detergent composition according to any one of the embodiments herein described, comprising the steps of adding said detergent composition in a detergent composition compartment in said automatic dishwashing machine, and releasing said detergent composition during a main-wash cycle.

Overview of Sequences Listing

SEQ ID NO: 1 is the amino acid sequence of an alpha-amylase (AAI10)

SEQ ID NO: 2 is the amino acid sequence of a protease (TY145)

SEQ ID NO: 3 is the amino acid sequence of a protease (Savinase®)

SEQ ID NO: 4 is the amino acid sequence of a lipase (TLL)

SEQ ID NO: 5 is the amino acid sequence of an alpha-amylase (AA560)

SEQ ID NO: 6 is the amino acid sequence of an alpha-amylase (SP722)

SEQ ID NO: 7 is the amino acid sequence of an alpha-amylase (TS23)

SEQ ID NO: 8 is the amino acid sequence of an alpha-amylase (*Cytophaga* sp)

SEQ ID NO: 9 is the amino acid sequence of an alpha-amylase (SP707)

SEQ ID NO: 10 is the amino acid sequence of a fusion alpha-amylase (LASB0000)

SEQ ID NO: 11 is the amino acid sequence of an alpha-amylase (SP.7-7)

SEQ ID NO: 12 is the amino acid sequence of an alpha-amylase (Termamyl)

SEQ ID NO: 13 is the amino acid sequence of a fusion alpha-amylase

SEQ ID NO: 14 is the amino acid sequence of a fusion alpha-amylase (LABM)

SEQ ID NO: 15 is the amino acid sequence of an alpha-amylase (KSM-AP1378)

SEQ ID NO: 16 is the amino acid sequence of an alpha-amylase (KSM-K36/-K38)

SEQ ID NO: 17 is the amino acid sequence of an alpha-amylase (BSG)

SEQ ID NO: 18 is the amino acid sequence of an alpha-amylase (BAN)

SEQ ID NO: 19 is the amino acid sequence of a protease (Neutrase)

SEQ ID NO: 20 is the amino acid sequence of a protease (Metalloprotease)

SEQ ID NO: 21 is the amino acid sequence of a protease variant (Protease 2)

SEQ ID NO: 22 is the amino acid sequence of a protease variant (Protease 3)

SEQ ID NO: 23 is the amino acid sequence of a protease (BPN')

Definitions

The term "improved property" when referring to an alpha-amylase variant herein, refers to a characteristic associated with an alpha-amylase variant that is improved compared to the parent alpha-amylase, e.g. a parent alpha-amylase having the sequence of SEQ ID NO: 1, 5, 6, 7, 8, 9, 10, 11, 12, 13, 14, 15, 16, 17, or 18, or compared to an alpha-amylase having the identical amino acid sequence of said variant but not having the alteration at one or more of said specified positions. Such improved properties include, but are not limited to, wash performance, alpha-amylase activity, thermal activity profile, thermostability, pH activity profile, pH stability, substrate specificity, improved surface properties, product specificity, increased stability, improved stability under storage conditions, and chemical stability.

The term "improved alpha-amylase activity" is defined herein as an altered alpha-amylase activity (as defined above), e.g., by increased polysaccharide conversion of an alpha-amylase variant displaying an alteration of the activity relative (or compared) to the activity of the parent alpha-amylase, or compared to an alpha-amylase with SEQ ID NO: 1, 5, 6, 7, 8, 9, 10, 11, 12, 13, 14, 15, 16, 17, or 18, or relative to an alpha-amylase having the identical amino acid sequence of said alpha-amylase variant but not having the alterations at one or more of said specified positions.

The term "improved property" when referring to a protease variant herein, means a characteristic associated with a variant that is improved compared to the parent or compared to a protease with SEQ ID NO: 2, 3, 19, 20, or 23, or compared to a protease having the identical amino acid sequence of said variant but not having the alterations at one or more of said specified positions. Such improved properties include, but are not limited to, wash performance, protease activity, thermal activity profile, thermostability, pH activity profile, pH stability, substrate/cofactor specificity, improved surface properties, product specificity, increased stability, improved stability under storage conditions, and chemical stability.

The term "improved protease activity" is defined herein as an altered protease activity (as defined above) e.g. by increased protein conversion of a protease variant displaying an alteration of the activity relative (or compared) to the activity of the parent protease, or compared to a protease with SEQ ID NO: 2, 3, 19, 20, or 23, or relative to a protease having the identical amino acid sequence of said protease variant but not having the alterations at one or more of said specified positions.

The term "stability" includes storage stability and stability during use, e.g. during a wash process and reflects the stability of the protease variant according to the invention as a function of time e.g. how much activity is retained when the protease variant is kept in solution in particular in a detergent solution. The stability is influenced by many factors e.g. pH, temperature, detergent composition e.g. amount of builder, surfactants etc.

The term "improved stability" or "increased stability" is defined herein as a variant being either a protease variant, lipase variant, or an alpha-amylase variant displaying an increased stability in solutions, relative to the stability of the parent protease, parent lipase, or parent alpha-amylase, respectively, relative to a protease, lipase, or an alpha-amylase having the identical amino acid sequence of said variant but not having the alterations at one or more of said specified positions or relative to SEQ ID NO: 1, 2, 3, 4, 5, 6, 7, 8, 9, 10, 11, 12, 13, 14, 15, 16, 17, 18, 19, 20, or 23 depending on which parent polypeptide the variant has been derived from. The terms "improved stability" and "increased stability" includes "improved chemical stability", "detergent stability" or "improved detergent stability. Enzyme stability may be measured as described in the Examples.

The term "improved chemical stability" is defined herein as a variant enzyme displaying retention of enzymatic activity after a period of incubation in the presence of a chemical or chemicals, either naturally occurring or synthetic, which reduces the enzymatic activity of the parent enzyme. Improved chemical stability may also result in variants being more able to catalyze a reaction in the presence of such chemicals. In a particular aspect of the invention the improved chemical stability is an improved stability in a detergent, in particular in a liquid detergent. The term "detergent stability" or "improved detergent stability" is in particular an improved stability of the enzyme activity when a enzyme variant is mixed into a liquid detergent formulation, especially into a liquid detergent formulation according to table 1 and then stored at temperatures between 15 and 50° C., e.g. 20° C., 30° C. or 40° C. for at least one week.

The term "improved thermal activity" means a variant displaying an altered temperature-dependent activity profile at a specific temperature relative to the temperature-dependent activity profile of the parent or relative to a polypeptide of SEQ ID NO: 1, 2, 3, 4, 5, 6, 7, 8, 9, 10, 11, 12, 13, 14, 15, 16, 17, 18, 19, 20, or 23. The thermal activity value provides a measure of the variant's efficiency in enhancing catalysis of a hydrolysis reaction over a range of temperatures.

The term "improved wash performance" is defined herein as a variant displaying an improved wash performance relative to the wash performance of the parent enzyme, relative to a polypeptide of SEQ ID NO: 1, 2, 3, 4, 5, 6, 7, 8, 9, 10, 11, 12, 13, 14, 15, 16, 17, 18, 19, 20, or 23, or relative to an enzyme having the identical amino acid sequence of said variant but not having the alterations at one or more of said specified positions e.g. by increased stain removal. The term "wash performance" includes wash performance in laundry but also e.g. in dishwash. The wash performance may be quantified as described under the definition of "wash performance" herein.

The term "fabric" or "garment" as used herein, refers to any textile material. Thus, it is intended that the term encompass garments, as well as fabrics, yarns, fibers, non-woven materials, natural materials, synthetic materials, and any other textile material.

The term "textile" as used herein, refers to woven fabrics, as well as staple fibers and filaments suitable for conversion to or use as yarns, woven, knit, and non-woven fabrics. The term encompasses yarns made from natural, as well as synthetic (e.g., manufactured) fibers. The term, "textile materials" is a general term for fibers, yarn intermediates, yarn, fabrics, and products made from fabrics (e.g., garments and other articles).

The term "non-fabric detergent compositions" include non-textile surface detergent compositions, including but not limited to compositions for hard surface cleaning, such as dishwashing detergent compositions, oral detergent compositions, denture detergent compositions, and personal cleansing compositions.

The term "effective amount of enzyme" refers to the quantity of enzyme necessary to achieve the enzymatic activity required in the specific application, e.g., in a defined detergent composition. Such effective amounts are readily ascertained by one of ordinary skill in the art and are based on many factors, such as the particular enzyme used, the cleaning application, the specific composition of the detergent composition, and whether a liquid or dry (e.g., granular, bar) composition is required, and the like. The term "effective amount" of a variant refers to the quantity of variant described hereinbefore that achieves a desired level of enzymatic activity, e.g., in a defined detergent composition. In one embodiment, the effective amount of a protease variant is the same effective amount of an alpha-amylase, such as an alpha-amylase variant. In another embodiment, the effective amount of a protease variant is different than the effective amount of an alpha-amylase, such as an alpha-amylase variant, e.g., the effective amount of a protease variant may be more or may be less than the effective amount of an alpha-amylase, such as an alpha-amylase variant.

The term "water hardness" or "degree of hardness" or "dH" or "° dH" as used herein refers to German degrees of hardness. One degree is defined as 10 milligrams of calcium oxide per litre of water.

The term "relevant washing conditions" is used herein to indicate the conditions, particularly washing temperature, time, washing mechanics, detergent concentration, type of detergent and water hardness, actually used in households in a detergent market segment.

The term "adjunct materials" means any liquid, solid or gaseous material selected for the particular type of detergent composition desired and the form of the product (e.g., liquid, granule, powder, bar, paste, spray, tablet, gel, or foam composition), which materials are also preferably compatible with the enzymes used in the composition. In some embodiments, granular compositions are in "compact" form, while in other embodiments, the liquid compositions are in a "concentrated" form.

The term "stain removing enzyme" as used herein, describes an enzyme that aids the removal of a stain or soil from a fabric or a hard surface. Stain removing enzymes act on specific substrates, e.g., protease on protein, amylase on starch, lipase and cutinase on lipids (fats and oils), pectinase on pectin and hemicellulases on hemicellulose. Stains are often depositions of complex mixtures of different components which either results in a local discolouration of the material by itself or which leaves a sticky surface on the object which may attract soils dissolved in the washing liquor thereby resulting in discolouration of the stained area. When an enzyme acts on its specific substrate present in a stain the enzyme degrades or partially degrades its substrate thereby aiding the removal of soils and stain components associated with the substrate during the washing process. For example, when a protease acts on a grass stain it degrades the protein components in the grass and allows the green/brown colour to be released during washing.

The term "reduced amount" means in this context that the amount of the component is smaller than the amount which would be used in a reference process under otherwise the same conditions. In a preferred embodiment the amount is reduced by, e.g., at least 5%, such as at least 10%, at least 15%, at least 20% or as otherwise herein described.

The term "low detergent concentration" system includes detergents where less than about 800 ppm of detergent components is present in the wash water. Asian, e.g., Japanese detergents are typically considered low detergent concentration systems.

The term "medium detergent concentration" system includes detergents wherein between about 800 ppm and about 2000 ppm of detergent components is present in the wash water. North American detergents are generally considered to be medium detergent concentration systems.

The term "high detergent concentration" system includes detergents wherein greater than about 2000 ppm of detergent components is present in the wash water. European detergents are generally considered to be high detergent concentration systems.

Conventions for Designation of Variants

For purposes of the present invention, the polypeptides disclosed in SEQ ID NO: 1, 2, 3, 4, 5, 6, 7, 8, 9, 10, 11, 12, 13, 14, 15, 16, 17, 18, 19, 20, or 23 may be used to determine the corresponding amino acid residue in another polypeptide. The amino acid sequence of another polypeptide is aligned with the polypeptide disclosed in SEQ ID NO: 1, 2, 3, 4, 5, 6, 7, 8, 9, 10, 11, 12, 13, 14, 15, 16, 17, 18, 19, 20, or 23 depending on whether it is an alpha-amylase, a protease or a lipase, and based on the alignment, the amino acid position number corresponding to any amino acid residue in the polypeptide disclosed in SEQ ID NO: 1, 2, 3, 4, 5, 6, 7, 8, 9, 10, 11, 12, 13, 14, 15, 16, 17, 18, 19, 20, or 23 is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix.

Identification of the corresponding amino acid residue in another enzyme may be determined by an alignment of multiple polypeptide sequences using several computer programs including, but not limited to, MUSCLE (multiple sequence comparison by log-expectation; version 3.5 or later; Edgar, 2004, *Nucleic Acids Research* 32: 1792-1797), MAFFT (version 6.857 or later; Katoh and Kuma, 2002, *Nucleic Acids Research* 30: 3059-3066; Katoh et al., 2005, *Nucleic Acids Research* 33: 511-518; Katoh and Toh, 2007, *Bioinformatics* 23: 372-374; Katoh et al., 2009, *Methods in Molecular Biology* 537:_39-64; Katoh and Toh, 2010, *Bioinformatics* 26:_1899-1900), and EMBOSS EMMA employing ClustalW (1.83 or later; Thompson et al., 1994, *Nucleic Acids Research* 22: 4673-4680), using their respective default parameters.

When the other enzyme has diverged from the polypeptide of SEQ ID NO: 1, 2, 3, 4, 5, 6, 7, 8, 9, 10, 11, 12, 13, 14, 15, 16, 17, 18, 19, 20, or 23 such that traditional sequence-based comparison fails to detect their relationship (Lindahl and Elofsson, 2000, *J. Mol. Biol.* 295: 613-615), other pairwise sequence comparison algorithms may be used. Greater sensitivity in sequence-based searching can be attained using search programs that utilize probabilistic representations of polypeptide families (profiles) to search databases. For example, the PSI-BLAST program generates profiles through an iterative database search process and is capable of detecting remote homologs (Atschul et al., 1997, *Nucleic Acids Res.* 25: 3389-3402). Even greater sensitivity can be achieved if the family or superfamily for the polypeptide has one or more representatives in the protein structure databases. Programs such as GenTHREADER (Jones, 1999, *J. Mol. Biol.* 287: 797-815; McGuffin and Jones, 2003, *Bioinformatics* 19: 874-881) utilize information from a variety of sources (PSI-BLAST, secondary structure prediction, structural alignment profiles, and solvation potentials) as input to a neural network that predicts the structural fold for a query sequence. Similarly, the method of Gough et al., 2000, *J. Mol. Biol.* 313: 903-919, can be used to align a sequence of unknown structure with the superfamily models present in the SCOP database. These alignments can in turn be used to generate homology models for the polypeptide, and such models can be assessed for accuracy using a variety of tools developed for that purpose.

For proteins of known structure, several tools and resources are available for retrieving and generating structural alignments. For example the SCOP super families of proteins have been structurally aligned, and those alignments are accessible and downloadable. Two or more protein structures can be aligned using a variety of algorithms such as the distance alignment matrix (Holm and Sander, 1998, *Proteins* 33: 88-96) or combinatorial extension (Shindyalov and Bourne, 1998, *Protein Engineering* 11: 739-747), and implementation of these algorithms can additionally be utilized to query structure databases with a structure of interest in order to discover possible structural homologs (e.g., Holm and Park, 2000, *Bioinformatics* 16: 566-567).

It is within the knowledge of the skilled person to determine which alignment tool to use when corresponding amino acid positions must be identified. Therefore, it is contemplated that any available alignment tool that the skilled person find suitable may be used in the context of the present invention.

In describing the enzyme variants described herein, the nomenclature described below is adapted for ease of reference. The accepted IUPAC single letter or three letters amino acid abbreviations are employed. Amino acid positions are indicated with H1, G109, etc.

Variants described herein comprises one or more modifications as compared to the parent polypeptide. Accordingly, variants may comprise conservative modifications, in particular, such conservative modifications may be conservative substitutions. Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, In, *The Proteins*, Academic Press, New York. Common substitutions are Ala/Ser, Val/Ile, Asp/Glu, Asn/Gln, Thr/Ser, Ala/Gly, Ala/Thr, Ser/Asn, Ala/Val, Ser/Gly, Tyr/Phe, Ala/Pro, Lys/Arg, Asp/Asn, Glu/Gln, Leu/Ile, Leu/Val, Ala/Glu, and Asp/Gly.

Alternatively, the amino acid changes are of such a nature that the physico-chemical properties of the polypeptides are altered. For example, amino acid changes may improve the thermal stability of the polypeptide, alter the substrate specificity, change the pH optimum, and the like.

Substitutions: For an amino acid substitution, the following nomenclature is used: Original amino acid, position, substituted amino acid. Accordingly, the substitution of glycine at position G109 with alanine is designated as "Gly109Ala" or "G109A". Multiple mutations are separated by addition marks ("+") or by commas (","), e.g., "Gly109Ala+Leu173Pro" or "G109A,L173P", representing substitutions at positions 109 and 173 of glysine (G) with alanine (A) and leucine (L) with proline (P), respectively. If more than one amino acid may be substituted in a given position these are listed or divided by slash, such as /. Thus, if both Ala and Pro according to the invention may be substituted instead of the amino acid occupying at position 109 this is indicated as X109A/P where the X in the present example indicates that different enzymes may be parent e.g. such as an alpha-amylase with SEQ ID NO: 1 or an alpha-amylase having at least 75% identity hereto. Thus, in some cases the variants are represented as 109A/P or X109A/P indicating that the amino acids to be substituted vary depending on the parent enzyme.

Deletions: For an amino acid deletion, the following nomenclature is used: Original amino acid, position, *. Accordingly, the deletion of arginie at position 181 is designated as "Arg181*" or "R181*". Multiple deletions are separated by addition marks ("+") or commas, e.g., "Arg181*+Gly182*" or "R181*+G182*" or "R181*, G182*".

Insertions: The insertion of an additional amino acid residue such as e.g. a lysine after $G\#_1$ may be indicated by: $Gly\#_1$GlyLys or $G\#_1$GK. Alternatively insertion of an additional amino acid residue such as lysine after G109 may be indicated by: *109aL. When more than one amino acid residue is inserted, such as e.g. a Lys, and Ala after 109 this may be indicated as: Gly109GlyLysAla or G109GKA. In such cases, the inserted amino acid residue(s) may also be numbered by the addition of lower case letters to the position number of the amino acid residue preceding the inserted amino acid residue(s), in this example: *109aK*109bA.

Collectively, substitutions, deletions, and insertions may herein termed "modifications". Thus, it is to be understood that any variant described herein comprises modifications, such as substitutions, deletions and/or insertions unless otherwise indicated by context.

Multiple modifications: Variants comprising multiple modifications are separated by addition marks ("+"), slash marks ("/"), or by commas (","), e.g., "Gly109Pro+Lys391Ala" or "G109P, K391A" representing a substitution of glysine at position 109 and lysine at position 391 with proline and alanine, respectively as described above.

Different modifications: Where different modifications can be introduced at a position, the different modifications are separated by a division ("/"), or by a comma (","), e.g., "Gly109Pro,Lys" or "G109P,K" represents a substitution of glysine at position 109 with proline or lysine. Thus, "Gly109Pro,Lys+Lys391Ala" designates the following variants: "Gly109Pro+Lys391Ala", "Gly109Lys+Lys391Ala" or "G109P,K+K391A".

The skilled person would know that the original amino acid in any position may vary from one parent alpha-amylase to another when aligned. Accordingly, it is to be understood that the skilled person would be able to align any alpha-amylase sequence with the numbering sequence, i.e. SEQ ID NO: 1, of the present invention. However, without limitation of the present invention, the original amino acids are designated to an "X" which would cover all the parent polypeptides. It is thus, to be understood that "X" is listed as a prefix for an amino acid position in the present invention. It is not to be understood in any limiting way.

DETAILED DESCRIPTION OF THE INVENTION

In one aspect, the present invention relates to a detergent composition comprising (i) at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and (ii) at least one protease having protease activity, wherein said protease is selected from the group of:

(a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 2, 3, 19, 20, or 23;

(b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2;

(c) a protease variant comprising a substitution in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3, (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO:23.

The alpha-amylase variants of the detergent composition of the present invention comprising one or more substitution(s) in the defined positions using SEQ ID NO: 1 for numbering have been generated and were tested for stability and performance in a model detergent as described in "Material and Methods" and the inventors demonstrated that one or more substitutions of one or more amino acid at a position corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, and 477 in the polypeptide of SEQ ID NO: 1 or 14 improved the detergent stability and/or performance compared to an alpha-amylase having an amino acid sequence of e.g. SEQ ID NO: 1 and 14 but not having a substitution at one or more of said specified positions or compared to an alpha-amylase with SEQ ID NO: 1. As can be seen from the Examples, the combination of an alpha-amylase variant and a protease variant have a synergistic effect on stain removal, i.e.

improved performance. In one of the Examples herein described, it is also shown that the combination of an alpha-amylase variant and a protease variant has at least the same stability as the variants tested alone.

The term "detergent composition" as used herein, refers to a composition suitable for use as a detergent composition. It is within the knowledge of the skilled person to determine when a composition may be considered as a detergent composition.

The term "alpha-amylase" means an alpha-amylase having alpha-amylase activity, i.e. the activity of alpha-1,4-glucan-4-glucanohydrolases, E.C. 3.2.1.1, which constitute a group of enzymes, catalysing hydrolysis of starch and other linear and branched 1,4-glucosidic oligo- and polysaccharides. For purposes of alpha-amylases present in the detergent compositions of the present invention, alpha-amylase activity may be determined as described in Example 1 below. The alpha-amylases described herein have at least 20%, e.g., at least 40%, at least 50%, at least 60%, at least 70%, at least 80%, at least 90%, at least 95%, or at least 100% of the protease activity of the polypeptide with SEQ ID NO: 1. The terms "alpha-amylase" and "amylase" may be used interchangeably and constitute the same meaning and purpose within the scope of the present invention.

The term "alpha-amylase variant" as used herein, refers to an alpha-amylase having alpha-amylase activity comprising an alteration, i.e., a substitution, insertion, and/or deletion, at one or more (e.g., several) positions as compared to a "parent alpha-amylase". A substitution means a replacement of an amino acid occupying a position with a different amino acid; a deletion means removal of an amino acid occupying a position; and an insertion means adding amino acids e.g. 1 to 10 amino acids, preferably 1-3 amino acids adjacent to an amino acid occupying a position. Amino acid substitutions may exchange a native amino acid for another naturally-occurring amino acid, or for a non-naturally-occurring amino acid derivative. The alpha-amylase variants have at least 20%, e.g., at least 40%, at least 50%, at least 60%, at least 70%, at least 80%, at least 90%, at least 95%, or at least 100% of the alpha-amylase activity of the mature parent alpha-amylase from which they have been derived.

The term "alpha-amylase activity" as used herein, refers to the activity of alpha-1,4-glucan-4-glucanohydrolases, E.C. 3.2.1.1, which constitute a group of enzymes, catalyzing hydrolysis of starch and other linear and branched 1,4-glucosidic oligo- and polysaccharides. Thus, the term "alpha-amylase" as used herein, refers to an enzyme that has alpha-amylase activity (Enzyme Class; EC 3.2.1.1) that hydrolyses alpha bonds of large, alpha-linked polysaccharides, such as starch and glycogen, yielding glucose and maltose. For purposes of the present invention, alpha-amylase activity is determined according to the procedure described in the Examples. In one embodiment, the variants of the present invention have at least 20%, e.g., at least 40%, at least 50%, at least 60%, at least 70%, at least 80%, at least 90%, at least 95%, or at least 100% of the alpha-amylase activity of the polypeptide of SEQ ID NOs: 1, 5, 6, 7, 8, 9, 10, 11, 12, 13, 14, 15, 16, 17, or 18.

The term "protease" is defined herein as an enzyme that hydrolyses peptide bonds. It includes any enzyme belonging to the EC 3.4 enzyme group (including each of the thirteen subclasses thereof). The EC number refers to Enzyme Nomenclature 1992 from NC-IUBMB, Academic Press, San Diego, Calif., including supplements 1-5 published in Eur. J. Biochem. 1994, 223, 1-5; Eur. J. Biochem. 1995, 232, 1-6; Eur. J. Biochem. 1996, 237, 1-5; Eur. J. Biochem. 1997, 250, 1-6; and Eur. J. Biochem. 1999, 264, 610-650; respectively.

The term "subtilases" refer to a sub-group of serine protease according to Siezen et al., *Protein Engng.* 4 (1991) 719-737 and Siezen et al. *Protein Science* 6 (1997) 501-523. Serine proteases or serine peptidases is a subgroup of proteases characterised by having a serine in the active site, which forms a covalent adduct with the substrate. Further the subtilases (and the serine proteases) are characterised by having two active site amino acid residues apart from the serine, namely a histidine and an aspartic acid residue. The subtilases may be divided into 6 sub-divisions, i.e. the Subtilisin family, the Thermitase family, the Proteinase K family, the Lantibiotic peptidase family, the Kexin family and the Pyrolysin family. The term "protease activity" means a proteolytic activity (EC 3.4). Proteases of the invention are endopeptidases (EC 3.4.21). For purposes of the present invention, protease activity is determined according to the procedure described in Example 1 below. The protease variants described herein have at least 20%, e.g., at least 40%, at least 50%, at least 60%, at least 70%, at least 80%, at least 90%, at least 95%, or at least 100% of the protease activity of the mature polypeptide with SEQ ID NO: 2, 3, 19, 20, or 23.

The term "protease activity" as used herein, refers to the activity of hydrolysis of peptide bonds. For purposes of the present invention, protease activity is determined according to the procedure described in the Examples. In one embodiment, the variants of the present invention have at least 20%, e.g., at least 40%, at least 50%, at least 60%, at least 70%, at least 80%, at least 90%, at least 95%, or at least 100% of the alpha-amylase activity of the polypeptide of SEQ ID NOs: 2, 3, 19, 20, or 23.

The term "protease variant" as used herein, refers to a protease having protease activity comprising an alteration, i.e., a substitution, insertion, and/or deletion, preferably substitution, at one or more (or one or several) positions compared to its parent which is a protease having the identical amino acid sequence of said variant but not having the alterations at one or more of said specified positions.

The term "variant" means a variant that is modified by the hand of man. In one aspect, the variant is at least 1% pure, e.g., at least 5% pure, at least 10% pure, at least 20% pure, at least 40% pure, at least 60% pure, at least 80% pure, and at least 90% pure, as determined by SDS-PAGE.

The term "modification" is described elsewhere herein. The term is a overall designation of the terms "substitution", "insertion", and "deletion" as described herein.

The term "corresponding to" as used herein, refers to way of determining the specific amino acid of a sequence wherein reference is made to a specific amino acid sequence. E.g. for the purposes of the present invention, when references are made to specific amino acid positions, the skilled person would be able to align another amino acid sequence to said amino acid sequence that reference has been made to, in order to determine which specific amino acid may be of interest in said another amino acid sequence. Alignment of another amino acid sequence with e.g. the sequence as set forth in SEQ ID NO: 1, 3, or any other sequence listed herein, has been described elsewhere herein. Alternative alignment methods may be used, and are well-known for the skilled person.

The term "sequence identity" as used herein, refers to the relatedness between two amino acid sequences or between two nucleotide sequences is described by the parameter "sequence identity". For purposes of the present invention, the degree of sequence identity between two amino acid sequences is determined using the Needleman-Wunsch algorithm (Needleman and Wunsch, 1970*, J. Mol. Biol.* 48:

443-453) as implemented in the Needle program of the EMBOSS package (EMBOSS: The European Molecular Biology Open Software Suite, Rice et al., 2000, *Trends Genet.* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−Total Number of Gaps in Alignment)

Preferably, the detergent composition according to the present invention, constitutes a composition comprising at least one alpha-amylase variant and at least one protease variant, which have an improved stability and/or wash performance as compared to the parent alpha-amylase or protease, respectively.

Thus, the invention relates to a detergent composition, wherein the at least one alpha-amylase comprises one or more amino acid modifications in the positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein the alpha-amylase variant has at least 75% sequence identity to the parent alpha-amylase of SEQ ID NOs: 1, 5, 6, 7, 8, 9, 10, 11, 12, 13, 14, 15, 16, 17, or 18, e.g., at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95, at least 96%, at least 97%, at least 98%, but less than 100% sequence identity to the parent alpha-amylase of SEQ ID NOs: 1, 5, 6, 7, 8, 9, 10, 11, 12, 13, 14, 15, 16, 17, or 18, and the at least one protease variant comprises a substitution of one or more amino acids in the loop corresponding to positions 171, 173, 175, 179, or 180 of SEQ ID NO: 2, wherein the protease variant has at least 75% sequence identity to the parent protease of SEQ ID NO: 2, e.g., at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95, at least 96%, at least 97%, at least 98%, but less than 100% sequence identity to the parent protease of SEQ ID NO: 2, or comprises a substitution of one or more amino acid in the positions corresponding to 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 of SEQ ID NO: 3, wherein the protease variant has at least 75% sequence identity to the parent protease of SEQ ID NO: 3, e.g., at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95, at least 96%, at least 97%, at least 98%, but less than 100% sequence identity to the parent protease of SEQ ID NO: 3, or comprises a substitution in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269 of SEQ ID NO: 3, wherein the protease variant has at least 60% sequence identity to the parent protease of SEQ ID NO: 3, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95, at least 96%, at least 97%, at least 98%, but less than 100% sequence identity to the parent protease of SEQ ID NO: 3, wherein numbering is according to SEQ ID NO: 3, wherein said protease variant has at least 60% sequence identity to SEQ ID NO: 3, or comprises a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO:23, e.g. at least 80%, at least 81%, at least 82, at least 83%, at least 84%, at least 85%, at least 86%, at least 87%, at lease 88%, at least 89%, at least 90%, at least 91%, at least 92%, at least 93%, at least 94%, at least 95%, at least 96%, at least 97%, at least 98%, but less than 100% sequence identity to the parent protease of SEQ ID NO: 23.

It is to be understood that in the context of the present invention "an alpha-amylase variant" or "the alpha-amylase variant" means "at least one alpha-amylase variant" unless contradicted by context, e.g. "the one alpha-amylase variant". Thus, the detergent composition according to the invention will in all embodiments comprise at least one alpha-amylase variant. The same applies to the protease or the lipase or any variant thereof. In a particular embodiment, the at least one alpha-amylase variant comprises a modification at two, three, four, five, six, seven, eight, nine, ten, eleven, twelfth, or thirteen positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477, wherein numbering is according to SEQ ID NO: 1.

In one embodiment, the at least one alpha-amylase variant comprises one or more modifications selected from the group consisting of: X1*, X1A, X54S, X56T, X72R, X109A, X113Q, X116Q, X116H, X134E, X140Y, X140F, X140H, X159Y, X159F, X159H, X167Y, X167H, X167F, X169E, X172K, X172G, X172N, X173P, X174*, X174S, X181*, X182*, X183*, X184*, X184T, X189Y, X189F, X189H, X189E, X189D, X189Q, X189N, X194D, X194N, X194S, X195F, X206L, X206F, X206Y, X255A, X260G, X260P, X260A, X260G, X260P, X260A, X265G, X284G, X284H, X289H, X304K, X304R, X304Q, X304E, X305K, X305R, X305Q, X305E, X347Y, X347F, X347H, X391A, X395P, X439N, X439Q, X439T, X444Q, X469T, X469N, X473R, X476R, X476Q, X476E, X476K, X477K, X477R, X477Q, and X477E wherein the positions correspond to positions of SEQ ID NO: 1.

In a particular embodiment, the at least one alpha-amylase variant comprises at two, three, four, five, six, seven, eight, nine, ten, eleven, twelfth, or thirteen of the following modifications X1*, X1A, X54S, X56T, X72R, X109A, X113Q, X116Q, X116H, X134E, X140Y, X140F, X140H, X159Y, X159F, X159H, X167Y, X167H, X167F, X169E, X172K, X172G, X172N, X173P, X174*, X174S, X181*, X182*, X183*, X184*, X184T, X189Y, X189F, X189H, X189E, X189D, X189Q, X189N, X194D, X194N, X194S, X195F, X206L, X206F, X206Y, X255A, X260G, X260P, X260A, X260G, X260P, X260A, X265G, X284G, X284H, X289H, X304K, X304R, X304Q, X304E, X305K, X305R, X305Q, X305E, X347Y, X347F, X347H, X391A, X395P, X439N, X439Q, X439T, X444Q, X469T, X469N, X473R, X476R, X476Q, X476E, X476K, X477K, X477R, X477Q, or X477E, wherein numbering of the positions is according to SEQ ID NO: 1, and wherein the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e. g. at least 99.1%, at least 99.2%, at least 99.3%, at least 99.4%, at least 99.5%, at least 99.6, or 100% sequence identity to SEQ ID NO: 1 and 14.

In a preferred embodiment, the at least one alpha-amylase variant comprises a deletion and/or a substitution at two or more positions corresponding to positions 181, 182, 183, or 184 of SEQ ID NO: 1, wherein the alpha-amylase variant has at least 75% sequence identity to SEQ ID NO: 1, such as at least 71%, at least 72%, at least 73%, at least 74%, at least 75%, at least 80%, at least 85%, at least 90%, at least 95%, at least 96%, at least 97%, at least 98%, or at least 99%, e. g. at least 99.1%, at least 99.2%, at least 99.3%, at least 99.4%, at least 99.5%, at least 99.6, but less than 100%.

Thus, in one embodiment, the at least one alpha-amylase variant comprises a deletion in the positions corresponding to 181+182; 181+183; 181+184; 182+183; 182+184; or 183+184 of SEQ ID NO:1.

In a particular embodiment, the at least one alpha-amylase variant comprises a one or more of the following modifications: X1*, X1A, X54S, X56T, X72R, X109A, X113Q, X116Q, X116H, X134E, X140Y, X140F, X140H, X159Y, X159F, X159H, X167Y, X167H, X167F, X169E, X172K, X172G, X172N, X173P, X174*, X174S, X181*, X182*, X183*, X184*, X184T, X189Y, X189F, X189H, X189E, X189D, X189Q, X189N, X194D, X194N, X194S, X195F, X206L, X206F, X206Y, X255A, X260G, X260P, X260A, X260G, X260P, X260A, X265G, X284G, X284H, X289H, X304K, X304R, X304Q, X304E, X305K, X305R, X305Q, X305E, X347Y, X347F, X347H, X391A, X395P, X439N, X439Q, X439T, X444Q, X469T, X469N, X473R, X476R, X476Q, X476E, X476K, X477K, X477R, X477Q, or X477E and one of the pairwise deletions of X181*+X182*; X181*+X183*; X181*+X184*; X182*+X183*; X182*+X184*; or X183*+X184*; wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e. g. at least 99.1%, at least 99.2%, at least 99.3%, at least 99.4%, at least 99.5%, at least 99.6, or 100% sequence identity to SEQ ID NO: 1 or 14.

In one embodiment, the alpha-amylase variant in (i) is selected from the group consisting of: H1*+N54S+V56T+G109A+Q169E+Q172K+A174*+G182*+D183*+N195F+V206L+K391A+G476K; H1*+N54S+V56T+G109A+R116H+A174S+G182*+D183*+N195F+V206L+K391A+G476K; H1*+N54S+V56T+K72R+G109A+F113Q+R116Q+W167F+Q172G+A174S+G182*+D183*+G184T+N195F+V206L+K391A+P473R+G476K; H1*+N54S+V56T+G109A+F113Q+R116Q+Q172N+A174S+G182*+D183*+N195F+V206L+A265G+K391A+P473R+G476K; H1*+N54S+V56T+K72R+G109A+F113Q+W167F+Q172R+A174S+G182*+D183*+N195F+V206L+K391A+G476K; H1*+N54S+V56T+K72R+G109A+R116H+T134E+W167F+Q172G+L173V+A174S+G182*+D183*+N195F+V206L+G255A+K391A+G476K; H1*+N54S+V56T+K72R+G109A+R116H+T134E+W167F+Q172G+L173V+A174S+G182*+D183*+N195F+V206L+G255A+K391A+Q395P+T444Q+P473R+G476K; H1*+N54S+V56T+G109A+T134E+A174S+G182*+D183*+N195F+V206L+K391A+G476K; H1*+N54S+V56T+K72R+G109A+A174S+G182*+D183*+N195F+V206L+G255A+K391A+G476K; and H1*+N54S+V56T+G109A+W167F+Q172E+L173P+A174K+G182*+D183*+N195F+V206L+K391A+G476K, wherein said alpha-amylase variant shares at least 80%, such as at least 85%, such as at least 90%, such as at least 93%, such as at least 94%, such as at least 95%, such as at least 96%, such as at least 97%, such as at least 98%, but less than 100% sequence identity with the polypeptide of SEQ ID NO: 1, 5, 6, 7, 8, 9, 10, 11, 12, 13, 14, 15, 16, 17, or 18, preferably SEQ ID NO: 1 or 14, and wherein said alpha-amylase variant has alpha-amylase activity.

In one embodiment, the alpha-amylase variant in (i) is a variant of SEQ ID NO: 1 or SWQ ID NO: 14 comprising the following modifications:

H1*+N54S+V56T+G109A+Q169E+Q172K+A174*+G182*+D183*+N195F+V206L+K391A+G476K; H1*+N54S+V56T+G109A+R116H+A174S+G182*+D183*+N195F+V206L+K391A+G476K;

H1*+N54S+V56T+K72R+G109A+F113Q+R116Q+W167F+Q172G+A174S+G182*+D183*+G184T+N195F+V206L+K391A+P473R+G476K;

H1*+N54S+V56T+G109A+F113Q+R116Q+Q172N+A174S+G182*+D183*+N195F+V206L+A265G+K391A+P473R+G476K;

H1*+N54S+V56T+K72R+G109A+F113Q+W167F+Q172R+A174S+G182*+D183*+N195F+V206L+K391A+G476K;

H1*+N54S+V56T+K72R+G109A+R116H+T134E+W167F+Q172G+L173V+A174S+G182*+D183*+N195F+V206L+G255A+K391A+G476K;

H1*+N54S+V56T+K72R+G109A+R116H+T134E+W167F+Q172G+L173V+A174S+G182*+D183*+N195F+V206L+G255A+K391A+Q395P+T444Q+P473R+G476K;

H1*+N54S+V56T+G109A+T134E+A174S+G182*+D183*+N195F+V206L+K391A+G476K;

H1*+N54S+V56T+K72R+G109A+A174S+G182*+D183*+N195F+V206L+G255A+K391A+G476K; and

H1*+N54S+V56T+G109A+W167F+Q172E+L173P+A174K+G182*+D183*+N195F+V206L+K391A+G476K, wherein said alpha-amylase variant shares at least 80%, such as at least 85%, such as at least 90%, such as at least 93%, such as at least 94%, such as at least 95%, such as at least 96%, such as at least 97%, such as at least 98%, but less than 100% sequence identity with the polypeptide of SEQ ID NO: 1, or SEQ ID NO: 14, and wherein said alpha-amylase variant has alpha-amylase activity In a particular embodiment, the at least one alpha-amylase variant comprises the modifications H1*+N54S+V56T+G109A+Q169E+Q172K+A174*+G182*+D183*+N195F+

V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, wherein the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+G109A+F113Q+R116Q+Q172G+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+K72R+G109A+R116H+T134E+W167F+Q172G+L173V+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+K72R+G109A+A174S+G182*+D183*+N195F+V206L+G255A+K391A+G476K, wherein numbering according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In a particular embodiment, the at least one alpha-amylase variant comprises the modifications H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14.

In one embodiment, the protease is that of (a) listed above. Accordingly, in one embodiment, the protease is a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 3, 4, 19, 20, or 23.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G476K, wherein numbering is according to SEQ ID NO: 1, wherein the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q 395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K (numbering according to SEQ ID NO: 1), wherein the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 19.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G 476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 20.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G 476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+A174S+G182*+D183*+N195F+V206L+G255A+

K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease having at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In one particular embodiment, the detergent composition comprises at least one protease variant which is a TY-145 (SEQ ID NO: 2) variant comprising a substitution of one or more amino acids in the loop corresponding to positions 171, 173, 175, 179, or 180 of SEQ ID NO: 2. In another embodiment, the at least one protease variant of the detergent composition according to the invention comprises a substitution at two, three, four or five positions corresponding to positions 171, 173, 175, 179, or 180 of SEQ ID NO: 2. One embodiment concerns a detergent composition, wherein the at least one protease variant comprises a substitution of one or more amino acids in the loop corresponding to positions 171, 173, 175, 179, or 180 of SEQ ID NO: 1, wherein the variant has at least 70%, such as at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94% at least 95% identity, at least 96%, at least 97%, at least 98%, or at least 99%, e. g. at least 99.1%, at least 99.2%, at least 99.3%, at least 99.4%, at least 99.5%, at least 99.6, but less than 100%, sequence identity to SEQ ID NO: 2.

In a particular embodiment, the protease is a variant in (b) comprises a substitution in at least one position corresponding to positions 171, 173, 175, 179, or 180, and wherein the amino acid in the position corresponding to position 171 of SEQ ID NO: 2 is selected from the group consisting of W, K, E, D and N, i.e. X171W, X171K, X171E, X171D and X171N; and/or the amino acid in the position corresponding to position 173 of SEQ ID NO: 2 is P; and/or the amino acid in the position corresponding to position 175 of SEQ ID NO: 2 is selected from the group consisting of A, V, and P, i.e. X175A, X175V, and X175P; and/or the amino acid in the position corresponding to position 179 of SEQ ID NO: 2 is selected from the group consisting of C, V, Q, S, T, E, H, K, M, N, Y, and A, i.e. X179C, X179V, X179Q, X179S, X179T, X179E, X179H, X179K, X179M, X179N, X179Y, and X179A; and/or the amino acid in the position corresponding to position 180 of SEQ ID NO: 2 is Y. In a particular embodiment, the protease variant in (b) comprises a substitution selected from S173P, S175P or F180Y wherein the positions correspond to positions of SEQ ID NO: 2.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, wherein the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S173P, S175P, or F180Y (numbering according to SEQ ID NO: 2), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 2.

In one embodiment, the detergent composition comprises at least one protease which is a Savinase (SEQ ID NO: 3) protease.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G 476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T 444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease of SEQ ID NO: 3.

In one embodiment, the detergent composition comprises at least one protease variant which is a Savinase (SEQ ID NO: 3) variant. The Savinase variant is a variant of a parent protease having a sequence identity of at least 70%, such as at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94% at least 95% identity, at least 96%, at least 97%, at least 98%, or at least 99%, e. g. at least 99.1%, at least 99.2%, at least 99.3%, at least 99.4%, at least 99.5%, at least 99.6, but less than 100%, sequence identity to SEQ ID NO: 3.

Thus, in one embodiment, the protease is a protease variant comprising an modification in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3.

In a particular embodiment, the modification in at least one position in said protease variant in (c) is selected from the group consisting of: 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, and 269, wherein numbering is according to SEQ ID NO: 3.

In a preferred embodiment, the protease variant comprises one or more of the following substitutions; X9E, X9R, X15T, X27R, X42R, X52S, X55P, X56P, X59D, X59E, X60D, X60E, X66A, X74D, X85N, X85R, X97A, X97E, X97D, X99E, X99D, X99G, X99N, X99H, X99M, X101A, X1021, X102N, X104A, X116V, X116R, X154D, X156E, X157S, X157D, X157P, X158E, X161A, X164S, X176E, X179E, X182E, X185N, X188P, X198D, X1991, X200L, X203W, X206G, X210V, X211D, X211Q, X211E, X212D, X212E, X212S, X216S, X216A, X230H, X239R, X242D, X250D, X253D, X255W, X255D, X255E, X256E, X256D, and X269H, wherein numbering is according to SEQ ID NO: 3.

In a further preferred embodiment, the protease variant has protease activity and comprises one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+K72R+G109A+F113Q+R116Q+W167F+Q172G+A174S+G182*+D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent compositions comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant is a protease variant of a parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 3.

In a further preferred embodiment, the protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+Q169E+Q172K+A174*+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (1) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises: at least one alpha-amylase variant comprising the following modifications: H1*+N54S+V56T+G109A+R116H+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant comprising one or more of the following substitutions: S9R, A15T, V68A, N218D, or Q245R (numbering according to SEQ ID NO: 3), wherein the protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+F113Q+R116Q+W167F+Q172G+A174S+G182*+

D183*+G184T+N195F+V206L+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (1) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+F113Q+R116Q+Q172N+A174S+G182*+D183*+N195F+V206L+A265G+K391A+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+F113Q+W167F+Q172R+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (1) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent compositions comprises; at least one alpha-amylase variant comprising the following modifications: H1*+N54S+V56T+K72R+

G109A+R116H+T134E+W167F+Q172G+L173V+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+R116H+T134E+W167F+Q172G+L173V+A174S+G182*+D183*+N195F+V206L+G255A+K391A+Q395P+T444Q+P473R+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+T134E+A174S+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+K72R+G109A+A174S+G182*+D183*+N195F+V206L+G255A+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23.

In a particular embodiment, the detergent composition comprises; at least one alpha-amylase variant comprising the following modifications: H1*+N54S+V56T+G109A+W167F+Q172E+L173P+A174K+G182*+D183*+N195F+V206L+K391A+G476K, wherein numbering is according to SEQ ID NO: 1, the alpha-amylase variant is an alpha-amylase variant of a parent alpha-amylase which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 1 and 14; and at least one protease variant has protease activity and is selected from the group consisting of: (a) X9R+X15T+X68A+X218D+X245R; (b) X9R+X15T+X68A+X245R; (c) X61E+X194P+X205I+X261D; (d) X61D+X205I+X245R; (e) X61E+X194P+X205I+X261D; (f) X87N+X118V+X128L+X129Q+X130A; (g) X87N+X101M+X118V+X128L+X129Q+X130A; (h) X76D+X87R+X118R+X128L+X129Q+X130A; (i) X22A+X62D+X101G+X188D+X232V+X245R; (j) X103A+X104I, (k) X22R+X101G+X232V+X245R; (l) X103A+X104I+X156D; (m) X103A+X104I+X261E; (n) X62D+X245R; (o) X101N+X128A+X217Q; (p) X101E+X217Q; (q) X101E+X217D; (r) X9E+X43R+X262E; (s) X76D+X43R+X209W; (t) X205I+X206L+X209W; (u) X185E+X188E+X205I; (v) X256D+X261W+X262E; (w) X191N+X209W; (x) X261E+X262E; (y) X261E+X262D; and (z) X167A+X170S+X194P, wherein the positions corresponds to the positions of SEQ ID NO: 23, and the parent protease which has at least 70%, such as at least 71%, at least 72%, at least 73%, at least 74%, such as at least 75%, e.g., such as at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94%, at least 95%, at least 96%, at least 97%, at least 98%, at least 99% e.g. at least 99.1%, at least 99.2%, at least 99.3%, at least 99.4%, at least 99.5%, at least 99.6, or 100% sequence identity to SEQ ID NO: 23. The detergent composition of the present invention may comprise further additional enzymes. Such additional enzymes may be alpha-amylase, protease, lipase, cellulase, beta-glucanase, or any other enzymes. In particular, the detergent composition further comprises one or more additional enzymes selected from the group of:

(A) an alpha-amylase having the amino acid sequence of SEQ ID NO: 5, or a variant thereof having a sequence identity of at least 75% but less than 100% to SEQ ID NO: 5, and wherein said alpha-amylase variant has alpha-amylase activity;

(B) an alpha-amylase having the amino acid sequence of SEQ ID NO: 6, or a variant thereof having a sequence identity of at least 75% but less than 100% to SEQ ID NO: 6, and wherein said alpha-amylase variant has alpha-amylase activity;

(C) an alpha-amylase having the amino acid sequence of SEQ ID NO: 7, or a variant thereof having a sequence identity of at least 75% but less than 100% to SEQ ID NO: 7, and wherein said alpha-amylase variant has alpha-amylase activity;

(D) an alpha-amylase having the amino acid sequence of SEQ ID NO: 8, or a variant thereof having a sequence identity of at least 75% but less than 100% to SEQ ID NO: 8, and wherein said alpha-amylase variant has alpha-amylase activity;

(E) an alpha-amylase having the amino acid sequence of SEQ ID NO: 9, or a variant thereof having a sequence identity of at least 75% but less than 100% to SEQ ID NO: 9, and wherein said alpha-amylase variant has alpha-amylase activity;

(F) an alpha-amylase having the amino acid sequence of SEQ ID NO: 10, or a variant thereof having a sequence identity of at least 75% but less than 100% to SEQ ID NO: 10, and wherein said alpha-amylase variant has alpha-amylase activity;

(G) an alpha-amylase having the amino acid sequence of SEQ ID NO: 13, or a variant thereof having a sequence identity of at least 75% but less than 100% to SEQ ID NO: 13, and wherein said alpha-amylase variant has alpha-amylase activity;

(H) an alpha-amylase having the amino acid sequence of SEQ ID NO: 14, or a variant thereof having a sequence identity of at least 75% but less than 100% to SEQ ID NO: 14, and wherein said alpha-amylase variant has alpha-amylase activity;

(I) an alpha-amylase having the amino acid sequence of SEQ ID NO: 11, or a variant thereof having a sequence identity of at least 75% but less than 100% to SEQ ID NO: 11, and wherein said alpha-amylase variant has alpha-amylase activity;

(J) an alpha-amylase having the amino acid sequence of SEQ ID NO: 12, or a variant thereof having a sequence identity of at least 75% but less than 100% to SEQ ID NO: 12, and wherein said alpha-amylase variant has alpha-amylase activity;

(K) an alpha-amylase having the amino acid sequence of SEQ ID NO: 15, or a variant thereof having a sequence identity of at least 75% but less than 100% to SEQ ID NO: 15, and wherein said alpha-amylase variant has alpha-amylase activity;

(L) an alpha-amylase having the amino acid sequence of SEQ ID NO: 16, or a variant thereof having a sequence identity of at least 75% but less than 100% to SEQ ID NO: 16, and wherein said alpha-amylase variant has alpha-amylase activity;

(M) an alpha-amylase having the amino acid sequence of SEQ ID NO: 17, or a variant thereof having a sequence identity of at least 75% but less than 100% to SEQ ID NO: 17, and wherein said alpha-amylase variant has alpha-amylase activity;

(N) an alpha-amylase having the amino acid sequence of SEQ ID NO: 18, or a variant thereof having a sequence identity of at least 75% but less than 100% to SEQ ID NO: 18, and wherein said alpha-amylase variant has alpha-amylase activity;

(O) a lipase having the amino acid sequence of SEQ ID NO: 4, or a variant thereof having a sequence identity of at least 75% but less than 100% to SEQ ID NO: 4, and wherein said lipase variant has lipase activity, and (P) a protease having the amino acid sequence of SEQ ID NO: 2, 3, 19, 20, or 23, or a variant thereof having a sequence identity of at least 75% but less than 100% to SEQ ID NO: 2, 3, 19, 20, or 23, and wherein the protease variant has protease activity.

The term "additional enzymes" as used herein, refers to a set of enzymes, that may be further included in the detergent composition of the present invention. Such enzymes may any enzyme that is believed to be useful in the detergent composition of the present invention. Thus, the set of enzymes are not limited to be enzymes which are different from the at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and wherein the at least one protease is selected from the group of: (a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 3, 4, 19, 20, or 23; (b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2; and (c) a protease variant comprising an modification in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3, a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, or a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO: 23, but may be addition of the another variant enzyme falling within the aforementioned definition. However, the set of enzymes (or termed "the additional enzymes") may be different variants of proteases, amylases or any other enzyme class.

The term "lipase" as used herein, refers to a lipase having lipase activity. The lipase defined herein may be a carboxylic ester hydrolase EC 3.1.1,-, which includes activities such as EC 3.1.1.3 triacylglycerol lipase, EC 3.1.1.4 phospholipase A2, EC 3.1.1.5 lysophopholipase, EC 3.1.1.26 galactolipase, EC 3.1.1.32 phospholipase A1, EC 3.1.1.73 feruloyl esterase.

In one embodiment, the additional enzyme is an alpha-amylase variant of a parent alpha-amylase of SEQ ID NO: 5, 6, 7, 8, 9, 10, 11, 12, 13, 14, 15, 16, 17, or 18, and wherein the alpha-amylase variant has alpha-amylase activity. Thus, in one embodiment, the additional alpha-amylase is a variant of a parent alpha-amylase of SEQ ID NO: 5. In one embodiment, the additional alpha-amylase variant comprises has at least 75% sequence identity to SEQ ID NO: 5, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 6. In one embodiment, the additional alpha-amylase variant comprises has at least 75% sequence identity to SEQ ID NO: 6, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 7. In one embodiment, the additional alpha-amylase variant comprises has at least 75% sequence identity to SEQ ID NO: 7, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 8. In one embodiment, the additional alpha-amylase variant comprises has at least 75% sequence identity to SEQ ID NO: 8, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 9. In one embodiment, the additional alpha-amylase variant comprises has at least 75% sequence identity to SEQ ID NO: 9, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 10. In one embodiment, the additional alpha-amylase variant comprises has at least 75% sequence identity to SEQ ID NO: 10, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 11. In one embodiment, the additional alpha-amylase variant comprises has at least 75% sequence identity to SEQ ID NO: 12, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 12. In one embodiment, the additional alpha-amylase variant comprises has at least 75% sequence identity to SEQ ID NO: 12, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 13. In one embodiment, the additional alpha-amylase variant comprises has at least 75% sequence identity to SEQ ID NO: 13, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 14. In one embodiment, the additional alpha-amylase variant comprises has at least 75% sequence identity to SEQ ID NO: 14, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 15. In one embodiment, the additional alpha-amylase variant comprises has at least 75% sequence identity to SEQ ID NO: 15, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 16. In one embodiment, the additional alpha-amylase variant comprises has at least 75% sequence identity to SEQ ID NO: 16, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 17. In one embodiment, the additional alpha-amylase variant comprises has at least 75% sequence identity to SEQ ID NO: 17, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional alpha-amylase is a variant of a parent alpha-amylase of SEQ ID NO: 18. In one embodiment, the additional alpha-amylase variant comprises has at least 75% sequence identity to SEQ ID NO: 18, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional enzyme is a lipase having the sequence of SEQ ID NO: 4. In another embodiment, the additional enzyme is a lipase variant of a parent lipase having the sequence of SEQ ID NO:4 or at least having 75% sequence identity to SEQ ID NO: 4, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In one embodiment, the additional enzyme of:

(A) is an alpha-amylase variant comprising one or more modifications in the following positions: 9, 118, 149, 182, 186, 195, 202, 257, 295, 299, 320, 323, 339, 345, and 458, wherein the positions correspond to positions in SEQ ID NO:5;

(B) is an alpha-amylase variant comprising one or more modifications in the following positions: 140, 195, 183, 184, and 206, wherein the positions correspond to positions in SEQ ID NO: 6;

(C) is an alpha-amylase variant comprising one or more modifications in the following positions: 180, 181, 243, and 475, wherein the positions correspond to positions in SEQ ID NO: 7;

(D) is an alpha-amylase variant comprising one or more modifications in the following positions: 178, 179, 187, 203, 458, 459, 460, and 476, wherein the positions correspond to positions in SEQ ID NO: 8;

(E) is an alpha-amylase variant comprising an modification in the following position 202, wherein the position corresponds to position in SEQ ID NO:9;

(F) is an alpha-amylase variant comprising one or more modifications in the following positions: 405, 421, 422, and 428, wherein the positions correspond to positions in SEQ ID NO: 10;

(G) is an alpha-amylase variant comprising one or more modifications in the following positions: 48, 49, 107, 156, 181, 190, 209, and 264 of SEQ ID NO: 13; and (O) is a lipase variant comprising one or more modifications in the following positions: 4, 27, 33, 38, 57, 58, 60, 83, 86, 91, 94, 96, 97, 99, 111, 150, 163, 210, 216, 225, 227, 231, 233, 249, 254, 255, 256, 263, 264, 265, 266, 267, and 269 of SEQ ID NO: 4.

In a preferred embodiment, the additional enzyme is a variant of a parent alpha-amylase of SEQ ID NO: 5. In one preferred embodiment, the additional enzyme is a variant comprising one or more modifications in the following positions: 9, 118, 149, 182, 186, 195, 202, 257, 295, 299, 320, 323, 339, 345, and 458 of SEQ ID NO: 5, wherein the additional alpha-amylase variant has at least 75% sequence identity to SEQ ID NO: 5, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: R118K+D183*+G184*+N195F+R320K+R458K, wherein numbering is according to SEQ ID NO: 5. In another particular embodiment, the additional enzyme comprises the following modifications: M9L+R118K+G149A+G182T+G186A+D183*+G184*+N195F+M202L+T2571+Y295F+N299Y+R320K+M323T+A339S+E345R+R458K, wherein numbering is according to SEQ ID NO: 5.

In a preferred embodiment, the additional enzyme is a variant of a parent alpha-amylase of SEQ ID NO: 6. In one preferred embodiment, the additional enzyme is a variant comprising one or more modifications in the following positions: 140, 195, 183, 184, and 206 of SEQ ID NO: 6, wherein the additional alpha-amylase variant has at least 75% sequence identity to SEQ ID NO: 6, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: W140Y+D183*+G184*+N195F+1206Y, wherein numbering is according to SEQ ID NO: 6.

In a preferred embodiment, the additional enzyme is a variant of a parent alpha-amylase of SEQ ID NO: 7. In one preferred embodiment, the additional enzyme is a variant comprising one or more modifications in the following positions: 180, 181, 243, and 475 of SEQ ID NO: 7, wherein the additional alpha-amylase variant has at least 75% sequence identity to SEQ ID NO: 7, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: R180*+S181*+S243Q+G475K, wherein numbering is according to SEQ ID NO: 7.

In a preferred embodiment, the additional enzyme is a variant of a parent alpha-amylase of SEQ ID NO: 8. In one preferred embodiment, the additional enzyme is a variant comprising one or more modifications in the following positions: 178, 179, 187, 203, 458, 459, 460, and 476 of SEQ ID NO: 8, wherein the additional alpha-amylase variant has at least 75% sequence identity to SEQ ID NO: 8, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: R178*+G179*+E187P+I203Y+R458N+T459S+D460T+G476K, wherein numbering is according to SEQ ID NO: 8.

In a preferred embodiment, the additional enzyme is a variant of a parent alpha-amylase of SEQ ID NO: 9. In one preferred embodiment, the additional enzyme is a variant comprising a modification in the following position: 202 of SEQ ID NO: 9, wherein the additional alpha-amylase variant has at least 75% sequence identity to SEQ ID NO: 9, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modification: M202L, wherein numbering is according to SEQ ID NO: 9.

In a preferred embodiment, the additional enzyme is a variant of a parent alpha-amylase of SEQ ID NO: 10. In one preferred embodiment, the additional enzyme is a variant comprising one or more modifications in the following positions: 405, 421, 422, and 428 of SEQ ID NO: 10, wherein the additional alpha-amylase variant has at least 75% sequence identity to SEQ ID NO: 10, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: I405L+A421H+A422P+A428T, wherein numbering is according to SEQ ID NO: 10.

In a preferred embodiment, the additional enzyme is a variant of a parent alpha-amylase of SEQ ID NO: 13. In one preferred embodiment, the additional enzyme is a variant comprising one or more modifications in the following positions: 48, 49, 107, 156, 181, 190, 209, and 264 of SEQ ID NO: 13, wherein the additional alpha-amylase variant has at least 75% sequence identity to SEQ ID NO: 13, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%. In a particular embodiment, the additional alpha-amylase comprises the following modifications: G48A+T49I+G107A+H156Y+A181T+N190F+L201F+A209V+Q264S, wherein numbering is according to SEQ ID NO: 10.

In a preferred embodiment, the additional enzyme is a lipase variant of a parent lipase of SEQ ID NO: 4. In one preferred embodiment, the additional enzyme is a variant comprising one or more modifications in the following positions: 4, 27, 33, 38, 57, 58, 60, 83, 86, 91, 94, 96, 97, 99, 111, 150, 163, 210, 216, 225, 227, 231, 233, 249, 254, 255, 256, 263, 264, 265, 266, 267, and 269 of SEQ ID NO: 4 wherein the lipase variant has at least 75% sequence identity to SEQ ID NO: 4, such as at least 71%, at least 72%, at least 73%, at least 74%, at least 75%, at least 80%, at least 85%, at least 90%, at least 95%, at least 96%, at least 97%, at least 98%, or at least 99%, e.g. at least 99.1%, at least 99.2%, at least 99.3%, at least 99.4%, at least 99.5%, at least 99.6, but less than 100%.

In a further preferred embodiment, the additional enzyme is a lipase variant of a parent lipase of SEQ ID NO: 4, wherein the lipase variant comprises one or more modifications selected from the group consisting of: X1C, X2K, X2Y, X4V, X27R, X33K, X33Q, X38A, X54T, X56K, X57G, X58A, X605, X69R, X83T, X86V, X91A, X91N, X91Q, X91T, X94K, X91R, X96E, X91G, X91L, X91W, X97M, X98E, X981, X99K, X101D, X111A, X163K, X176L, X210K, X210Q, X210R, X216P, X220F, X225R, X227G, X231R, X2330, X233R, X249R, X254S, X256V, X263Q, X264A, X265T, X266D, X267A, and X269N of SEQ ID NO: 4.

In another embodiment, the detergent composition comprises more than one additional enzyme, such as two, three, four, five, six, seven, eight, nine, or ten additional enzymes.

In one embodiment, the detergent composition according to the invention comprises two or more enzymes, such as at least three enzymes, more preferred at least four or five enzymes. Preferably, the enzymes have different substrate specificity, e.g., proteolytic activity, amylolytic activity, lipolytic activity, hemicellulytic activity or pectolytic activity.

The detergent composition according to the invention may comprise one or more additional enzymes such as carbohydrate-active enzymes like carbohydrase, pectinase, mannanase, amylase, cellulase, arabinase, galactanase, xylanase, or protease, lipase, a, cutinase, oxidase, e.g., a laccase, and/or peroxidase.

In general the properties of the selected enzyme(s) should be compatible with the selected detergent, (i.e., pH-optimum, compatibility with other enzymatic and non-enzymatic ingredients, etc.), and the enzyme(s) should be present in effective amounts.

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and WO99/001544.

Other cellulases are endo-beta-1,4-glucanase enzyme having a sequence of at least 97% identity to the amino acid sequence of position 1 to position 773 of SEQ ID NO:2 of WO 2002/099091 or a family 44 xyloglucanase, which a xyloglucanase enzyme having a sequence of at least 60% identity to positions 40-559 of SEQ ID NO: 2 of WO 2001/062903.

Commercially available cellulases include Celluzyme™, and Carezyme™ (Novozymes A/S) Carezyme Premium™ (Novozymes A/S), Celluclean™ (Novozymes A/S), Celluclean Classic™ (Novozymes A/S), Cellusoft™ (Novozymes A/S), Whitezyme™ (Novozymes A/S), Clazinase™, and Puradax HA™ (Genencor International Inc.), and KAC-500(B)™ (Kao Corporation).

Suitable mannanases include those of bacterial or fungal origin. Chemically or genetically modified mutants are included. The mannanase may be an alkaline mannanase of Family 5 or 26. It may be a wild-type from *Bacillus* or *Humicola*, particularly *B. agaradhaerens, B. licheniformis, B. halodurans, B. clausii*, or *H. insolens*. Suitable mannanases are described in WO 1999/064619. A commercially available mannanase is Mannaway (Novozymes A/S).

Suitable additional proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from e.g. family M4 or other metalloprotease such as those from M5, M7 or M8 families.

The term "subtilases" refers to a sub-group of serine protease according to Siezen et al., Protein Engng. 4 (1991) 719-737 and Siezen et al. Protein Science 6 (1997) 501-523. Serine proteases are a subgroup of proteases characterized by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin *lentus*, subtilisin Novo, subtilisin Carlsberg, *Bacillus licheniformis*, subtilisin BPN', subtilisin 309, subtilisin 147 and subtilisin 168 described in WO89/06279 and protease PD138 described in (WO93/18140). Other useful proteases may be those described in WO92/175177, WO01/016285, WO02/026024 and WO02/016547. Examples of trypsin-like proteases are trypsin (e.g. of porcine or bovine origin) and the *Fusarium* protease described in WO89/06270, WO94/25583 and WO05/040372, and the chymotrypsin proteases derived from *Cellulomonas* described in WO05/052161 and WO05/052146.

A further preferred protease is the alkaline protease from *Bacillus lentus* DSM 5483, as described for example in WO95/23221, and variants thereof which are described in WO92/21760, WO95/23221, EP1921147 and EP1921148.

Examples of metalloproteases are the neutral metalloprotease as described in WO07/044993 (Genencor Int.) such as those derived from *Bacillus amyloliquefaciens*.

Examples of useful proteases are the variants described in: WO92/19729, WO96/034946, WO98/20115, WO98/20116, WO99/011768, WO01/44452, WO03/006602, WO04/03186, WO04/041979, WO07/006305, WO11/036263, WO11/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the protease variants may comprise the mutations: X3T, X41, X9R, X15T, X27R, *36D, X68A, X76D, X87S, X87R, *97E, X98S, X99G, X99D, X99A, X99AD, X101G, X101M, X101R, X103A, X104I, X104Y, X104N, X106A, X118V, X118R, X120D, X120N, X123S, X128L, X129Q, X130A, X160D, X167A, X170S, X194P, X195E, X199M, X205I, X217D, X218D, X222S, X232V, X235L, X236H, X245R, X252K, or X274A (using BPN' numbering).

Suitable commercially available protease enzymes include those sold under the trade names Alcalase®, Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® (Novozymes A/S), those sold under the tradename Maxatase®, Maxacal®, Maxapem®, Purafect®, Purafect Prime®, Preferenz™, Purafect MAO, Purafect Ox®, Purafect OxP®, Puramax®, Properase®, Effectenz™, FN2®, FN3®, FN4®, Excellase®, Eraser®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), P. sp. strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and *S. pristinaespiralis* (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include include Lipolase™, Lipex™; Lipolex™ and Lipoclean™ (Novozymes A/S), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Suitable additional amylases which can be used together with the variants of the invention may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1,296,839.

Different suitable amylases include amylases having SEQ ID NO: 6 in WO 02/010355 or variants thereof having 90% sequence identity to SEQ ID NO: 6. Preferred variants of SEQ ID NO: 6 are those having a deletion in positions 181 and 182 and a substitution in position 193.

Other amylases which are suitable are hybrid alpha-amylase comprising residues 1-33 of the alpha-amylase derived from *B. amyloliquefaciens* shown in SEQ ID NO: 6 of WO 2006/066594 and residues 36-483 of the *B. licheniformis* alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, 1201, A209 and Q264. Most preferred variants of the hybrid alpha-amylase comprising residues 1-33 of the alpha-amylase derived from *B. amyloliquefaciens* shown in SEQ ID NO: 6 of WO 2006/066594 and residues 36-483 of SEQ ID NO: 4 are those having the substitutions:

M197T;

H156Y+A181T+N190F+A209V+Q264S; or

G48A+T49I+G107A+H156Y+A181T+N190F+I201F+A209V+Q264S.

Other amylases which can be used are amylases having SEQ ID NO: 2 of WO 08/153815, SEQ ID NO: 10 in WO 01/66712 or variants thereof having 90% sequence identity to SEQ ID NO: 2 of WO 08/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T1311, T1651, K178L, T182G, M201L, F202Y, N225E, N225R, N272E, N272R, S243Q, 5243A, S243E, S243D, Y305R, R309A, Q320R, Q359E, K444E and G475K and/or deletion in position R180 and/or S181 or of T182 and/or G183. Most preferred amylase variants of SEQ ID NO: 2 are those having the substitutions:

N128C+K178L+T182G+Y305R+G475K;

N128C+K178L+T182G+F202Y+Y305R+D319T+G475K;

S125A+N128C+K178L+T182G+Y305R+G475K; or

S125A+N128C+T1311+T1651+K178L+T182G+Y305R+G475K wherein the variants are C-terminally truncated and optionally further comprises a substitution at position 243 and/or a deletion at position 180 and/or position 181.

Further suitable amylases are amylases having SEQ ID NO: 1 of WO13184577 or variants having 90% sequence identity to SEQ ID NO: 1 thereof. Preferred variants of SEQ ID NO: 1 are those having a substitution, a deletion or an insertion in one of more of the following positions: K176, R178, G179, T180, G181, E187, N192, M199, 1203, S241, R458, T459, D460, G476 and G477. More preferred variants of SEQ ID NO: 1 are those having the substitution in one of more of the following positions: K176L, E187P, N192FYH, M199L, I203YF, S241QADN, R458N, T459S, D460T, G476K and G477K and/or deletion in position R178 and/or S179 or of T180 and/or G181. Most preferred amylase variants of SEQ ID NO: 1 are those having the substitutions:

E187P+I203Y+G476K

E187P+I203Y+R458N+T459S+D460T+G476K wherein the variants optionally further comprises a substitution at position 241 and/or a deletion at position 178 and/or position 179.

Further suitable amylases are amylases having SEQ ID NO: 1 of WO10104675 or variants having 90% sequence identity to SEQ ID NO: 1 thereof. Preferred variants of SEQ ID NO: 1 are those having a substitution, a deletion or an insertion in one of more of the following positions: N21, D97, V128 K177, R179, S180, I181, G182, M200, L204, E242, G477 and G478. More preferred variants of SEQ ID NO: 1 are those having the substitution in one of more of the following positions: N21D, D97N, V128I, K177L, M200L, L204YF, E242QA, G477K and G478K and/or deletion in position R179 and/or S180 or of 1181 and/or G182. Most preferred amylase variants of SEQ ID NO: 1 are those having the substitutions: N21D+D97N+V128I, wherein the variants optionally further comprises a substitution at position 200 and/or a deletion at position 180 and/or position 181.

Other suitable amylases are the alpha-amylase having SEQ ID NO: 12 in WO01/66712 or a variant having at least 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions.

Other examples are amylase variants such as those described in WO2011/098531, WO2013/001078 and WO2013/001087.

Commercially available amylases are Duramyl™, Termamyl™, Fungamyl™, Stainzyme™, Stainzyme Plus™, Natalase™, Liquozyme X and BAN™ (from Novozymes A/S), and Rapidase™ Purastar™/Effectenz™, Powerase, Preferenz S1000, Preferenz S2000, Preferenz S100 and Preferenz S110 (from Genencor International Inc./DuPont).

Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257.

Commercially available peroxidases include Guardzyme™ (Novozymes A/S).

A detergent composition according to the invention may also comprise additional enzymes such as pectate lyases e.g. Pectawash™, chlorophyllases etc.

The detergent enzyme(s) may be included in the detergent composition according to the invention by adding separate additives containing one or more enzymes, or by adding a combined additive comprising all of these enzymes. A detergent additive, i.e., a separate additive or a combined additive, may be formulated, for example, as a granulate, liquid, slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

In one embodiment, the number of modifications in the protease, alpha-amylase and/or lipase variants individually is 1 to 30, e.g. 1 to 20, 1 to 10 and 1 to 5, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 modifications. In one embodiment, the number of modifications in the protease, alpha-amylase and/or lipase variants individually is 1 to 20, e.g. 1 to 10 and 1 to 5, such as 1, 2, 3, 4, 5, 6, 7, 8, 9, or 10 modifications.

In one embodiment, the alpha-amylase variants comprise further modifications. Accordingly, it is contemplated that each alpha-amylase variant herein described may further have an improved performance, and/or improved stability, such as an improved wash performance in laundry or in automated dish washing, and/or improved storage stability, compared to any of the listed parent alpha-amylases listed as SEQ ID NO: 1, 5, 6, 7, 8, 9, 10, 11, 12, 13, 14, 15, 16, 17, and 18. Thus, the alpha-amylase variants may further comprise one or more additional substitutions at one or more (e.g., several) other positions. Accordingly, in one embodiment, the alpha-amylase variant of the detergent composition of the present invention, further comprises a modification at positions corresponding to positions;

| | |
|---|---|
| X105L/X105I/X105F + X206Y | X195F + X206Y + X208Y + X213T + X214T + X217M/X217V |
| X105L/X105I + X206Y + X217I | X195F + X206Y + X208F/X208L + X213T + X214T + X217V |
| X105F + X206Y + X208Y + X217V + X246V | X195F + X206Y + X213S + X214T |
| X105L + X206F | X195F + X206Y + X208Y + X213S + X214T + X217M |
| X105I + X206Y + X208Y + X217I + X246V | X195F + X206Y + X208F + X213T + X214T + X217M |
| X195F + X213S + X214T | X195F + X206Y + X208Y + X213T + X214T + X217Q |
| X195F + X206Y + X213G + X214T | X195F + X206Y + X213S |
| X195F + X206Y + X208Y + X213T + X214T + X217M | X195F + X213S |
| X195F + X206Y + X208L + X213T + X214T + X217M | X195F + X213G + X214T |
| X206Y/X206F + X208Y + X217Q | X206Y + X208Y + X217I |
| X206F + X208Y + X217M | X206Y + X208Y |
| X206Y + X217M | X206Y + X208Y + X213A + X217M |
| X206Y + X208Y + X217V + X246V | X206Y + X213G |
| X206Y + X208F + X217V | X206N + X208Y + X217M |

-continued

| | |
|---|---|
| X206F + X208Y + X217V | X206Y + X246V |
| X206Y + X217I/X217V | |
| X206F + X208F + X217I | X206Y + X208L + X213S |
| X206F + X217I | X206Y + X217I + X246I |
| X206L + X217V | X206Y + X208F + X217H |
| X206L + X208F + X217I | X195F + X206Y + X208Y |
| X195F + X206Y + X208Y + X213S + X214T | X195F + X206Y + X217V |
| X206Y + X208Y + X213T + X214T + X217V | X195F + X208Y + X213T + X214T + X217V |
| X195F + X206H | X186E + X195F + X202T + X206Y + X210S |
| X195F + X213P | X186E + X195F + X206Y + X210S |
| X195F + X206Y + X208Y + X213T + X214T + X217I | X195F + X206Y + X213P + X214T |
| X63I + X195F + X206Y + X210S | X186E + X195F + X202T + X206Y + X209S |
| X195F + X206Y + X208Y + X213T + X217V | X186E + X195F + X206Y |
| X195F + X206Y + X208Y + X214T + X217V | X63V + X206Y + X241V + X246L |
| X63V + X105F + X206Y | X63V + X206L + X217V |
| X63V + X206F | X63V + X206Y + X246V |
| X63V + X105F + X206Y + X208F + X217I | X63V + X206Y + X217I |
| X63V + X105L + X206Y | X63V + X206Y |
| X63I + X206Y + X241V | X63I + X206Y |
| X208Y + X213A + X217Q | X208Y + X213S + X217M |
| X206F + X246V | X206L + X217V + X246L |
| X195F + X213I + X214P | X213P/X213S + X214T |
| X213N + X214Q | X213N + X214I |
| X213I + X214P | X213G + X214T |
| X48V + X60V | X213S + X214R |
| X213P + X214L | X213A + X214Q |
| X193A/X193D/X193N/X193S + X195F | X172K + X173Y + X174E |
| X173Y + X174S | X173F + X174Q |
| X179L + X182S + X186Q + X190P | X179L + X182P + X186S/X186V + X190P |
| X179L + X182C + X186K + X190P | X179L + X190P |
| X179L + X186K/X186R/X186S + X190P | X179L + X186H + X190P |
| X182V + X186K | X1825 + X186E |
| X182P + X186E | X206Y + X2135 |
| X195F + X206Y | X195F + X206Y + X208Y + X213T + X214T |

wherein the numbering is according to SEQ ID NO: 5.

Essential amino acids in a polypeptide may be identified according to procedures known in the art, such as site-directed mutagenesis or alanine-scanning mutagenesis (Cunningham and Wells, 1989, *Science* 244: 1081-1085). In the latter technique, single alanine mutations are introduced at every residue in the molecule, and the resultant mutant molecules are tested for protease activity to identify amino acid residues that are critical to the activity of the molecule. See also, Hilton et al., 1996, *J. Biol. Chem.* 271: 4699-4708. The active site of the enzyme or other biological interaction can also be determined by physical analysis of structure, as determined by such techniques as nuclear magnetic resonance, crystallography, electron diffraction, or photoaffinity labeling, in conjunction with mutation of putative contact site amino acids. See, for example, de Vos et al., 1992, *Science* 255: 306-312; Smith et al., 1992, *J. Mol. Biol.* 224: 899-904; Wodaver et al., 1992, *FEBS Lett.* 309: 59-64. The identity of essential amino acids can also be inferred from an alignment with a related polypeptide.

In an embodiment, the detergent composition of the present invention comprises an alpha-amylase variant as described herein and a protease variant as described herein, having an improved stability compared to a detergent composition comprising a parent alpha-amylase and a parent protease having the identical amino acid sequence of the variants, respectively, but not having a substitution at one or more of said specified modifications. The stability may be measured by a method comprising the steps of storing the variant in a detergent composition for e.g. 4 weeks at 30° C., 37° C., or room temperature, such as 25° C., followed by determining the specific activity of the variants. It is within the knowledge of the skilled person how the specific activity may be measured.

In the context of the present invention, any variant, i.e. an alpha-amylase variant, a protease variant, and a lipase variant, have been prepared from a parent enzyme. Such a parent enzyme is defined as a polypeptide comprising or consisting of the amino acid sequences listed as SEQ ID NO: 1, 2, 3, 4, 5, 6, 7, 8, 9, 10, 11, 12, 13, 14, 15, 16, 17, 18, 19, or 20. Thus, the variants have been prepared from a parent enzyme. A parent enzyme may be identified by sequence homology. The homology between two amino acid sequences is in this context described by the parameter "identity" for purposes of the present invention, the degree of identity between two amino acid sequences is determined using the Needleman-Wunsch algorithm as described above. The output from the routine is besides the amino acid alignment the calculation of the "Percent Identity" between the two sequences.

Based on this description it is routine for a person skilled in the art to identify suitable homologous alpha-amylases, proteases, and lipases, which may be modified as described herein.

Substantially homologous parent variants may have one or more (several) amino acid substitutions, deletions and/or insertions, in the present context the term "one or more" is used interchangeably with the term "several". These changes are preferably of a minor nature, that is conservative amino acid substitutions as described above and other substitutions that do not significantly affect the three-dimensional folding or activity of the protein or polypeptide; small deletions, typically of one to about 30 amino acids; and small amino- or carboxyl-terminal extensions, such as an amino-terminal methionine residue, a small linker peptide of up to about 20-25 residues, or a small extension that facilitates purification (an affinity tag), such as a poly-histidine tract, or protein A (Nilsson et al., 1985, *EMBO J.*

4: 1075; Nilsson et al., 1991, *Methods Enzymol.* 198: 3. See, also, in general, Ford et al., 1991, *Protein Expression and Purification* 2: 95-107.

Although the changes described above preferably are of a minor nature, such changes may also be of a substantive nature such as fusion of larger polypeptides of up to 300 amino acids or more both as amino- or carboxyl-terminal extensions.

The parent enzyme may be (a) a polypeptide having at least 70% sequence identity to the mature polypeptide of SEQ ID NO: 1, 2, 3, 4, 5, 6, 7, 8, 9, 10, 11, 12, 13, 14, 15, 16, 17, 18, 19, or 20.

Accordingly, the parent alpha-amylase has a sequence identity to the polypeptide with SEQ ID NO: 1, 5, 6, 7, 8, 9, 10, 11, 12, 13, 14, 15, 16, 17, or 18 of at least 70%, such as at least 71%, at least 72%, at least 73%, at least 74%, at least 75%, at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94% at least 95% identity, at least 96%, at least 97%, at least 98%, or at least 99%, e.g. at least 99.1%, at least 99.2%, at least 99.3%, at least 99.4%, at least 99.5%, at least 99.6, or 100%, which have alpha-amylase activity.

Accordingly, the parent protease has a sequence identity to the polypeptide with SEQ ID NO: 2, 3, 19, or 20 of at least 70%, such as at least 71%, at least 72%, at least 73%, at least 74%, at least 75%, at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94% at least 95% identity, at least 96%, at least 97%, at least 98%, or at least 99%, e.g. at least 99.1%, at least 99.2%, at least 99.3%, at least 99.4%, at least 99.5%, at least 99.6, or 100%, which have protease activity.

Accordingly, the parent lipase has a sequence identity to the polypeptide with SEQ ID NO: 4 of at least 70%, such as at least 71%, at least 72%, at least 73%, at least 74%, at least 75%, at least 76% at least 77% at least 78% at least 79% at least 80%, at least 81% at least 82% at least 83% at least 84% at least 85%, at least 86% at least 87% at least 88% at least 89%, at least 90%, at least 91%, at least 92%, at least 93%, at least 94% at least 95% identity, at least 96%, at least 97%, at least 98%, or at least 99%, e.g. at least 99.1%, at least 99.2%, at least 99.3%, at least 99.4%, at least 99.5%, at least 99.6, or 100%, which have lipase activity.

The parent enzymes may be a hybrid polypeptide in which a region of one polypeptide is fused at the N-terminus or the C-terminus of a region of another polypeptide and thereby providing the fusion parent enzyme. The terms "fusion" and "hybrid" may be used interchangeably herein but constitute the same meaning and purpose, and should not be understood in any limiting manner.

A fusion polypeptide is produced by fusing a polynucleotide encoding another polypeptide to a polynucleotide of the present invention. Techniques for producing fusion polypeptides are known in the art, and include ligating the coding sequences encoding the polypeptides so that they are in frame and that expression of the fusion polypeptide is under control of the same promoter(s) and terminator. Fusion polypeptides may also be constructed using intein technology in which fusion polypeptides are created post-translationally (Cooper et al., 1993, *EMBO J.* 12: 2575-2583; Dawson et al., 1994, *Science* 266: 776-779).

A fusion polypeptide may further comprise a cleavage site between the two polypeptides. Upon secretion of the fusion protein, the site is cleaved releasing the two polypeptides. Examples of cleavage sites include, but are not limited to, the sites disclosed in Martin et al., 2003, *J. Ind. Microbiol. Biotechnol.* 3: 568-576; Svetina et al., 2000, *J. Biotechnol.* 76: 245-251; Rasmussen-Wilson et al., 1997, *Appl. Environ. Microbiol.* 63: 3488-3493; Ward et al., 1995, *Biotechnology* 13: 498-503; and Contreras et al., 1991, *Biotechnology* 9: 378-381; Eaton et al., 1986, *Biochemistry* 25: 505-512; Collins-Racie et al., 1995, *Biotechnology* 13: 982-987; Carter et al., 1989, *Proteins: Structure, Function, and Genetics* 6: 240-248; and Stevens, 2003, *Drug Discovery World* 4: 35-48.

The parent enzyme may be obtained from organisms of any genus. For purposes of the present invention, the term "obtained from" as used herein in connection with a given source shall mean that the parent encoded by a polynucleotide is produced by the source or by a strain in which the polynucleotide from the source has been inserted. In one aspect, the parent is secreted extracellularly.

Variants present in the detergent composition according to the invention may be prepared by a method for obtaining a variant having the specific enzymatic activity, wherein the method comprises the steps of: (a) introducing into a parent enzyme a modification at one or more (e.g., several) positions as specified herein; and (b) recovering the variant.

The skilled person would know how to prepare a variant. However, variants may be prepared using any mutagenesis procedure known in the art, such as site-directed mutagenesis, synthetic gene construction, semi-synthetic gene construction, random mutagenesis, shuffling, etc.

Site-directed mutagenesis is a technique in which one or more (e.g., several) mutations are introduced at one or more defined sites in a polynucleotide encoding the parent.

Site-directed mutagenesis can be accomplished in vitro by PCR involving the use of oligonucleotide primers containing the desired mutation. Site-directed mutagenesis can also be performed in vitro by cassette mutagenesis involving the cleavage by a restriction enzyme at a site in the plasmid comprising a polynucleotide encoding the parent and subsequent ligation of an oligonucleotide containing the mutation in the polynucleotide. Usually the restriction enzyme that digests the plasmid and the oligonucleotide is the same, permitting sticky ends of the plasmid and the insert to ligate to one another. See, e.g., Scherer and Davis, 1979, *Proc. Natl. Acad. Sci. USA* 76: 4949-4955; and Barton et al., 1990, *Nucleic Acids Res.* 18: 7349-4966.

Site-directed mutagenesis can also be accomplished in vivo by methods known in the art. See, e.g., U.S. Patent Application Publication No. 2004/0171154; Storici et al., 2001, *Nature Biotechnol.* 19: 773-776; Kren et al., 1998, *Nat. Med.* 4: 285-290; and Calissano and Macino, 1996, *Fungal Genet. Newslett.* 43: 15-16.

Any site-directed mutagenesis procedure may be used in the present invention. There are many commercial kits available that may be used to prepare variants.

Synthetic gene construction entails in vitro synthesis of a designed polynucleotide molecule to encode a polypeptide of interest. Gene synthesis may be performed utilizing a number of techniques, such as the multiplex microchip-based technology described by Tian et al. (2004, *Nature* 432: 1050-1054) and similar technologies wherein oligonucleotides are synthesized and assembled upon photo-programmable microfluidic chips.

Single or multiple amino acid substitutions, deletions, and/or insertions may be made and tested using known methods of mutagenesis, recombination, and/or shuffling, followed by a relevant screening procedure, such as those disclosed by Reidhaar-Olson and Sauer, 1988, *Science* 241:

53-57; Bowie and Sauer, 1989, *Proc. Natl. Acad. Sci. USA* 86: 2152-2156; WO 95/17413; or WO 95/22625. Other methods that can be used include error-prone PCR, phage display (e.g., Lowman et al., 1991, *Biochemistry* 30: 10832-10837; U.S. Pat. No. 5,223,409; WO 92/06204) and region-directed mutagenesis (Derbyshire et al., 1986, *Gene* 46: 145; Ner et al., 1988, *DNA* 7: 127).

Mutagenesis/shuffling methods may be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

Semi-synthetic gene construction is accomplished by combining aspects of synthetic gene construction, and/or site-directed mutagenesis, and/or random mutagenesis, and/or shuffling. Semi-synthetic construction is typified by a process utilizing polynucleotide fragments that are synthesized, in combination with PCR techniques. Defined regions of genes may thus be synthesized de novo, while other regions may be amplified using site-specific mutagenic primers, while yet other regions may be subjected to error-prone PCR or non-error prone PCR amplification. Polynucleotide subsequences may then be shuffled.

Besides enzymes the detergent compositions according to the invention may comprise additional components. Accordingly, in one embodiment, the detergent composition further comprises at least one chelating agent; at least one surfactant; at least one sulfonated polymer; at least one hydrotrope; at least one builder and/or co-builder; at least one perfume; and/or at least one kind of bleaching system.

The choice of additional components is within the skill of the artisan and includes conventional ingredients, including the exemplary non-limiting components set forth below. The choice of components may include, for fabric care, the consideration of the type of fabric to be cleaned, the type and/or degree of soiling, the temperature at which cleaning is to take place, and the formulation of the detergent product. Although components mentioned below are categorized by general header according to a particular functionality, this is not to be construed as a limitation, as a component may comprise additional functionalities as will be appreciated by the skilled artisan.

The alpha-amylase and protease variants may be added to a detergent composition in an amount corresponding to 0.001-100 mg of protein, such as 0.01-100 mg of protein, preferably 0.005-50 mg of protein, more preferably 0.01-25 mg of protein, even more preferably 0.05-10 mg of protein, most preferably 0.05-5 mg of protein, and even most preferably 0.01-1 mg of protein per liter of wash liquid.

The alpha-amylase and protease variants may be added to a detergent composition in an amount corresponding to 0.001-100 mg of protein, such as 0.01-100 mg of protein, preferably 0.005-50 mg of protein, more preferably 0.01-25 mg of protein, even more preferably 0.05-10 mg of protein, most preferably 0.05-5 mg of protein, and even most preferably 0.01-1 mg of protein per gram detergent composition.

The alpha-amylase and protease variants may be stabilized using stabilizing agents, which may be selected from the group containing propylene glycol, glycerol, a sugar, a sugar alcohol, lactic acid, boric acid, borate and phenyl boronic acid derivates, such as those where the residue R in the phenyl boronic acid derivative is a C1-C6 alkyl group and among these, more preferably, $CH_3$, $CH_3CH_2$ or $CH_3CH_2CH_2$. The residue R in the phenyl boronic acid derivative may also be hydrogen. One example of a phenyl boronic acid derivative is 4-formylphenylboronic acid (4-FPBA) with the following formula:

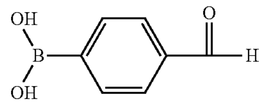 [SMILES: O=Cc1ccc(B(O)O)cc1]

Phenyl boronic acid derivatives may furthermore have other chemical modifications on the phenyl ring, and in particular they can contain one or more methyl, amino, nitro, chloro, fluoro, bromo, hydroxyl, formyl, ethyl, acetyl, t-butyl, anisyl, benzyl, trifluoroacetyl, N-hydroxysuccinimide, t-butyloxycarbonyl, benzoyl, 4-methylbenzyl, thioanizyl, thiocresyl, benzyloxymethyl, 4-nitrophenyl, benzyloxycarbonyl, 2-nitrobenzoyl, 2-nitrophenylsulfenyl, 4-toluenesulfonyl, pentafluorophenyl, diphenylmethyl, 2-chlorobenzyloxycarbonyl, 2,4,5-trichlorophenyl, 2-bromobenzyloxycarbonyl, 9-fluorenylmethyloxycarbonyl, triphenylmethyl, 2,2,5,7,8-pentamethylchroman-6-sulfonyl residues or groups or combinations thereof. All stabilizing agents may be present in the detergent composition of the present invention in all protonated or deprotonated forms. Furthermore, all such compounds, in particular their deprotonated forms, can be associated with cations. Preferred cations in this respect are monovalent or polyvalent, in particular divalent, cations, in particular Na ions ($Na^+$), K ions ($K^+$), Li ions ($Li^+$), Ca ions ($Ca^{2+}$), Mg ions ($Mg^{2+}$), Mn ions ($Mn^{2+}$) and Zn ions ($Zn^{2+}$). The detergent compositions of the present invention may comprise two or more stabilizing agents e.g. such as those selected from the group consisting of propylene glycol, glycerol, 4-formylphenyl boronic acid and borate. One example is a detergent composition of the present invention comprising 4-formylphenyl boronic acid and/or borate. The phenyl boronic acid derivative may be contained in the detergent composition in a quantity of from 0.00001 to 5.0 wt %, preferably from 0.0001 to 3.0 wt %, from 0.001 to 2.0 wt %, from 0.005 to 1.0 wt %, from 0.01 to 0.5 wt %, from 0.02 to 0.3 wt % Preferably, the boric acid/borate is contained in a quantity of from 0.001 to 5.5 wt. % and increasingly preferably of from 0.01 to 4.5 wt. %, from 0.05 to 3.5 and from 0.1 to 3, 0.4 bis 2.49, 0.5 bis 1.5 wt. % in the detergent composition. Addition of a combination of borate and 4-formylphenyl boronic acid has been found to be particularly effective, leading to a high increase in enzyme stability in detergent compositions. Preferably, the boric acid/borate is contained in a quantity of from 0.001 to 5.5 wt. % and increasingly preferably from 0.075 to 4.5 wt. %, from 0.09 to 3.5 and from 0.1 to 2.49 wt. %, and the phenyl boronic acid derivative is contained in a quantity of from 0.001 to 0.08 wt. % and increasingly preferably from 0.003 to 0.06 wt. %, from 0.005 to 0.05 wt. %, from 0.007 to 0.03 wt. % and from 0.009 to 0.01 wt. % in a detergent composition. Particularly preferred is the addition of 4-formylphenyl boronic acid in an amount of 1.0 to 2.0 wt % in combination with 1.0 wt % borate.

The detergent composition according to the invention may comprise alpha-amylase and protease variants which may also be stabilized using peptide aldehydes or ketones such as described in WO 2005/105826 and WO 2009/118375. Another example of detergent compositions according to the invention relates to a detergent composition comprising alpha-amylase and a protease variant as described herein, wherein the detergent formulation is as disclosed in WO 97/07202, which is hereby incorporated by reference.

Other components of the detergent composition according to the present invention may be surfactants. Thus, the detergent composition according to the present invention may comprise one or more surfactants, which may be anionic and/or cationic and/or non-ionic and/or semi-polar and/or zwitterionic, or a mixture thereof. In a particular embodiment, the detergent composition includes a mixture of one or more nonionic surfactants and one or more anionic surfactants. The surfactant(s) is typically present at a level of from about 0.1% to 60% by weight, such as about 1% to about 40%, or about 3% to about 20%, or about 3% to about 10%. The surfactant(s) is chosen based on the desired cleaning application, and includes any conventional surfactant(s) known in the art. Any surfactant known in the art for use in detergents may be utilized.

When included therein the detergent will usually contain from about 1% to about 40% by weight, such as from about 5% to about 30%, including from about 5% to about 15%, or from about 20% to about 25% of an anionic surfactant. Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or soap, and combinations thereof.

When included therein the detergent composition will usually contain from about 1% to about 40% by weight of a cationic surfactant. Non-limiting examples of cationic surfactants include alklydimethylehanolamine quat (ADMEAQ), cetyltrimethylammonium bromide (CTAB), dimethyldistearylammonium chloride (DSDMAC), and alkylbenzyldimethylammonium, and combinations thereof, Alkyl quaternary ammonium compounds, Alkoxylated quaternary ammonium (AQA), When included therein the detergent will usually contain from about 0.2% to about 40% by weight of a non-ionic surfactant, for example from about 0.5% to about 30%, in particular from about 1% to about 20%, from about 3% to about 10%, such as from about 3% to about 5%, or from about 8% to about 12%. Non-limiting examples of non-ionic surfactants include alcohol ethoxylates (AE or AEO), alcohol propoxylates, propoxylated fatty alcohols (PFA), alkoxylated fatty acid alkyl esters, such as ethoxylated and/or propoxylated fatty acid alkyl esters, alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamide (PFAM), polyhydroxy alkyl fatty acid amides, or N-acyl N-alkyl derivatives of glucosamine (glucamides, GA, or fatty acid glucamide, FAGA), as well as products available under the trade names SPAN and TWEEN, and combinations thereof.

When included therein the detergent composition will usually contain from about 1% to about 40% by weight of a semipolar surfactant. Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl)amine oxide, fatty acid alkanolamides and ethoxylated fatty acid alkanolamides, and combinations thereof.

When included therein the detergent composition will usually contain from about 1% to about 40% by weight of a zwitterionic surfactant. Non-limiting examples of zwitterionic surfactants include betaine, alkyldimethylbetaine, and sulfobetaine, and combinations thereof.

The term "sulfonated polymer" as used herein, refers to polymers containing sulfonic acid or sulfonate functional groups.

The polymer, if used, is used in any suitable amount from about 0.1% to about 20%, preferably from 1% to about 15%, more preferably from 2% to 10% by weight of the composition. Sulfonated/carboxylated polymers are particularly suitable for the compositions contained in the pouch of the invention.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

As noted herein, the sulfonated/carboxylated polymers may comprise (a) at least one structural unit derived from at least one carboxylic acid monomer having the general formula (I):

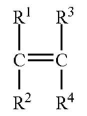

wherein $R^1$ to $R^4$ are independently hydrogen, methyl, carboxylic acid group or $CH_2COOH$ and wherein the carboxylic acid groups can be neutralized; (b) optionally, one or more structural units derived from at least one nonionic monomer having the general formula (II):

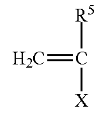

wherein $R^5$i is hydrogen, $C_1$ to $C_6$ alkyl, or $C_1$ to $C_6$ hydroxyalkyl, and X is either aromatic (with $R^5$ being hydrogen or methyl when X is aromatic) or X is of the general formula (III):

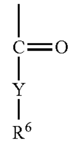

wherein $R^6$ is (independently of $R^5$) hydrogen, $C_1$ to $C_6$ alkyl, or $C_1$ to $C_6$ hydroxyalkyl, and Y is O or N; and at least one structural unit derived from at least one sulfonic acid monomer having the general formula (IV):

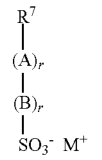

wherein $R^7$ is a group comprising at least one $sp^2$ bond, A is O, N, P, S or an amido or ester linkage, B is a mono- or polycyclic aromatic group or an aliphatic group, each t is independently O or 1, and $M^+$ is a cation. In one aspect, $R^7$ is a $C_2$ to $C_6$ alkene. In another aspect, $R^7$ is ethene, butene or propene.

Preferred carboxylic acid monomers include one or more of the following: acrylic acid, maleic acid, itaconic acid, methacrylic acid, or ethoxylate esters of acrylic acids, acrylic and methacrylic acids being more preferred. Preferred sulfonated monomers include one or more of the following: sodium (meth) allyl sulfonate, vinyl sulfonate, sodium phenyl (meth) allyl ether sulfonate, or 2-acrylamido-methyl propane sulfonic acid. Preferred non-ionic monomers include one or more of the following: methyl (meth) acrylate, ethyl (meth) acrylate, t-butyl (meth) acrylate, methyl (meth) acrylamide, ethyl (meth) acrylamide, t-butyl (meth) acrylamide, styrene, or [alpha]-methyl styrene. Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

The carboxylic acid is preferably (meth)acrylic acid. The sulfonic acid monomer is preferably one of the following: 2-acrylamido methyl-1-propanesulfonic acid, 2-methacrylamido-2-methyl-1-propanesulfonic acid, 3-methacrylamido-2-hydroxypropanesulfonic acid, allysulfonic acid, methallysulfonic acid, allyloxybenzenesulfonic acid, methallyloxybenzensulfonic acid, 2-hydroxy-3-(2-propenyloxy) propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamide, and water soluble salts thereof. The unsaturated sulfonic acid monomer is most preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

Yet another component of the detergent composition according to the present invention is hydrotropes.

A hydrotrope is a compound that solubilises hydrophobic compounds in aqueous solutions (or oppositely, polar substances in a non-polar environment). Typically, hydrotropes have both hydrophilic and a hydrophobic character (so-called amphiphilic properties as known from surfactants); however the molecular structure of hydrotropes generally do not favor spontaneous self-aggregation, see e.g. review by Hodgdon and Kaler (2007), Current Opinion in Colloid & Interface Science 12: 121-128. Hydrotropes do not display a critical concentration above which self-aggregation occurs as found for surfactants and lipids forming miceller, lamellar or other well defined meso-phases. Instead, many hydrotropes show a continuous-type aggregation process where the sizes of aggregates grow as concentration increases. However, many hydrotropes alter the phase behavior, stability, and colloidal properties of systems containing substances of polar and non-polar character, including mixtures of water, oil, surfactants, and polymers. Hydrotropes are classically used across industries from pharma, personal care, food, to technical applications. Use of hydrotropes in detergent compositions allow for example more concentrated formulations of surfactants (as in the process of compacting liquid detergents by removing water) without inducing undesired phenomena such as phase separation or high viscosity.

Thus, the detergent composition according to the present invention may comprise 0-5% by weight, such as about 0.5 to about 5%, or about 3% to about 5%, of a hydrotrope. Any hydrotrope known in the art for use in detergents may be utilized. Non-limiting examples of hydrotropes include sodium benzene sulfonate, sodium p-toluene sulfonates (STS), sodium xylene sulfonates (SXS), sodium cumene sulfonates (SCS), sodium cymene sulfonate, amine oxides, alcohols and polyglycolethers, sodium hydroxynaphthoate, sodium hydroxynaphthalene sulfonate, sodium ethylhexyl sulfate, and combinations thereof.

Another component of a detergent composition may be builders and/or co-builders. The term "builder" may be classified by the test described by M. K. Nagaraja et al., JAOCS, Vol. 61, no. 9 (September 1984), pp. 1475-1478 to determine the minimum builder level required to lower the water hardness at pH 8 from 2.0 mM (as $CaCO_3$) to 0.10 mM in a solution. The builder may particularly be a chelating agent that forms water-soluble complexes with e.g. calcium and magnesium ions. The term "chelating agents" or "chelators" as used herein, refers to chemicals that form molecules with certain metal ions, inactivating the ions so that they cannot react with other elements thus a binding agent that suppresses chemical activity by forming chelates. Chelation is the formation or presence of two or more separate bindings between a ligand and a single central atom. The ligang may be any organic compound, a silicate or a phosphate. Thus, in one embodiment, the detergent composition according to the present invention may comprise about 0-65% by weight, such as about 5% to about 50% of a detergent builder or co-builder, or a mixture thereof. In a dish wash detergent, the level of builder is typically 40-65%, particularly 50-65%. The builder and/or co-builder may particularly be a chelating agent that forms water-soluble complexes with Ca and Mg. Any builder and/or co-builder known in the art for use in laundry, ADW and hard surfaces cleaning detergents may be utilized. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), iminodiethanol (DEA) and 2,2',2"-nitrilotriethanol (TEA), and carboxymethylinulin (CMI), and combinations thereof.

The detergent composition according to the present invention may also comprise 0-65% by weight, such as about 5% to about 40%, of a detergent co-builder, or a mixture thereof. The detergent composition may include a co-builder alone, or in combination with a builder, for example a zeolite builder. Non-limiting examples of co-builders include homopolymers of polyacrylates or copolymers thereof, such as poly(acrylic acid) (PAA) or copoly(acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), etheylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N, N-diacetic acid (GLDA), 1-hydroxyethane-1,1-diylbis(phosphonic acid) (HEDP), ethylenediaminetetrakis (methylene)tetrakis(phosphonic acid) (EDTMPA), diethylenetriaminepentakis(methylene)pentakis(phosphonic acid) (DTPMPA), N-(2-hydroxyethyl)iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl) aspartic acid (SEAS), N-(2-sulfomethyl) glutamic acid (SMGL), N-(2-sulfoethyl) glutamic acid (SEGL), N-methyliminodiacetic acid (MIDA), α-alanine-N,N-diacetic acid (α-ALDA), serine-N,N-diacetic acid (SEDA), isoserine-N, N-diacetic acid (ISDA), phenylalanine-N,N-diacetic acid (PHDA), anthranilic acid-N,N-diacetic acid (ANDA), sulfanilic acid-N, N-diacetic acid (SLDA), taurine-N, N-diacetic acid (TUDA) and sulfomethyl-N,N-diacetic acid (SM DA), N-(hydroxyethyl)-ethylidenediaminetriacetate (HEDTA), diethanolglycine (DEG), Diethylenetriamine Penta (Methylene Phosphonic acid) (DTPMP), aminotris (methylenephosphonic acid) (ATMP), and combinations and salts thereof. Further exemplary builders and/or co-builders are described in, e.g., WO 09/102854, U.S. Pat. No. 5,977, 053.

Yet another component of the detergent composition may be bleaching systems. Thus, in one embodiment, the detergent composition according to the present invention may comprise 0-10% by weight, such as about 1% to about 5%, of a bleaching system. Any bleaching system known in the art for use in laundry, ADW and hard surfaces cleaning detergents may be utilized. Suitable bleaching system components include bleaching catalysts, photobleaches, bleach activators, sources of hydrogen peroxide such as sodium percarbonate and sodium perborates, preformed peracids and mixtures thereof. Suitable preformed peracids include, but are not limited to, peroxycarboxylic acids and salts, percarbonic acids and salts, perimidic acids and salts, peroxymonosulfuric acids and salts, for example, Oxone (R), and mixtures thereof. Non-limiting examples of bleaching systems include peroxide-based bleaching systems, which may comprise, for example, an inorganic salt, including alkali metal salts such as sodium salts of perborate (usually mono- or tetra-hydrate), percarbonate, persulfate, perphosphate, persilicate salts, in combination with a peracid-forming bleach activator. By bleach activator is meant herin a compound which reacts with peroxygen bleach like hydrogen peroxide to form a peracid. The peracid thus formed constitutes the activated bleach. Suitable bleach activators to be used herein include those belonging to the class of esters amides, imides or anhydrides. Suitable examples are tetracetyl athylene diamine (TAED), sodium 3,5,5 trimethyl hexanoyloxybenzene sulphonat, diperoxy dodecanoic acid, 4-(dodecanoyloxy)benzenesulfonate (LOBS), 4-(decanoyloxy)benzenesulfonate, 4-(decanoyloxy)benzoate (DOBS), 4-(3,5,5-trimethylhexanoyloxy)benzenesulfonate (ISONOBS), tetraacetylethylenediamine (TAED) and 4-(nonanoyloxy)benzenesulfonate (NOBS), and/or those disclosed in WO98/17767. A particular family of bleach activators of interest was disclosed in EP624154 and particulary preferred in that family is acetyl triethyl citrate (ATC). ATC or a short chain triglyceride like Triacin has the advantage that it is environmental friendly as it eventually degrades into citric acid and alcohol. Furthermore acethyl triethyl citrate and triacetin has a good hydrolytical stability in the product upon storage and it is an efficient bleach activator. Finally ATC provides a good building capacity to the laundry additive. Alternatively, the bleaching system may comprise peroxyacids of, for example, the amide, imide, or sulfone type. The bleaching system may also comprise peracids such as 6-(phthaloylamino)percapronic acid (PAP). The bleaching system may also include a bleach catalyst. In some embodiments the bleach component may be an organic catalyst selected from the group consisting of organic catalysts having the following formulae:

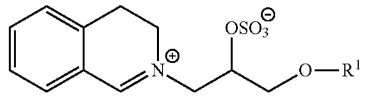

(i)

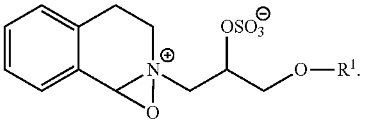

(ii)

(iii) and mixtures thereof; wherein each $R^1$ is independently a branched alkyl group containing from 9 to 24 carbons or linear alkyl group containing from 11 to 24 carbons, preferably each $R^1$ is independently a branched alkyl group containing from 9 to 18 carbons or linear alkyl group containing from 11 to 18 carbons, more preferably each $R^1$ is independently selected from the group consisting of 2-propylheptyl, 2-butyloctyl, 2-pentylnonyl, 2-hexyldecyl, n-dodecyl, n-tetradecyl, n-hexadecyl, n-octadecyl, isononyl, iso-decyl, iso-tridecyl and iso-pentadecyl. Other exemplary bleaching systems are described, e.g., in WO2007/087258, WO2007/087244, WO2007/087259, WO2007/087242. Suitable photobleaches may for example be sulfonated zinc phthalocyanine Another component of a detergent composition is polymers. Thus, in one embodiment, the detergent composition according to the invention comprise a polymer.

Accordingly, the detergent composition according to the present invention may comprise 0-10% by weight, such as 0.5-5%, 2-5%, 0.5-2% or 0.2-1% of a polymer. Any polymer known in the art for use in detergents may be utilized. The polymer may function as a co-builder as mentioned above, or may provide antiredeposition, fiber protection, soil release, dye transfer inhibition, grease cleaning and/or anti-foaming properties. Some polymers may have more than one of the above-mentioned properties and/or more than one of the below-mentioned motifs. Exemplary polymers include (carboxymethyl)cellulose (CMC), poly(vinyl alcohol) (PVA), poly(vinylpyrrolidone) (PVP), poly(ethyleneglycol) or poly(ethylene oxide) (PEG), ethoxylated poly (ethyleneimine), carboxymethyl inulin (CMI), and polycarboxylates such as PAA, PAA/PMA, poly-aspartic acid, and lauryl methacrylate/acrylic acid copolymers, hydrophobically modified CMC (HM-CMC) and silicones, copolymers of terephthalic acid and oligomeric glycols, copolymers of polyethylene terephthalate and polyoxyethene terephthalate (PET-POET), PVP, poly(vinylimidazole) (PVI), poly(vinylpyridin-N-oxide) (PVPO or PVPNO) and polyvinylpyrrolidone-vinylimidazole (PVPVI). Further exemplary polymers include sulfonated polycarboxylates, polyethylene oxide and polypropylene oxide (PEO-PPO) and diquaternium ethoxy sulfate. Other exemplary polymers are disclosed in, e.g., WO 2006/130575. Salts of the above-mentioned polymers are also contemplated.

Yet another component of detergent compositions may be fabric hueing agents. Thus, in one embodiment, the detergent composition according to the invention comprises a fabric hueing agent.

The detergent composition according to the present invention may also comprise fabric hueing agents such as dyes or pigments which when formulated in detergent compositions can deposit onto a fabric when said fabric is contacted with a wash liquor comprising said detergent compositions thus altering the tint of said fabric through absorption/reflection of visible light. Fluorescent whitening agents emit at least some visible light. In contrast, fabric hueing agents alter the tint of a surface as they absorb at least a portion of the visible light spectrum. Suitable fabric hueing agents include dyes and dye-clay conjugates, and may also include pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof, for example as described in WO2005/03274, WO2005/03275, WO2005/03276 and EP1876226 (hereby incorporated by reference). A detergent composition preferably comprises from about 0.00003 wt % to about 0.2 wt %, from about 0.00008 wt % to about 0.05 wt %, or even from about 0.0001 wt % to about 0.04 wt % fabric hueing agent. The composition may comprise from 0.0001 wt % to 0.2 wt % fabric hueing agent, this may be especially preferred when the composition is in the form of a unit dose pouch. Suitable hueing agents are also disclosed in, e.g., WO 2007/087257, WO2007/087243.

Any detergent components known in the art for use in laundry detergents may also be utilized. Other optional detergent components include anti-corrosion agents, anti-shrink agents, anti-soil redeposition agents, anti-wrinkling agents, bactericides, binders, corrosion inhibitors, disintegrants/disintegration agents, dyes, enzyme stabilizers (including boric acid, borates, CMC, and/or polyols such as propylene glycol), fabric conditioners including clays, fillers/processing aids, fluorescent whitening agents/optical brighteners, foam boosters, foam (suds) regulators, perfumes, soil-suspending agents, softeners, suds suppressors, tarnish inhibitors, and wicking agents, either alone or in combination. Any ingredient known in the art for use in laundry detergents may be utilized. The choice of such ingredients is well within the skill of the artisan.

The detergent composition according to the invention may also comprise dispersants. In particular powdered detergents may comprise dispersants. Suitable water-soluble organic materials include the homo- or co-polymeric acids or their salts, in which the polycarboxylic acid comprises at least two carboxyl radicals separated from each other by not more than two carbon atoms. Suitable dispersants are for example described in Powdered Detergents, Surfactant science series volume 71, Marcel Dekker, Inc. The detergent composition according to the invention may also comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition. A detergent composition according to the invention may preferably also comprise additional components that may tint articles being cleaned, such as fluorescent whitening agent or optical brighteners. Where present the brightener is preferably at a level of about 0.01% to about 0.5%. Any fluorescent whitening agent suitable for use in a laundry detergent composition may be used in the composition. The most commonly used fluorescent whitening agents are those belonging to the classes of diaminostilbene-sulphonic acid derivatives, diarylpyrazoline derivatives and bisphenyl-distyryl derivatives. Examples of the diaminostilbene-sulphonic acid derivative type of fluorescent whitening agents include the sodium salts of: 4,4'-bis-(2-diethanolamino-4-anilino-s-triazin-6-ylamino) stilbene-2,2'-disulphonate; 4,4'-bis-(2,4-dianilino-s-triazin-6-ylamino) stilbene-2,2'-disulphonate; 4,4'-bis-(2-anilino-4(N-methyl-N-2-hydroxy-ethylamino)-s-triazin-6-ylamino) stilbene-2,2'-disulphonate, 4,4'-bis-(4-phenyl-2,1,3-triazol-2-yl)stilbene-2,2'-disulphonate; 4,4'-bis-(2-anilino-4(1-methyl-2-hydroxy-ethylamino)-s-triazin-6-ylamino) stilbene-2,2'-disulphonate and 2-(stilbyl-4"-naptho-1,2':4,5)-1,2,3-trizole-2"-sulphonate. Preferred fluorescent whitening agents are Tinopal DMS and Tinopal CBS available from Ciba-Geigy AG, Basel, Switzerland. Tinopal DMS is the disodium salt of 4,4'-bis-(2-morpholino-4 anilino-s-triazin-6-ylamino) stilbene disulphonate. Tinopal CBS is the disodium salt of 2,2'-bis-(phenyl-styryl) disulphonate. Also preferred are fluorescent whitening agents is the commercially available Parawhite KX, supplied by Paramount Minerals and Chemicals, Mumbai, India. Other fluorescers suitable for use include the 1-3-diaryl pyrazolines and the 7-alkylaminocoumarins.

Suitable fluorescent brightener levels include lower levels of from about 0.01, from 0.05, from about 0.1 or even from about 0.2 wt % to upper levels of 0.5 or even 0.75 wt %. The detergent composition according to the invention may also comprise one or more soil release polymers which aid the removal of soils from fabrics such as cotton and polyester based fabrics, in particular the removal of hydrophobic soils from polyester based fabrics. The soil release polymers may for example be nonionic or anionic terephthalte based polymers, polyvinyl caprolactam and related copolymers, vinyl graft copolymers, polyester polyamides see for example Chapter 7 in Powdered Detergents, Surfactant science series volume 71, Marcel Dekker, Inc. Another type of soil release polymers are amphiphilic alkoxylated grease cleaning polymers comprising a core structure and a plurality of alkoxylate groups attached to that core structure. The core structure may comprise a polyalkylenimine structure or a polyalkanolamine structure as described in detail in WO 2009/087523 (hereby incorporated by reference). Furthermore random graft co-polymers are suitable soil release polymers Suitable graft co-polymers are described in more detail in WO 2007/138054, WO 2006/108856 and WO 2006/113314 (hereby incorporated by reference). Other soil release polymers are substituted polysaccharide structures especially substituted cellulosic structures such as modified cellulose deriviatives such as those described in EP 1867808 or WO 2003/040279 (both are hereby incorporated by reference). Suitable cellulosic polymers include cellulose, cellulose ethers, cellulose esters, cellulose amides and mixtures thereof. Suitable cellulosic polymers include anionically modified cellulose, nonionically modified cellulose, cationically modified cellulose, zwitterionically modified cellulose, and mixtures thereof. Suitable cellulosic polymers include methyl cellulose, carboxy methyl cellulose, ethyl cellulose, hydroxyl ethyl cellulose, hydroxyl propyl methyl cellulose, ester carboxy methyl cellulose, and mixtures thereof. The detergent composition according to the invention may also comprise one or more anti-redeposition agents such as carboxymethylcellulose (CMC), polyvinyl alcohol (PVA), polyvinylpyrrolidone (PVP), polyoxyethylene and/or polyethyleneglycol (PEG), homopolymers of acrylic acid, copolymers of acrylic acid and maleic acid, and ethoxylated polyethyleneimines. The cellulose based polymers described under soil release polymers above may also function as anti-redeposition agents.

Other suitable adjunct materials include, but are not limited to, anti-shrink agents, anti-wrinkling agents, bactericides, binders, carriers, dyes, enzyme stabilizers, fabric softeners, fillers, foam regulators, hydrotropes, perfumes, pigments, sod suppressors, solvents, structurants for liquid detergents and/or structure elasticizing agents.

Thus, in one particular embodiment, the detergent composition further comprises at least one chelating agent; at least one surfactant; at least one sulfonated polymer; at least one hydrotrope; at least one builder and/or co-builder; at least one perfume; and/or at least one kind of bleaching system.

Formulation of Detergent Products

The detergent composition according to the invention may be in any convenient form, e.g., a bar, a homogenous tablet, a tablet having two or more layers, a regular or compact powder, a granule, a paste, a gel, or a regular, compact or concentrated liquid.

Thus, in one embodiment, the detergent composition according to the present invention, is a liquid laundry detergent composition, a powder laundry detergent composition, a liquid dishwash detergent composition, or a powder dishwash detergent composition.

The term "liquid laundry detergent composition" as used herein refers to a detergent composition which is in a stabilized liquid form and used in a method for laundering a fabric. Thus, the detergent composition has been formulated to be in fluid form.

The term "powder laundry detergent composition" as used herein refers to a detergent composition which is in a solid form, such as a granulate, non-dusting granulate or powder, which is used in a method for laundering a fabric.

The term "liquid dishwash detergent composition" as used herein refers to a detergent composition which is in a stabilized liquid form and used in dishwash. Dishwash may be any kind of dishwash, such as manual dishwash and such as automated dishwash (ADVV).

The term "powder dishwash detergent composition" as used herein refers to a detergent composition which is in a solid form, such as a granulate, powder or compact unit and used in dishwash. A powder dishwash detergent composition is typically used in automated dishwash, but the used is not limited to such ADW, and may also be intended for used in any other kind of dishwash, such as manual dishwash.

Detergent formulation forms: Layers (same or different phases), Pouches, versus forms for Machine dosing unit.

Pouches may be configured as single or multicompartments. It can be of any form, shape and material which is suitable for hold the composition, e.g. without allowing the release of the composition to release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxyprpyl methyl cellulose (HPMC). Preferably the level of polymer in the film for example PVA is at least about 60%. Preferred average molecular weight will typically be about 20,000 to about 150,000. Films can also be of blend compositions comprising hydrolytically degradable and water soluble polymer blends such as polyactide and polyvinyl alcohol (known under the Trade reference M8630 as sold by Chris Craft In. Prod. Of Gary, Ind., US) plus plasticisers like glycerol, ethylene glycerol, Propylene glycol, sorbitol and mixtures thereof. The pouches can comprise a solid laundry cleaning composition or part components and/or a liquid cleaning composition or part components separated by the water soluble film. The compartment for liquid components can be different in composition than compartments containing solids. Ref: (US2009/0011970 A1).

Detergent ingredients may be separated physically from each other by compartments in water dissolvable pouches or in different layers of tablets. Thereby negative storage interaction between components can be avoided. Different dissolution profiles of each of the compartments can also give rise to delayed dissolution of selected components in the wash solution.

A liquid or gel detergent, which is not unit dosed, may be aqueous, typically containing at least 20% by weight and up to 95% water, such as up to about 70% water, up to about 65% water, up to about 55% water, up to about 45% water, up to about 35% water. Other types of liquids, including without limitation, alkanols, amines, diols, ethers and polyols may be included in an aqueous liquid or gel. An aqueous liquid or gel detergent may contain from 0-30% organic solvent.

A liquid or gel detergent may be non-aqueous.

Methods and Uses

In one aspect the invention relates to use of the detergent composition as described herein in laundry, manual dishwash or automatic dishwash. Accordingly, the present invention relates to use of a detergent composition comprising (i) at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and (ii) at least one protease having protease activity, wherein said protease is selected from the group of: (a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 2, 3, 19, 20, or 23; (b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2; (c) a protease variant comprising an modification in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3; (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO: 23 in laundry, manual dishwash or automatic dishwash.

In one embodiment, the use of the detergent composition as described herein, is in laundry.

In another embodiment, the use of the detergent composition as described herein, is in automatic dishwash.

A detergent composition according to the invention may be formulated, e.g., as a hand or machine laundry detergent composition including a laundry additive composition suitable for pre-treatment of stained fabrics and a rinse added fabric softener composition, or be formulated as a detergent composition for use in general household hard surface cleaning operations, or be formulated for hand or machine dishwashing operations. Thus, in one embodiment, the detergent composition is a liquid laundry detergent composition, a powder laundry detergent composition, a liquid dishwash detergent composition; or a powder dishwash detergent composition.

A cleaning process or the textile care process may for example be a laundry process, a dishwashing process or cleaning of hard surfaces such as bathroom tiles, floors, table tops, drains, sinks and washbasins. Laundry processes can for example be household laundering, but it may also be industrial laundering. A process for laundering of fabrics and/or garments may be a process comprises treating fabrics with a washing solution containing a detergent composition, and at least one protease variant. A cleaning process or a textile care process can for example be carried out in a machine washing process or in a manual washing process. The washing solution can for example be an aqueous washing solution containing a detergent composition.

The fabrics and/or garments subjected to a washing, cleaning or textile care process may be conventional washable laundry, for example household laundry. Preferably, the major part of the laundry is garments and fabrics, including knits, woven, denims, non-woven, felts, yarns, and towelling. The fabrics may be cellulose based such as natural cellulosics, including cotton, flax, linen, jute, ramie, sisal or coir or manmade cellulosics (e.g., originating from wood pulp) including viscose/rayon, ramie, cellulose acetate fibers (tricell), lyocell or blends thereof. The fabrics may also be non-cellulose based such as natural polyamides including wool, camel, cashmere, mohair, rabit and silk or synthetic polymer such as nylon, aramid, polyester, acrylic, polypropylen and spandex/elastane, or blends thereof as well as blend of cellulose based and non-cellulose based fibers. Examples of blends are blends of cotton and/or rayon/viscose with one or more companion material such as wool, synthetic fibers (e.g., polyamide fibers, acrylic fibers, polyester fibers, polyvinyl alcohol fibers, polyvinyl chloride fibers, polyurethane fibers, polyurea fibers, aramid fibers), and cellulose-containing fibers (e.g., rayon/viscose, ramie, flax, linen, jute, cellulose acetate fibers, lyocell).

The last few years there has been an increasing interest in replacing components in detergents, which is derived from petrochemicals with renewable biological components such as enzymes and polypeptides without compromising the wash performance. When the components of detergent compositions change new enzyme activities or new enzymes having alternative and/or improved properties compared to the common used detergent enzymes such as proteases, lipases and amylases is needed to achieve a similar or improved wash performance when compared to the traditional detergent compositions.

Typical detergent compositions include various components in addition to the enzymes, these components have different effects, some components like the surfactants lower the surface tension in the detergent, which allows the stain being cleaned to be lifted and dispersed and then washed away, other components like bleach systems remove discolor often by oxidation and many bleaches also have strong bactericidal properties, and are used for disinfecting and sterilizing. Yet other components like builder and chelator softens, e.g., the wash water by removing the metal ions form the liquid.

The enzyme compositions may further comprise at least one or more of the following: a surfactant, a builder, a chelator or chelating agent, bleach system or bleach component in laundry or dish wash.

The amount of a surfactant, a builder, a chelator or chelating agent, bleach system and/or bleach component may be reduced compared to amount of surfactant, builder, chelator or chelating agent, bleach system and/or bleach component used without the added protease variant of the invention. Preferably the at least one component which is a surfactant, a builder, a chelator or chelating agent, bleach system and/or bleach component is present in an amount that is 1% less, such as 2% less, such as 3% less, such as 4% less, such as 5% less, such as 6% less, such as 7% less, such as 8% less, such as 9% less, such as 10% less, such as 15% less, such as 20% less, such as 25% less, such as 30% less, such as 35% less, such as 40% less, such as 45% less, such as 50% less than the amount of the component in the system without the addition of protease variants of the invention, such as a conventional amount of such component. Detergent compositions may also be composition which is free of at least one component which is a surfactant, a builder, a chelator or chelating agent, bleach system or bleach component and/or polymer.

In one embodiment, the use is in laundry or automatic dishwash at low temperature, such as less than 60° C., such as less than 55° C., such as less than 50°, such as less than 45° C., such as less than 40° C., such as less than 35° C., such as less than 30° C., such as less than 25° C., such as less than 20° C., such as less than 15° C.

The term "low temperature" as used herein, refers to is a temperature of 5-60° C., such as 5-50° C., preferably 5-40° C., more preferably 5-30° C., more preferably 5-20° C., most preferably 5-15° C., and in particular 5-10° C.

In one embodiment, the use of the detergent composition is in laundry at low temperature, such as less than 50°, such as less than 45° C., such as less than 40° C., such as less than 35° C., such as less than 30° C., such as less than 25° C., such as less than 20° C., such as less than 15° C.

In another embodiment, the use of the detergent composition is in automatic dishwash at low temperature, such as less than 60° C., such as less than 55° C., such as less than 50°, such as less than 45° C., such as less than 40° C., such as less than 35° C., such as less than 30° C.

Washing Method

Detergent composition according to the invention is ideally suited for use in laundry applications. Thus, in one aspect, the present invention relates to a method of laundering, comprising laundering a garment with a detergent composition as described herein, preferably at a temperature of 40° C. or less, or more preferably at a temperature of 30° C. or less, or even more preferably at a temperature of 20° C. or less. Accordingly, the method of laundering comprises laundering a fabric with a detergent composition comprising (i) at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and (ii) at least one protease having protease activity, wherein said protease is selected from the group of: (a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 2, 3, 19, 20, or 23; (b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2; (c) a protease variant comprising an modification in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3, (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO: 23, preferably at a temperature of 40° C. or less, or more preferably at a temperature of 30° C. or less, or even more preferably at a temperature of 20° C. or less.

These methods include a method for laundering a fabric. The method comprises the steps of contacting a fabric to be laundered with a cleaning laundry solution comprising a detergent composition. The fabric may comprise any fabric capable of being laundered in normal consumer use conditions. The solution preferably has a pH from about 5.5 to about 11.5. The compositions may be employed at concentrations from about 100 ppm, preferably 500 ppm to about 15,000 ppm in solution. The water temperatures typically range from about 5° C. to about 95° C., including about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C. and about 90° C. The water to fabric ratio is typically from about 1:1 to about 30:1.

In particular embodiments, the washing method is conducted at a pH from about 5.0 to about 11.5, or from about 6 to about 10.5, about 5 to about 11, about 5 to about 10, about 5 to about 9, about 5 to about 8, about 5 to about 7, about 5.5 to about 11, about 5.5 to about 10, about 5.5 to about 9, about 5.5 to about 8, about 5.5. to about 7, about 6 to about 11, about 6 to about 10, about 6 to about 9, about 6 to about 8, about 6 to about 7, about 6.5 to about 11, about 6.5 to about 10, about 6.5 to about 9, about 6.5 to about 8, about 6.5 to about 7, about 7 to about 11, about 7 to about 10, about 7 to about 9, or about 7 to about 8, about 8 to about 11, about 8 to about 10, about 8 to about 9, about 9 to about 11, about 9 to about 10, about 10 to about 11, preferably about 5.5 to about 11.5.

In particular embodiments, the washing method is conducted at a degree of hardness of from about 0° dH to about 30° dH, such as about 1° dH, about 2° dH, about 3° dH, about 4° dH, about 5° dH, about 6° dH, about 7° dH, about 8° dH, about 9° dH, about 10° dH, about 11° dH, about 12° dH, about 13° dH, about 14° dH, about 15° dH, about 16° dH, about 17° dH, about 18° dH, about 19° dH, about 20° dH, about 21° dH, about 22° dH, about 23° dH, about 24° dH, about 25° dH, about 26° dH, about 27° dH, about 28° dH, about 29° dH, about 30° dH. Under typical European wash conditions, the degree of hardness is about 16° dH, under typical US wash conditions about 6° dH, and under typical Asian wash conditions, about 3° dH.

The detergent composition according to the invention is further ideally suited for use in dishwashing applications, such as automatic dishwashing. Thus, in one aspect, the present invention relates to a method of dishwashing in an automatic dishwashing machine using a detergent composition as described herein, comprising the steps of adding said detergent composition in a detergent composition compartment in said automatic dishwashing machine, and releasing said detergent composition during a main-wash cycle. Accordingly, the method of dishwashing in an automatic dishwashing machine using a detergent composition comprising (i) at least one alpha-amylase variant comprising an modification in one or more positions corresponding to positions 1, 54, 56, 72, 109, 113, 116, 134, 140, 159, 167, 169, 172, 173, 174, 181, 182, 183, 184, 189, 194, 195, 206, 255, 260, 262, 265, 284, 289, 304, 305, 347, 391, 395, 439, 469, 444, 473, 476, or 477 of SEQ ID NO: 1, wherein said alpha-amylase variant has a sequence identity of at least 75% but less than 100% to SEQ ID NO: 1 and wherein said alpha-amylase variant has alpha-amylase activity; and (ii) at least one protease having protease activity, wherein said protease is selected from the group of: (a) a protease having a sequence identity of at least 70%, such as at least 75%, such as at least 80%, such as at least 85%, such as at least 90%, such as at least 95%, such as at least 98%, such as at least 99%, such as 100%, to the sequences of SEQ ID NOs: 2, 3, 19, 20, or 23; (b) a protease variant comprising a substitution at one or more positions corresponding to positions 171, 173, 175, 179, or 180 of SEQ ID NO: 2, wherein said protease variant has a sequence identity of at least 75% but less than 100% to SEQ ID NO: 2; (c) a protease variant comprising an modification in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, and 216 as compared with the protease in SEQ ID NO:3, wherein said protease variant has at least 75% sequence identity to SEQ ID NO: 3, (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 60% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 75% sequence identity to SEQ ID NO: 23, comprising the steps of adding said detergent composition in a detergent composition compartment in said automatic dishwashing machine, and releasing said detergent composition during a main-wash cycle.

The compositions for use in the methods described above may further comprises at least one additional enzyme as set forth in the section above, such as an enzyme selected from the group of hydrolases such as proteases, lipases and cutinases, carbohydrases such as amylases, cellulases, hemicellulases, xylanases, and pectinase or a combination hereof.

The present invention is further described by the following examples that should not be construed as limiting the scope of the invention.

EXAMPLES

Materials and Methods

General Molecular Biology Methods:

Unless otherwise mentioned the DNA manipulations and transformations were performed using standard methods of molecular biology (Sambrook et al. (1989); Ausubel et al. (1995); Harwood and Cutting (1990).

Automatic Mechanical Stress Assay (AMSA) for Laundry

In order to assess the wash performance in laundry washing experiments are performed, using the Automatic Mechanical Stress Assay (AMSA). With the AMSA, the wash performance of a large quantity of small volume enzyme-detergent solutions can be examined. The AMSA plate has a number of slots for test solutions and a lid firmly squeezing the laundry sample, the textile to be washed against all the slot openings. During the washing time, the plate, test solutions, textile and lid are vigorously shaken to bring the test solution in contact with the textile and apply mechanical stress in a regular, periodic oscillating manner. For further description see WO02/42740 especially the paragraph "Special method embodiments" at page 23-24.

The wash performance is measured as the brightness of the colour of the textile washed. Brightness can also be expressed as the intensity of the light reflected from the sample when illuminated with white light. When the sample is stained the intensity of the reflected light is lower, than that of a clean sample. Therefore the intensity of the reflected light can be used to measure wash performance.

Colour measurements are made with a professional flatbed scanner (Kodak iQsmart, Kodak, Midtager 29, DK-2605 Brøndby, Denmark), which is used to capture an image of the washed textile.

To extract a value for the light intensity from the scanned images, 24-bit pixel values from the image are converted into values for red, green and blue (RGB). The intensity value (Int) is calculated by adding the RGB values together as vectors and then taking the length of the resulting vector:

$$Int-\sqrt{r^2+g^2+b^2}$$

TABLE 1a

Composition of model detergents and test materials

| Compound | Content of compound (% w/w) | Active component (% w/w) |
|---|---|---|
| LAS | 12.0 | 97 |
| AEOS, SLES | 17.6 | 28 |
| Soy fatty acid | 2.8 | 90 |
| Coco fatty acid | 2.8 | 99 |
| AEO | 11.0 | 100 |
| Sodium hydroxide | 1.8 | 99 |
| Ethanol/Propan-2-ol | 3.0 | 90/10 |
| MPG | 6.0 | 98 |
| Glycerol | 1.7 | 99.5 |
| TEA | 3.3 | 100 |
| Sodium formate | 1.0 | 95 |
| Sodium citrate | 2.0 | 100 |
| DTMPA (as $Na_7$-salt) | 0.5 | 42 |
| PCA (as Na-salt) | 0.5 | 40 |
| Phenoxy ethanol | 0.5 | 99 |
| Ion exchanged water | 33.6 | — |

Water hardness was adjusted to 15° dH by addition of $CaCl_2$, $MgCl_2$, and $NaHCO_3$ ($Ca^{2+}$:$Mg^{2+}$:$HCO^{3-}$=4:1:7.5) to the test system. After washing the textiles were flushed in tap water and dried.

TABLE 1b

| Model detergent X | | |
|---|---|---|
| Compound | Content of compound (% w/w) | Active component (% w/w) |
| LAS | 16.5 | 91 |
| AEO* | 2 | 99.5 |
| Sodium carbonate | 20 | 100 |
| Sodium (di)silicate | 12 | 82.5 |
| Zeolite A | 15 | 80 |
| Sodium sulfate | 33.5 | 100 |
| PCA | 1 | 100 |

*Model detergent X is mixed without AEO. AEO is added separately before wash.

Water hardness was adjusted to 12° dH by addition of $CaCl_2$, $MgCl_2$, and $NaHCO_3$ ($Ca^{2+}$:$Mg^{2+}$:$HCO^{3-}$=2:1:4.5) to the test system. After washing the textiles were flushed in tap water and dried.

TABLE 1c

| Model detergent O | |
|---|---|
| Compound | Content of compound (% w/w) |
| LAS | 4 |
| AEOS | 8 |
| AOE | 4 |
| Soap | 1 |

Water hardness adjusted to 12° dH by addition of $CaCl_2$, $MgCl_2$, and $NaHCO_3$ ($Ca^{2+}$:$Mg^{2+}$:$HCO^{3-}$=2:1:4.5) to the test system. After washing the textiles were flushed in tap water and dried.

TABLE 1d

| Model detergent Z | | |
|---|---|---|
| Compound | Content of compound (% w/w) | % active component (% w/w) |
| LAS | 7.0 | 85.3 |
| Soap | 1.1 | 93 |
| AEO* | 1.5 | 99.5 |
| Soda ash | 20.1 | 99.5 |
| Hydrous sodium silicate | 10.0 | 80.1 |
| Zeolite A | 5.0 | 80 |
| Sodium citrate | 2.0 | 100 |
| HEDP-$Na_4$ | 0.2 | 84 |
| Polyacrylate | 1.1 | 92 |
| Sodium sulfate | 52.0 | 100 |

*Model detergent Z is mixed without AEO. AEO is added separately before wash.

Water hardness was adjusted to 15° dH by addition of $CaCl_2$, $MgCl_2$, and $NaHCO_3$ ($Ca^{2+}$:$Mg^{2+}$:$HCO^{3-}$=4:1:7.5) to the test system. After washing the textiles were flushed in tap water and dried. pH was adjusted with 4 M NaOH.

TABLE 1e

| Model detergent Z with bleach | | |
|---|---|---|
| Compound | Content of compound (% w/w) | % active component (% w/w) |
| LAS | 7.0 | 85.3 |
| Soap | 1.1 | 93 |
| AEO* | 1.5 | 99.5 |
| Soda ash | 20.1 | 99.5 |
| Hydrous sodium silicate | 10.0 | 80.1 |
| Zeolite A | 5.0 | 80 |
| Sodium citrate | 2.0 | 100 |
| HEDP-$Na_4$ | 0.2 | 84 |
| Polyacrylate | 1.1 | 92 |
| Sodium percarbonate | 9.3 | 86 |
| TEAD | 1.1 | 91.8 |
| Sodium sulfate | 41.6 | 100 |

*Model detergent Z is mixed without AEO. AEO is added separately before wash.

Water hardness was adjusted to 15° dH by addition of $CaCl_2$, $MgCl_2$, and $NaHCO_3$ ($Ca^{2+}$:$Mg^{2+}$:$HCO^{3-}$=4:1:7.5) to the test system. After washing the textiles were flushed in tap water and dried. pH was adjusted with 4 M NaOH.

TABLE 1f

| Liquid base detergent formulation (% w/w in total composition) | | | | |
|---|---|---|---|---|
| Component | Composition 1 | Composition 2 | Composition 3 | Composition 4 |
| [0]Alpha-amylase | 0.05 | 0.14 | 0.08 | 0.3 |
| [1]Protease | 0.25 | 0.47 | 0.7 | 1.0 |
| [2]Other (additional) enzymes | 0.16 | 0.61 | 0.22 | 1.3 |
| Optical brightener/colorant | 0.03 | 0.12 | 0.09 | 0.40 |
| Perfume | 0.34 | 1.4 | 1.0 | 1.4 |
| Monopropyleneglycol | — | 2.00 | — | — |
| Nonionic Surfactant | 1.16 | 3.92 | — | 4.365 |
| Acrylate Co-polymer | — | 1.00 | — | 0.85 |
| Linear Alkylbenzene Sulphonic acid | 4.63 | 5.227 | 5.60 | 5.82 |
| Ethanolamine | — | 1.93 | — | — |
| Triethanolamine | 1.50 | 0.467 | 1.868 | 6.56 |
| Fatty Acid | — | 1.633 | — | 0.86 |
| HEDP (1-hydroxyethane 1,1-diphosphonic acid) | — | 0.70 | — | 1.50 |
| Citric Acid | 2.00 | — | 0.498 | — |
| Sodium laureth sulphate | 5.79 | 3.92 | 16.80 | 4.365 |
| Oxygen scavenger | — | 0.117 | — | — |
| Ethoxylated Polyethylene imine | — | 1.40 | 2.10 | 3.10 |

TABLE 1f-continued

| Liquid base detergent formulation (% w/w in total composition) | | | | |
|---|---|---|---|---|
| Component | Composition 1 | Composition 2 | Composition 3 | Composition 4 |
| Soil Release Polymer | — | 0.467 | 0.28 | 1.00 |
| Preservative | — | 0.01 | 0.04 | 0.03 |
| NaCl | 0.25 | — | 0.20 | — |
| Glycerol | 2.20 | — | 1.00 | — |
| Base | 1.56 | — | 0.61 | — |
| Zwitterion | — | — | 1.50 | — |
| Thickener | 0.114 | — | — | — |
| Water | to balance | to balance | to balance | to balance |

[0]alpha-amylase variant as herein disclosed.
[1]protease as herein disclosed or variant thereof herein disclosed
[2]other enzymes may include mannanase, pectate lyase, lipase, endoglucanase and cellulase.

Automatic Mechanical Stress Assay (AMSA) for Automatic Dishwashing

A test solution comprising water (21° dH), 3.94 g/L ADW model detergent with bleach or 3.45 g/L ADW model detergent without bleach, as described below, and the detergent composition of the invention at concentrations of 0.03, 0.06, 0.12 and 0.24 mg enzyme protein/L (40° C.) or 0.01, 0.03, 0.06 and 0.12 mg enzyme protein/L (50° C.), are prepared. Fabrics stained with soils relevant for the enzymes present in the detergent composition, such as starch (CS-28 from Center For Test materials BV, P.O. Box 120, 3133 KT, Vlaardingen, The Netherlands), are added and washed for 10 or 20 minutes at 40° C. and 50° C., as specified below. After thorough rinse under running tap water and drying in the dark, the light intensity values of the stained fabrics were subsequently measured as a measure for wash performance. The test with 0 mg enzyme protein/L was used as a blank and corresponded to the contribution from the detergent. Preferably mechanical action is applied during the wash step, e.g. in the form of shaking, rotating or stirring the wash solution with the fabrics and tiles. The AMSA wash performance experiments are conducted under the experimental conditions specified below:

TABLE 2

| Experimental condition | |
|---|---|
| Detergent | Powder ADW model detergent with bleach (see Table B1) or powder ADW model detergent without bleach (see Table B2) |
| Detergent dosage | 3.94 g/L (with bleach) or 3.45 g/L (without bleach) |
| Test solution volume | 160 micro L |
| pH | As is |
| Wash time | 10 or 20 minutes |
| Temperature | 40° C. or 50° C. |
| Water hardness | 21° dH ($Ca^{2+}$:$Mg^{2+}$:$HCO3^-$ = 4:1:10) |
| Enzyme concentration in test | 0.03, 0.06, 0.12 and 0.24 mg enzyme protein/L (40° C.) or 0.01, 0.03, 0.06 and 0.12 mg enzyme protein/L (50° C.) |
| Test material | E.g. CS-28 (Rice starch cotton) |

TABLE 3

| ADW model detergent with bleach | | |
|---|---|---|
| Compound | Content active ingredients | Fraction active component |
| MGDA (Trilon M Granules SG) | 20% | 59% |
| Sodium citrate | 20% | 100% |
| Sodium carbonate | 20% | 100% |
| Sodium percarbonate | 10% | 88% |
| Sodium Silicate | 5% | 80% |
| Sodium sulfate | 12% | 100% |
| Acusol 588G | 5% | 92% |
| TAED | 3% | 92% |
| Surfac 23-6.5 (liq) | 5% | 100% |

TABLE 4

| ADW model detergent without bleach | | |
|---|---|---|
| Compund | Content active ingredients | Fraction active component |
| MGDA (Trilon M Granules SG) | 33% | 59% |
| Sodium citrate | 20% | 100% |
| Sodium carbonate | 20% | 100% |
| Sodium Silicate | 6% | 80% |
| Sodium sulfate | 12% | 100% |
| Acusol 588G | 5% | 92% |
| Surfac 23-6.5 (liq) | 5% | 100% |

Water hardness is adjusted to 21° dH by addition of $CaCl_2$, $MgCl_2$, and $NaHCO_3$ ($Ca^{2+}$:$Mg^{2+}$:$HCO_{3\_}$=4:1:10) to the test system. After washing the textiles were flushed in tap water and dried.

The wash performance was measured as the brightness expressed as the intensity of the light reflected from the sample when illuminated with white light. When the sample was stained the intensity of the reflected light was lower, than that of a clean sample. Therefore the intensity of the reflected light can be used to measure wash performance.

Color measurements were made with a professional flatbed scanner (EPSON Expression 10000XL, EPSON) used to capture an image of the washed textile.

To extract a value for the light intensity from the scanned images, 48□24 Bit Color pixel values from the image were converted into values for red, green and blue (RGB). The intensity value (Int) is calculated by adding the RGB values together as vectors and then taking the length of the resulting vector:

$$Int\text{-}\sqrt{r^2+g^2+b^2}$$

Full-Scale Automatic Dish Wash (ADW)

Melamine tiles stained with e.g. starch (CS-28 from Center For Test materials BV, P.O. Box 120, 3133 KT, Vlaardingen, The Netherlands) waiss used as test material and washed at set programs at 40° C. and 50° C. using water with 21° dH, as specified below. After three minutes of running the machine program, the detergent and the enzyme at a concentration of 2.55 mg enzyme/wash or 5.12 mg enzyme/wash is added. After thorough rinse under running tap water and drying in the dark, the light intensity values of the stained tiles were subsequently measured as a measure for wash performance. The test with 0 mg enzyme protein/L is used as a blank and corresponded to the contribution from the detergent. The full scale wash performance experiments are conducted under the experimental conditions specified below:

TABLE 5

| Experimental condition | |
|---|---|
| Detergent | Powder ADW model detergent with bleach (see Table B1 or powder model detergent without bleach (see Table B2) |
| Detergent dosage | 21.27 g/wash (with bleach) or 18.61 g/L (without bleach) |
| pH | As is |
| Wash time | Set program. |
| Temperature | 40° C. or 50° C. |
| Water hardness | Tap water |
| Enzyme concentration in test | 2.55 mg enzyme/wash or 5.12 mg enzyme/wash |
| Test material | DM-77 and DM-177 at 40° C. or DM-277 and DM-377 at 50° C. All mixed starch melamine tiles. |

TABLE 6

| ADW model detergent with bleach | | |
|---|---|---|
| Compund | Conten tactive ingredients | Fraction active component |
| MGDA (Trilon M Granules SG) | 20% | 59% |
| Sodium citrate | 20% | 100% |
| Sodium carbonate | 20% | 100% |
| Sodium percarbonate | 10% | 88% |
| Sodium Silicate | 5% | 80% |
| Sodium sulfate | 12% | 100% |
| Acusol 588G | 5% | 92% |
| TAED | 3% | 92% |
| Surfac 23-6.5 (liq) | 5% | 100% |

TABLE 7

| ADW model detergent without bleach | | |
|---|---|---|
| Compund | Content active ingredients | Fraction active component |
| MGDA (Trilon M Granules SG) | 33% | 59% |
| Sodium citrate | 20% | 100% |
| Sodium carbonate | 20% | 100% |
| Sodium Silicate | 6% | 80% |
| Sodium sulfate | 12% | 100% |
| Acusol 588G | 5% | 92% |
| Surfac 23-6.5 (liq) | 5% | 100% |

After washing the melamine tiles are flushed in tap water and dried.

The wash performance is measured as difference in remission. The remission measurements were made with a Color-Eye 7000 (CE7000) used for taking spectra and performing calculations of remission and/or colour difference. The remission is measured at at 460 nm with no UV light in the illuminant.

Alpha-Amylase Activity Assay—pNP-G7 Assay

The alpha-amylase activity may be determined by a method employing the G7-pNP substrate. G7-pNP which is an abbreviation for 4,6-ethylidene($G_7$)-p-nitrophenyl($G_1$)-α, D-maltoheptaoside, a blocked oligosaccharide which can be cleaved by an endo-amylase, such as an alpha-amylase. Following the cleavage, the alpha-Glucosidase included in the kit digest the hydrolysed substrate further to liberate a free PNP molecule which has a yellow color and thus can be measured by visible spectophometry at λ=405 nm (400-420 nm.). Kits containing G7-pNP substrate and alpha-Glucosidase is manufactured by Roche/Hitachi (cat. No. 11876473).

Reagents:

The G7-pNP substrate from this kit contains 22 mM 4,6-ethylidene-G7-pNP and 52.4 mM HEPES (2-[4-(2-hydroxyethyl)-1-piperazinyl]-ethanesulfonic acid), pH 7.0). The alpha-Glucosidase reagent contains 52.4 mM HEPES, 87 mM NaCl, 12.6 mM $MgCl_2$, 0.075 mM $CaCl_2$, ≥4 kU/L alpha-glucosidase).

The substrate working solution is made by mixing 1 mL of the alpha-Glucosidase reagent with 0.2 mL of the G7-pNP substrate. This substrate working solution is made immediately before use. Dilution buffer: 50 mM MOPS, 0.05% (w/v) Triton X100 (polyethylene glycol p-(1,1,3,3-tetramethylbutyl)-phenyl ether ($C_{14}H_{22}O(C_2H_4O)_n$ (n=9-10))), 1 mM $CaCl_2$), pH8.0.

Procedure:

The amylase sample to be analyzed is diluted in dilution buffer to ensure the pH in the diluted sample is 7. The assay is performed by transferring 20 μl diluted enzyme samples to 96 well microtiter plate and adding 80 μl substrate working solution. The solution is mixed and pre-incubated 1 minute at room temperature and absorption is measured every 20 sec. over 5 minutes at OD 405 nm.

The slope (absorbance per minute) of the time dependent absorption-curve is directly proportional to the specific activity (activity per mg enzyme) of the alpha-amylase in question under the given set of conditions. The amylase sample should be diluted to a level where the slope is below 0.4 absorbance units per minute.

Alpha-Amylase Activity Assay—Phadebas Activity Assay

The alpha-amylase activity may also be determined by a method using the Phadebas substrate (from for example Magle Life Sciences, Lund, Sweden). A Phadebas tablet includes interlinked starch polymers that are in the form of globular microspheres that are insoluble in water. A blue dye is covalently bound to these microspheres. The interlinked starch polymers in the microsphere are degraded at a speed that is proportional to the alpha-amylase activity. When the alpha-amylase degrades the starch polymers, the released blue dye is water soluble and concentration of dye can be determined by measuring absorbance at 620 nm. The concentration of blue is proportional to the alpha-amylase activity in the sample.

The alpha-amylase sample to be analyzed is diluted in activity buffer with the desired pH. Two substrate tablets are suspended in 5 mL activity buffer and mixed on magnetic stirrer. During mixing of substrate transfer 150 μl to microtiter plate (MTP) or PCR-MTP. Add 30 μl diluted amylase sample to 150 μl substrate and mix. Incubate for 15 minutes at 37° C. The reaction is stopped by adding 30 μl 1M NaOH and mix. Centrifuge MTP for 5 minutes at 4000×g. Transfer 100 μl to new MTP and measure absorbance at 620 nm.

The alpha-amylase sample should be diluted so that the absorbance at 620 nm is between 0 and 2.2, and is within the linear range of the activity assay.

Alpha-Amylase Activity Assay—Amylazyme Activity Assay

The alpha-amylase activity may also be determined by a method using the Amylazyme substrate (Megazyme® Amylazyme Test, supplied by Megazyme for the assay of cereal and bacterial amylases) comprising AZCL-amylose, which has been mixed with lactose and magnesium stearate and tabletted. A blue dye is covalently bound to these microspheres. The interlinked amylose polymers in the microsphere are degraded at a speed that is proportional to the alpha-amylase activity. When the alpha-amylase degrades the starch polymers, the released blue dye is water soluble and concentration of dye may be determined by measuring absorbance at 590 nm. The concentration of blue is proportional to the alpha-amylase activity in the sample.

The alpha-amylase sample to be analyzed is diluted in activity buffer with the desired pH. Two substrate tablets are suspended in 5 mL activity buffer and mixed on magnetic stirrer. During mixing of substrate 150 μl is transferred to a microtiter plate (MTP) or PCR-MTP. Next, 25 μl diluted amylase sample is added to 150 μl substrate and mixed. The mixture is incubated for 10 minutes at 37° C. The reaction is stopped by adding 25 μl 1M NaOH and mixed. MTP is centrifuged for 5 minutes at 4000×g, followed by transferring 100 μl to a new MTP and absorbance is measured at 590 nm.

Protease Activity Assays:

1) Suc-AAPF-pNA Activity Assay:

The proteolytic activity can be determined by a method employing the Suc-AAPF-PNA substrate. Suc-AAPF-PNA is an abbreviation for N-Succinyl-Alanine-Alanine-Proline-Phenylalanine-p-Nitroanilide, and it is a blocked peptide which can be cleaved by endo-proteases. Following cleavage a free PNA molecule is liberated and it has a yellow colour and thus can be measured by visible spectrophotometry at wavelength 405 nm. The Suc-AAPF-PNA substrate is manufactured by Bachem (cat. no. L1400, dissolved in DMSO).

The protease sample to be analyzed was diluted in residual activity buffer (100 mM Tris pH8.6). The assay was performed by transferring 60 μl of diluted enzyme samples to 96 well microtiter plate and adding 140 μl substrate working solution (0.72 mg/ml in 100 mM Tris pH8.6). The solution was mixed at room temperature and absorption is measured every 20 sec. over 5 minutes at OD 405 nm. The slope (absorbance per minute) of the time dependent absorption-curve is directly proportional to the specific activity (activity per mg enzyme) of the protease in question under the given set of conditions. The protease sample should be diluted to a level where the slope is linear.

Example 1: Preparation and Testing of Variants Comprised in the Detergent Composition of the Invention Site-directed variants were constructed of the parent alpha-amylase (SEQ ID NOs: 1 and 14) and the parent proteases (SEQ ID NOs: 2 and 3) comprising specific modifications in the regions as defined elsewhere herein. The variants were made by traditional cloning of DNA fragments (Sambrook et al., Molecular Cloning: A Laboratory Manual, 2nd Ed., Cold Spring Harbor, 1989) using PCR together with properly designed mutagenic oligonucleotides that introduced the desired mutations in the resulting sequence. Mutagenic oligos were synthesized corresponding to the DNA sequence flanking the desired site(s) of mutation, separated by the DNA base pairs defining the insertions/deletions/substitutions. In this manner, the variants listed in table 2a below were constructed and produced.

Fermentation of Variants

Fermentation may be performed by methods well known in the art or as follows. A *B. subtilis* strain harboring the relevant expression plasmid was streaked on a LB-agar plate with a relevant antibiotic (6 μg/ml chloramphenicol), and grown overnight at 37° C.

The colonies were transferred to 100 ml PS-1 media supplemented with the relevant antibiotic in a 500 ml shaking flask containing a rich media (e.g. PS-1: 100 g/L Sucrose (Danisco cat. no. 109-0429), 40 g/L crust soy (soy bean flour), 10 g/L $Na_2HPO_4.12H_2O$ (Merck cat. no. 6579), 0.1 ml/L Pluronic PE 6100 (BASF 102-3098)). Cultivation typically takes 4 days at 30° C. shaking with 220 rpm. Cells and other undissolved material were removed from the fermentation broth by centrifugation at 4500 rpm for 20-25 minutes. Afterwards the supernatant was filtered to obtain a clear solution.

Example 2: Combination of Alpha-Amylase and Protease in Manual Dishwash (MDW)

In order to demonstrate the benefit of an alpha-amylase variant in combination with a protease variant in manual dish washing, experiments were conducted using the method and conditions described below.

General Description of the Method

Soiled melamine tiles were soaked in a a Beromin Detergent base solution (concentration of 0.5 g/L), comprising the specified amount of enzymes and having a starting temperature of 43° C. for a given period of time—typically 0, 15 or 30 minutes.

After soaking, a given tile was placed in the manual dish washing (MDW) scrubbing machine and scrubbed for a given number of times—typically 12, 24 or 32 times.

After scrubbing the tile was gently rinsed under running tap water for 5 seconds and dried while lying horizontally at room temperature for at least 2 h.

After drying, the R460 value at the center of the tile was measured using a standard Color Eye apparatus (Macbeth (USA, U.K., Germany), Supplier: Largo, Model: 370).

Soiled Tiles

The soiled tiles used were standard soiled melamine tiles intended for testing the cleaning power of dishwash detergents, marketed under the name of CFT Dishwash Monitors. The tiles are produced by Center For Testmaterials BV (Vlaardingen, the Netherlands). The following soiled tiles identified by product number were used:

DM-42 Blueberry Pie

DM-03 Shepherd's Pie

DM-75 Chocolate Pudding

The MDW Scrubbing Machine

The MDW scrubbing machine used was the AB5000 abrasion and washability tester (TQC Thermimport Quality Control, Capelle aan den Ussel, the Netherlands) consisting of an electrified mechanical device onto which a normal kitchen dishwashing sponge was mounted on a holding arm. In operation the holding arm, and hence the sponge, was moved back and forth over a soiled tile in a reproducible uniform way for a given number of times which was set using a counter incorporated in the scrubbing machine. The machine further comprises a slot wherein an exchangeable, flat soiled tile (approximately 10 cm*12 cm*0.5 cm) can be mounted so that it can engage with the sponge on the holding arm. Ata certain position in the movement cycle of the holding arm, the sponge comes in contact with the surface of the soiled tile and is moved across the soiled tile in a reproducible way. The sponge exerts a constant pressure on the soiled tile, resembling how a person could be cleaning the surface of a given soiled piece of kitchenware during a manual dishwashing process. During the scrubbing process, there was a flow of detergent solution with or without enzyme composition on to the soiled tile being cleaned. The flow rate was 3 mL/min and water hardness was 15° dH ($Ca^{2+}$:$Mg^{2+}$:$HCO_3^-$=4:1:7.5).

Enzymes

The alpha-amylase used was an alpha-amylase variant of SEQ ID NO: 14 having the following modifications; H1*+N54S+V56T+K72R+G109A+F113Q+R116Q+W167F+Q172G+A174S+G182*+D183*+G184T+N195F+V206L+K391A+P473R+G476K and the protease used was the protease of SEQ ID NO: 21 (Protease 2) used in the dosages indicated in the tables below.

Results:

The soiled tiles used were DM-03 Shepherd's Pie (Table 8), DM-42 Blueberry yoghurt (Table 9), DM-75 Chocolate Pudding (Table 10). The enzyme levels were dosed on top of detergent and based on the 100% detergent dosage. The number of repetitions for each tested combination of variables was two. Soil removal was evaluated by measurement of remission values at 460 nm using a standard Color Eye apparatus.

TABLE 8

Effect of amylase and protease on DM-03 Shepherd's Pie removal. An R460 value of 4.95 +/− 0.14 is equivalent to "no soil removal".

| Detergent dosage (g/L) | Alpha-amylase dosage (wt %) | Protease 2 dosage (wt %) | Number of scrubbings | Soaking Time (min.) | R460 |
|---|---|---|---|---|---|
| 0.5 | 0 | 0 | 32 | 30 | 38.42 |
| | 0.04 | 0.16 | | 15 | 49.65 |
| | | | | 30 | 47.41 |

TABLE 9

Effect of amylase and protease on DM-42 Blueberry yoghurt removal. An R460 value of 4.95 +/− 0.14 is equivalent to "no soil removal".

| 100% Detergent dosage (g/L) | Amylase dosage (wt %) | Protease 2 dosage (wt %) | Number of scrubbings | Soaking Time (min.) | R460 |
|---|---|---|---|---|---|
| 0.5 | 0 | 0 | 12 | 15 | 27.00 |
| | | | 24 | | 29.38 |
| | 0.04 | 0.16 | 12 | 15 | 27.72 |
| | | | 24 | | 46.17 |
| | 0.06 | 0.24 | 12 | 15 | 34.37 |
| | | | 24 | | 60.21 |

TABLE 10

Effect of an alpha-amylase and a protease variant on DM-75 Chocolate Pudding removal. An R460 value of 4.95 +/− 0.14 is equivalent to "no soil removal".

| 100% Detergent dosage (g/L) | Alpha-amylase dosage (wt %) | Protease 2 dosage (wt %) | Number of scrubbings | Soaking Time (min.) | R460 |
|---|---|---|---|---|---|
| 0.5 | 0 | 0 | 12 | 15 | 16.40 |
| | | | | 30 | 17.63 |
| | | | 24 | 15 | 16.47 |
| | | | | 30 | 23.80 |
| | 0.04 | 0.16 | 12 | 15 | 25.08 |
| | | | | 30 | 33.38 |
| | | | 24 | 15 | 41.89 |
| | | | | 30 | 56.77 |
| | 0.06 | 0.24 | 12 | 15 | 31.13 |
| | | | | 30 | 46.12 |
| | | | 24 | 15 | 45.10 |
| | | | | 30 | 60.87 |
| | 0.08 | 0.32 | 12 | 15 | 49.68 |
| | | | | 30 | 51.88 |
| | | | 24 | 15 | 61.39 |
| | | | | 30 | 71.11 |

Example 3: Combination of Alpha-Amylase and Protease in Manual Dishwash (MDW)

The enzymes used in Example 2 was tested in another detergent base and on other tiles as well. Accordingly, the method performed was identical with that of Example 2 with the exception that the detergent base was W5 (a commercially bought hand dishwash detergent from Lidl, DK) in a 100% detergent dosage of 0.6 g/L, the soiled tile tested was solely DM-42 Blueberry yoghurt, and the number of scrubbings applied were 12, and 24.

Results:

The soiled tile used was DM-42 Blueberry yoghurt (Table 11). The detergent, alpha-amylase, and protease used were as described in Example 2. The enzyme levels were dosed on top of detergent and based on the 100% detergent dosage. The number of repetitions for each tested combination of variables was two. Soil removal was evaluated by measurement of remission values at 460 nm using a standard Color Eye apparatus.

TABLE 11

Effect of an alpha-amylase and a protease on DM-42 Blueberry yoghurt removal. An R460 value of 4.95 +/− 0.14 is equivalent to "no soil removal".

| 100% Detergent dosage (g/L) | Alpha-amylase dosage (wt %) | Protease 2 dosage (wt %) | Number of scrubbings | Soaking Time (min.) | R460 |
|---|---|---|---|---|---|
| 0.6 | 0 | 0 | 12 | 15 | 13.08 |
| | | | 24 | | 22.16 |
| 0.6 | 0.05 | 0 | 12 | 15 | 16.12 |
| | | | 24 | | 26.97 |
| 0.6 | 0.05 | 0.2 | 12 | 15 | 16.27 |
| | | | 24 | | 30.97 |
| 0.6 | 0.1 | 0.2 | 12 | 15 | 24.97 |
| | | | 24 | | 55.66 |

Example 4: Use of Amylase and Protease in MDW

The experiment was performed as described in Example 2 with the following specifications;

Detergent: W5 Manual dishwash base (obtained from Lidl, Denmark)

100% detergent dosage: 5/L

Soiled tiles: DM-07 Pasta Bolognese, DM-54 Oatmeal with chocolate, and DM-06 Baked Cheese

- Number of scrubbings applied on the soil: 12 and 32
- For the DM-06 Baked Cheese, a 75 g weight was put on the sponge in the machine Results The results obtained from the experiment are shown in the tables below; Table 12 showing the effect on DM-07 Pasta Bolognese, Table 13 showing the effect on DM-54 Oatmeal chocolate, and Table 14 showing the effect on DM-06 Baked Cheese.

TABLE 12

Amylase and protease effect on DM-07 Pasta Bolognese

| Detergent dosage (g/L) | Amylase dosage (wt %) | Protease dosage (wt %) | Number of scrubbings | Soaking Time (min.) | R460 | Adjusted R460 | Expected R460 |
|---|---|---|---|---|---|---|---|
| 5 | 0 | 0 | 12 | 30 | 14.40 | 0 | — |
| | 0 | 0.8 | | 30 | 18.41 | 4.01 | — |
| | 0.05 | 0 | | 30 | 54.55 | 40.15 | — |
| | 0.05 | 0.8 | | 30 | 71.05 | 56.65 | 44.16 |

The synergistic effect of the combination of amylase and protease shown is the difference between the "Adjusted R460" and the "Expected R460", which is calculated to be: (Adjusted R460)−(Expected R460)=Synergy=>56.65−45.16=11.49.

TABLE 13

Amylase and protease effect on DM-54 Oatmeal chocolate

| Detergent dosage (g/L) | Amylase dosage (wt %) | Protease dosage (wt %) | Number of scrubbings | Soaking Time (min.) | R460 | Adjusted R460 | Expected R460 |
|---|---|---|---|---|---|---|---|
| 5 | 0 | 0 | 12 | 15 | 13.99 | 0 | — |
| | 0 | 0.8 | | 15 | 20.73 | 6.74 | — |
| | 0.05 | 0 | | 15 | 15.74 | 1.75 | — |
| | 0.05 | 0.8 | | 15 | 40.52 | 26.53 | 8.49 |

The synergistic effect of the combination of amylase and protease shown is the difference between the "Adjusted R460" and the "Expected R460", which is calculated to be: (Adjusted R460)−(Expected R460)=Synergy=>26.53−8.49=18.04.

TABLE 14

Amylase and protease effect on DM-06 Baked Cheese

| Detergent dosage (g/L) | Amylase dosage (wt %) | Protease dosage (wt %) | Number of scrubbings | Soaking Time (min.) | R460 | Adjusted R460 | Expected R460 |
|---|---|---|---|---|---|---|---|
| 5 | 0 | 0 | 32 | 30 | 23.44 | 0 | — |
| | 0 | 0.8 | | | 24.53 | 1.09 | — |
| | 0.05 | 0 | | | 68.11 | 44.67 | — |
| | 0.05 | 0.8 | | | 76.71 | 53.27 | 45.76 |

The synergistic effect of the combination of amylase and protease shown is the difference between the "Adjusted R460" and the "Expected R460", which is calculated to be: (Adjusted R460)−(Expected R460)=Synergy=>53.27−45.76=7.51.

Example 5: Alpha-Amylase and Protease in Laundry Terg-O-Meter (TOM) Trials

TOM wash is a small scale test simulating "Top-loaderNertical Drum" laundry machine wash. TOM is mainly used for running laundry tests, under different wash conditions. The following enzymes (and combinations hereof) were tested;

TABLE 15

| Tested enzyme variants |
|---|
| Protease 2 |
| Protease 3 |
| Amylase 1 (Alpha-amylase of SEQ ID NO: 14) |
| Amylase 2 (Alpha-amylase of SEQ ID NO: 14 + G182* + D183*) |
| Amylase 3 (Alpha-amylase of SEQ ID NO: 14 + H1* + G109A + G182* + D183* + N195F + V206Y + K391A) |
| Amylase 4 (Alpha-amylase of SEQ ID NO: 14 + H1* + N54S + V56T + G109A + A174S + N195F + V206L + K391A + G476K) |
| Amylase 5 (Alpha-amylase of SEQ ID NO: 14 + H1* + N54S + V56T + A60V + G109A + R116Q + W167F + Q172N + L173V + A174S + G182* + D183* + N195F + V206L + 1405L + A421H + A422P + A428T) |
| Amylase 6 (Alpha-amylase of SEQ ID NO: 14 + H1* + N54S + V56T + G109A + R116Q + A174S + G182* + D183* + N195F + V206L + I405L + A421H + A422P + A428T) |
| Amylase 7 (Alpha-amylase of SEQ ID NO: 14 + H1* + N54S + V56T + G109A + R116H + A174S + G182* + D183* + N195F + V208L + K393A + G478K) |

Soiled swatches were washed in TOM setting with a detergent with or without enzymes. After wash the soil removal of the swatches was determined by measuring light remission by use of a Macbeth Color-Eye 7000 Remissions spectrophotometer.

Method

The wash solutions were prepared by adjusting the water hardness to 14° dH ($CaCl_2$):$MgCl_2$=3:2) by addition of $CaCl_2$ and $MgCl_2$, adding the desired amount of detergent (Model 0 in a concentration of 2 g/L), and adjusting the temperature to 30° C. in the buckets. The detergent was dissolved during magnetic stirring for 15 min (wash solution was used within 30-60 min after preparation).

The temperature and rotation in the water bath in the TOM were set to 30° C. and 120 rpm, respectively. When the temperature was adjusted according to settings, 1000 mL of the wash solution was added to the TOM beakers.

Swatches (Pili grain milk stain (a homemade stain consisting of red rice, red soybean, peanut, milk) and an 025KC Brown sauce (obtainable from Center For Testmaterials BV (Vlaardingen, the Netherlands)), enzyme (0.188 mg EP/L Protease, and 0.0104 mgEP/L or 0.0208 mgEP/L Amylase), and ballast (up to 30 g) were added to the beakers and washed for 20 min. Swatches were rinsed in cold tap water in a 5 L beakers for 10 min (water running). The swatches were sorted, placed flat on a filter paper, with front site up, and left drying overnight at room temperature.

Textile/Swatches

Textile samples (also termed swatches herein) 025KC (brown sauce) were obtained from Center for Testmaterials BV, P.O. Box 120, 3133 KT Vlaardingen, The Netherlands, and Yili grain milk swatches were prepared as set out in Table 16:

TABLE 16

Yili grain milk stain

| Ingredient | Mixture Amount |
|---|---|
| Yili Grain milk (from Inner Mongolia Yili Indurstial Group Co., Ltd.) | 200 g |
| Carbon black (dosage 0.1 g/mL) (from Center for Testmarterials BV, Vlaardingen, the Netherlands) | 1.2 mL |

The Yili Grain milk and the carbon black solution were mixed and stirred for 1 hour. 600 mL mixture was loaded on to swatch CN42, and left drying overnight at room temperature.

The wash performance was measured as the brightness of the colour of the textile washed expressed in remission values (REM). Remission measurements were made using a Macbeth Color-Eye 7000 Remissions spectrophotometer. Each of the dried swatches was measured. Due to the risk of interference from the background, the swatches were placed on top of two layers of fabric during the measurement of the remission. The remission was measured at 460 nm The UV filter was not included. The results are shown as Delta Remission in Table 17 and 18.

TABLE 17

Results of TOM scale washes of Yili grain milk stains

| Protease | Protease delta remission | Amy-lase | Amylase delta remission | Expected delta remission | Actual delta remis-sion | Syner-gistic obser-vation |
|---|---|---|---|---|---|---|
| Protease 2 | 5.4 | A1 | −0.5 | 4.9 | 9.1 | 3.7 |
| Protease 2 | 3.6 | A2 | −1.2 | 2.4 | 7.8 | 4.2 |
| Protease 2 | 5.4 | A3 | −0.1 | 5.3 | 9.2 | 3.8 |
| Protease 2 | 3.6 | A4 | −1.3 | 2.6 | 7.1 | 3.5 |
| Protease 2 | 5.4 | A6 | −0.8 | 4.8 | 10.9 | 5.5 |
| Protease 3 | 4.7 | A1 | 2.3 | 7.0 | 10.7 | 3.7 |
| Protease 3 | 4.7 | A2 | 3.1 | 7.8 | 11.3 | 3.5 |
| Protease 3 | 4.7 | A3 | 1.6 | 6.3 | 9.7 | 3.4 |
| Protease 3 | 4.7 | A4 | 1.5 | 6.2 | 9.3 | 3.1 |
| Protease 3 | 4.4 | A5 | 0.0 | 4.4 | 7.7 | 3.3 |
| Protease 3 | 4.7 | A6 | 0.8 | 5.5 | 10.0 | 4.5 |
| Protease 3 | 4.4 | A7 | 0.1 | 4.5 | 10.0 | 5.5 |

TABLE 18

Results of TOM scale washes of 025KC Brown sauce stains

| Protease | Protease delta remission | Amy-lase | Amylase delta remission | Expected delta remission | Actual delta remis-sion | Syner-gistic obser-vation |
|---|---|---|---|---|---|---|
| Protease 2 | 0.9 | A2 | 4.8 | 5.7 | 8.7 | 3.0 |

The tables 17 and 18 show the measured delta remission for the enzymes individually, the expected delta remission and the actual delta remission. As can been seen, the synergistic effect of the combinations of amylase and protease shown is the difference between the “Actual delta remission” and the “Expected delta remission”. All synergistic observations are higher in delta remission than the enzymes alone.

The invention claimed is:

1. A detergent composition comprising:

(i) at least one alpha-amylase variant comprising modifications to amino acid positions corresponding to amino acid positions is selected from the group consisting of:

H1*+N54S+V56T+G109A+Q169E+Q172K+A174*+G182*+D183*+N195F+V206L+K391A+G476K;

H1*+N54S+V56T+G109A+R116H+A174S+G182*+D183*+N195F+V206L+K391A+G476K;

H1*+N54S+V56T+K72R+G109A+F113Q+R116Q+W167F+Q172G+A174S+G182*+D183*+G184T+N195F+V206L+K391A+P473R+G476K;

H1*+N54S+V56T+G109A+F113Q+R116Q+Q172N+A174S+G182*+D183*+N195F+V206L+A265G+K391A+P473R+G476K;

H1*+N54S+V56T+K72R+G109A+F113Q+W167F+Q172R+A174S+G182*+D183*+N195F+V206L+K391A+G476K;

H1*+N54S+V56T+K72R+G109A+R116H+T134E+W167F+Q172G+L173V+A174S+G182*+D183*+N195F+V206L+G255A+K391A+G476K;

H1*+N54S+V56T+K72R+G109A+R116H+T134E+W167F+Q172G+L173V+A174S+G182*+D183*+N195F+V206L+G255A+K391A+Q395P+T444Q+P473R+G476K;

H1*+N54S+V56T+G109A+T134E+A174S+G182*+D183*+N195F+V206L+K391A+G476K;

H1*+N54S+V56T+K72R+G109A+A174S+G182*+D183*+N195F+V206L+G255A+K391A+G476K; and

H1*+N54S+V56T+G109A+W167F+Q172E+L173P+A174K+G182*+D183*+N195F+V206L+K391A+G476K, wherein said alpha-amylase variant shares at least 80% but less than 100% sequence identity with the polypeptide of SEQ ID NO: 1, 5, 6, 7, 8, 9, 10, 11, 12, 13, 14, 15, 16, 17, or 18, and wherein said alpha-amylase variant has alpha-amylase activity; and (ii) at least one protease having protease activity, wherein said protease is selected from the group of:

(a) a protease having a sequence identity of at least 85% to the sequences of SEQ ID NOs: 2, 3, 19, 20, or 23;

(b) a protease variant comprising a substitution at one or more positions corresponding to positions 171, 173, 175, 179, or 180 of SEQ ID NO: 2, wherein said protease variant has a sequence identity of at least 85% but less than 100% to SEQ ID NO: 2;

(c) a protease variant comprising a substitution or deletion in one or more positions corresponding to positions 32, 33, 48, 49, 50, 51, 52, 53, 54, 58, 59, 60, 61, 62, 94, 95, 96, 97, 98, 99, 100, 101, 102, 103, 104, 105, 106, 107, 116, 123, 124, 125, 126, 127, 128, 129, 130, 131, 132, 133, 150, 152, 153, 154, 155, 156, 158, 159, 160, 161, 164, 169, 175, 176, 177, 178, 179, 180, 181, 182, 183, 184, 185, 186, 197, 198, 203, 204, 205, 206, 207, 208, 209, 210, 211, 212, 213, 214, 215, or 216 as compared to the protease in SEQ ID NO:3, wherein said protease variant has at least 85% sequence identity to SEQ ID NO: 3, (d) a protease variant comprising a substitutions in one or more positions corresponding to positions 9, 15, 27, 42, 52, 55, 56, 59, 60, 66, 74, 85, 97, 99, 101, 102, 104, 116, 118, 154, 156, 157, 158, 161, 164, 176, 179, 182, 185, 188, 198, 199, 200, 203, 206, 210, 211, 212, 216, 230, 232, 239, 242, 250, 253, 255, 256, or 269, wherein numbering is according to SEQ ID NO: 3, wherein said protease variant has at least 85% sequence identity to SEQ ID NO: 3, and (e) a protease variant comprising a substitution in one or more positions corresponding to positions 32, 33, 49, 50, 51, 52, 53, 54, 55, 60, 61, 62, 63, 64, 96, 97, 98, 99, 100, 101, 102, 103, 104, 105, 106, 107, 108, 109, 118, 125, 126, 127, 128, 129, 130, 131, 132, 133, 134, 135, 152, 154, 155, 156, 157, 158, 161, 162, 163, 167, 170, 175, 181, 187, 183, 184, 185, 186, 187, 188, 189, 190, 191, 192, 203, 204, 209, 210, 211, 212, 213, 214, 215, 216, 217, 218, 219, 220, 221, or 222 as compared to the protease shown in SEQ ID NO: 23, wherein said protease variant has at least 85% sequence identity to SEQ ID NO: 23.

2. The detergent composition according to claim 1, wherein said protease is that of (a).

3. The detergent composition according to claim 1, wherein said protease variant in (b) comprises a substitution in at least one position corresponding to positions 171, 173, 175, 179, or 180, and wherein the amino acid in the position corresponding to position 171 of SEQ ID NO: 2 is selected from the group consisting of W, K, E, D and N; and/or the amino acid in the position corresponding to position 173 of SEQ ID NO: 2 is P; and/or the amino acid in the position corresponding to position 175 of SEQ ID NO: 2 is selected from the group consisting of A, V, and P; and/or the amino acid in the position corresponding to position 179 of SEQ ID NO: 2 is selected from the group consisting of C, V, Q, S, T, E, H, K, M, N, Y, and A; and/or the amino acid in the position corresponding to position 180 of SEQ ID NO: 2 is Y.

4. The detergent composition according to claim 1, wherein said protease variant in (b) comprises a substitution selected from S173P, S175P or F180Y wherein the positions correspond to positions of SEQ ID NO: 2.

5. The detergent composition according to claim 1, wherein said protease variant comprises one or more of the following substitutions; X9E, X9R, X15T, X27R, X42R, X52S, X55P, X56P, X59D, X59E, X60D, X60E, X66A, X74D, X85N, X85R, X97A, X97E, X97D, X99E, X99D, X99G, X99N, X99H, X99M, X101A, X1021, X102N, X104A, X116V, X116R, X154D, X156E, X157S, X157D, X157P, X158E, X161A, X164S, X176E, X179E, X182E, X185N, X188P, X198D, X1991, X200L, X203W, X206G, X210V, X211D, X211Q, X211E, X212D, X212E, X212S, X216S, X216A, X230H, X239R, X242D, X250D, X253D, X255W, X255D, X255E, X256E, X256D, or X269H, wherein numbering is according to SEQ ID NO: 3.

6. The detergent composition according to claim 1, wherein said detergent composition further comprises one or more additional enzymes selected from the group of:

(a) an alpha-amylase having the amino acid sequence of SEQ ID NO: 5, or a variant thereof having a sequence identity of at least 85% but less than 100% to SEQ ID NO: 5, and wherein said alpha-amylase variant has alpha-amylase activity;

(b) an alpha-amylase having the amino acid sequence of SEQ ID NO: 6, or a variant thereof having a sequence identity of at least 85% but less than 100% to SEQ ID NO: 6, and wherein said alpha-amylase variant has alpha-amylase activity;

(c) an alpha-amylase having the amino acid sequence of SEQ ID NO: 7, or a variant thereof having a sequence identity of at least 85% but less than 100% to SEQ ID NO: 7, and wherein said alpha-amylase variant has alpha-amylase activity;

(d) an alpha-amylase having the amino acid sequence of SEQ ID NO: 8, or a variant thereof having a sequence identity of at least 85% but less than 100% to SEQ ID NO: 8, and wherein said alpha-amylase variant has alpha-amylase activity;

(e) an alpha-amylase having the amino acid sequence of SEQ ID NO: 9, or a variant thereof having a sequence identity of at least 85% but less than 100% to SEQ ID NO: 9, and wherein said alpha-amylase variant has alpha-amylase activity;

(f) an alpha-amylase having the amino acid sequence of SEQ ID NO: 10, or a variant thereof having a sequence identity of at least 85% but less than 100% to SEQ ID NO: 10, and wherein said alpha-amylase variant has alpha-amylase activity;

(g) an alpha-amylase having the amino acid sequence of SEQ ID NO: 13, or a variant thereof having a sequence identity of at least 85% but less than 100% to SEQ ID NO: 13, and wherein said alpha-amylase variant has alpha-amylase activity;

(h) an alpha-amylase having the amino acid sequence of SEQ ID NO: 14, or a variant thereof having a sequence identity of at least 85% but less than 100% to SEQ ID NO: 14, and wherein said alpha-amylase variant has alpha-amylase activity;

(i) an alpha-amylase having the amino acid sequence of SEQ ID NO: 11, or a variant thereof having a sequence identity of at least 85% but less than 100% to SEQ ID NO: 11, and wherein said alpha-amylase variant has alpha-amylase activity;

(j) an alpha-amylase having the amino acid sequence of SEQ ID NO: 12, or a variant thereof having a sequence identity of at least 85% but less than 100% to SEQ ID NO: 12, and wherein said alpha-amylase variant has alpha-amylase activity;

(k) an alpha-amylase having the amino acid sequence of SEQ ID NO: 15, or a variant thereof having a sequence identity of at least 85% but less than 100% to SEQ ID NO: 15, and wherein said alpha-amylase variant has alpha-amylase activity;

(l) an alpha-amylase having the amino acid sequence of SEQ ID NO: 16, or a variant thereof having a sequence identity of at least 85% but less than 100% to SEQ ID NO: 16, and wherein said alpha-amylase variant has alpha-amylase activity;

(m) an alpha-amylase having the amino acid sequence of SEQ ID NO: 17, or a variant thereof having a sequence identity of at least 85% but less than 100% to SEQ ID NO: 17, and wherein said alpha-amylase variant has alpha-amylase activity;

(n) an alpha-amylase having the amino acid sequence of SEQ ID NO: 18, or a variant thereof having a sequence identity of at least 85% but less than 100% to SEQ ID NO: 18, and wherein said alpha-amylase variant has alpha-amylase activity;

(o) a lipase having the amino acid sequence of SEQ ID NO: 4, or a variant thereof having a sequence identity of at least 85% but less than 100% to SEQ ID NO: 4, and wherein said lipase variant has lipase activity, and (p) a protease having the amino acid sequence of SEQ ID NO: 2, 3, 19, 20, or 23, or a variant thereof having a sequence identity of at least 85% but less than 100% to SEQ ID NO: 2, 3, 19, 20, or 23, and wherein the protease variant has protease activity.

7. The detergent composition according to claim 6, wherein said additional enzyme is selected from the group consisting of:

(a) is an alpha-amylase variant comprising one or more substitutions or deletions in the following positions: 9, 118, 149, 182, 186, 195, 202, 257, 295, 299, 320, 323, 339, 345, and 458, wherein the positions correspond to positions in SEQ ID NO: 5;

(b) is an alpha-amylase variant comprising one or more substitutions or deletions in the following positions: 140, 195, 183, 184, and 206, wherein the positions correspond to positions in SEQ ID NO: 6;

(c) is an alpha-amylase variant comprising one or more substitutions or deletions in the following positions: 180, 181, 243, and 475, wherein the positions correspond to positions in SEQ ID NO: 7;

(d) is an alpha-amylase variant comprising one or more substitutions or deletions in the following positions: 178, 179, 187, 203, 458, 459, 460, and 476, wherein the positions correspond to positions in SEQ ID NO: 8;

(e) is an alpha-amylase variant comprising a substitution or deletion in the following position 202, wherein the position corresponds to position in SEQ ID NO: 9;

(f) is an alpha-amylase variant comprising one or more substitutions or deletions in the following positions: 405, 421, 422, and 428, wherein the positions correspond to positions in SEQ ID NO: 10;

(g) is an alpha-amylase variant comprising one or more substitutions or deletions in the following positions: 48, 49, 107, 156, 181, 190, 209, and 264 of SEQ ID NO: 13;

(h) is a lipase variant comprising one or more substitutions or deletions in the following positions: 4, 27, 33, 38, 57, 58, 60, 83, 86, 91, 94, 96, 97, 99, 111, 150, 163, 210, 216, 225, 227, 231, 233, 249, 254, 255, 256, 263, 264, 265, 266, 267, and 269 of SEQ ID NO: 4, and (i) a protease having the amino acid sequence of SEQ ID NO: 2, 3, 19, or 20, or a variant thereof having a sequence identity of at least 85% but less than 100% to SEQ ID NO: 2, 3, 19, or 20, and wherein the protease variant has protease activity.

8. The detergent composition according to claim 1, further comprising at least one chelating agent; at least one surfactant; at least one sulfonated polymer; at least one hydrotrope; at least one builder and/or co-builder; at least one perfume; and/or at least one kind of bleaching system.

9. The detergent composition according to claim 1, wherein said detergent composition is a liquid laundry detergent composition, a powder laundry detergent composition, a liquid dishwash detergent composition, or a powder dishwash detergent composition.

10. A method of laundering, comprising laundering a fabric with the detergent composition according to claim 1, at a temperature of 40° C. or less.

11. A method of dishwashing in an automatic dishwashing machine using the detergent composition according to claim 1, comprising the steps of adding said detergent composition in a detergent composition compartment in said automatic dishwashing machine, and releasing said detergent composition during a main-wash cycle.

* * * * *